(12) United States Patent
Kobayashi et al.

(10) Patent No.: US 12,533,941 B2
(45) Date of Patent: Jan. 27, 2026

(54) WORKING VEHICLE

(71) Applicant: Kubota Corporation, Osaka (JP)

(72) Inventors: Atsushi Kobayashi, Sakai (JP);
Tomofumi Fukunaga, Sakai (JP);
Hisao Mukai, Sakai (JP); **Kazuhiro
Kawabata, Sakai (JP); Kota
Matsumoto**, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 18/982,391

(22) Filed: Dec. 16, 2024

(65) Prior Publication Data

US 2025/0115113 A1 Apr. 10, 2025

Related U.S. Application Data

(63) Continuation of application No. PCT/JP2023/022863, filed on Jun. 21, 2023.

(30) Foreign Application Priority Data

Jul. 8, 2022 (JP) .................................. 2022-110626

(51) Int. Cl.
*B60K 6/10* (2006.01)
*F16F 15/14* (2006.01)
*F16F 15/31* (2006.01)

(52) U.S. Cl.
CPC .......... *B60K 6/105* (2013.01); *F16F 15/1478* (2013.01); *F16F 15/31* (2013.01)

(58) Field of Classification Search
CPC ........ F16F 15/1478; F16F 15/31; B60K 6/105
See application file for complete search history.

(56) References Cited

U.S. PATENT DOCUMENTS 5,569,108 A * 10/1996 Cadee ................... B60K 6/105
  475/210
10,955,049 B2 * 3/2021 Stensgaard ............ B60K 6/485
(Continued)

FOREIGN PATENT DOCUMENTS

CN   212875575 U  *  4/2021
JP   S52108725 U    8/1977
(Continued)

OTHER PUBLICATIONS

Translation of WO 2018103776, retrieved from www.espacenet.com (Year: 2025).*

(Continued)

*Primary Examiner* — Stacey A Fluhart
(74) *Attorney, Agent, or Firm* — Keating & Bennett, LLP

(57) ABSTRACT

A working vehicle includes an engine, a first flywheel to rotate upon receipt of rotational power of the engine, a transmission to selectively receive rotational power of the engine or rotational power of the engine and the first flywheel, speed-change the received rotational power, and output the speed-changed rotational power, a first power transmission path to transmit the rotational power of the engine to the first flywheel, and a second power transmission path to transmit the rotational power of the first flywheel to the transmission. The first and second power transmission paths are independent of each other. The first power transmission path includes a first clutch to selectively allow or interrupt transmission of rotational power from the engine to the first flywheel. The second power transmission path includes a second clutch to selectively allow or interrupt transmission of rotational power from the first flywheel to the transmission.

7 Claims, 26 Drawing Sheets

(56) References Cited

U.S. PATENT DOCUMENTS

| | | | |
|---|---|---|---|
| 2002/0139600 A1* | 10/2002 | Nakatani | ............ F16H 47/02 |
| | | | 180/291 |
| 2011/0256972 A1 | 10/2011 | Greenwood | |
| 2014/0366682 A1 | 12/2014 | Murata | |

FOREIGN PATENT DOCUMENTS

| | | | |
|---|---|---|---|
| JP | 2004293726 A | 10/2004 | |
| JP | 2010261566 A | 11/2010 | |
| JP | 5554323 B2 | 7/2014 | |
| WO | 2013108407 A1 | 7/2013 | |
| WO | WO-2018103776 A1 * | 6/2018 | ............ F16D 7/04 |

OTHER PUBLICATIONS

International Search Report in PCT/JP2023/022863, mailed Aug. 22, 2023, 2 pages.

* cited by examiner

| | Engine rotation | First flywheel rotation | First clutch | Second clutch |
|---|---|---|---|---|
| Free mode | Activated | Stopped | OFF | OFF |
| Charge preparation mode | Rotating | Not target rotational speed | Ineffective stroke filling | OFF |
| Charge mode | Rotating | Not target rotational speed | ON | OFF |
| Boost preparation mode | Rotating | Rotating at target rotational speed | ON | Ineffective stroke filling |
| Boost mode | Rotating | Higher than engine rotational speed | OFF | Half clutch to ON |
| Holding-out preparation mode | Rotating | Lower than engine rotational speed | OFF | Ineffective stroke filling |
| Holding-out mode | Rotating | Equal to or lower than engine rotational speed | OFF | Half clutch to ON |
| Engine off mode | Not ignited | Speed-reduced | ON | ON |

Fig.14

| Mode before shift | Mode after shift | Condition (threshold value) 1 | Condition (threshold value) 2 | Condition (threshold value) 3 |
|---|---|---|---|---|
| Free mode | Holding-out preparation mode | Engine rotational speed > first FW rotational speed | Load rate is less than X1% | |
| Holding-out preparation mode | Holding-out mode | Engine rotational speed > first FW rotational speed | Torque rate is less than Y1% | Target engine rotational speed = actual engine rotational speed |
| Holding-out preparation mode | Free mode | Engine rotational speed > first FW rotational speed | One shot is performed N1 times | |
| Holding-out mode | Charge preparation mode | Engine rotational speed = first FW rotational speed | Load rate is less than X2% | |
| Holding-out mode | Free mode | Engine rotational speed > first FW rotational speed | Torque rate is equal to or higher than Y2% | |
| Charge preparation mode | Charge mode | Engine rotational speed = first FW rotational speed | Torque rate is less than Y3% | |
| Charge preparation mode | Free mode | Engine rotational speed = first FW rotational speed | One shot is performed N2 times | |
| Charge mode | Boost preparation mode | Engine rotational speed × a (a>1) = first FW rotational speed | Load rate is less than X3% | |
| Charge mode | Free mode | Engine rotational speed × a (a>1) > first FW rotational speed | Torque rate is equal to or higher than Y4% | |
| Boost preparation mode | Boost mode | Engine rotational speed × a (a>1) > first FW rotational speed | Load rate is equal to or higher than X4% | |
| Boost mode | Holding-out mode | Engine rotational speed = first FW rotational speed | | Engine drop rate is equal to or higher than Z% |
| Boost mode | Free mode | Engine rotational speed > first FW rotational speed | Load rate is less than X5% | Target engine rotational speed > actual engine rotational speed |

Fig.16

WORKING VEHICLE

CROSS REFERENCE TO RELATED APPLICATIONS

This application is a continuation application of International Application No. PCT/JP2023/022863, filed on Jun. 21, 2023, which claims the benefit of priority to Japanese Patent Application No. 2022-110626, filed on Jul. 8, 2022. The entire contents of each of these applications are hereby incorporated herein by reference.

BACKGROUND OF THE INVENTION

1. Field of the Invention

The present invention relates to working vehicles such as tractors.

2. Description of the Related Art

Conventionally, a technique disclosed in Japanese Patent No. 5554323 is known.

The technique disclosed in Japanese Patent No. 5554323 is an energy recovery system for a vehicle drive line including an engine, a flywheel, and a transmission. According to this system, rotational energy received from a wheel drive line is stored in the flywheel, and the stored rotational energy can be returned to the drive line.

According to the disclosed technique, a path through which power can be transmitted is provided between the engine and the flywheel and between the flywheel and the transmission. However, these paths are not independent of each other. Specifically, both of these two paths pass a planetary gear mechanism.

Accordingly, a rotational speed of rotational power input to the flywheel when rotational power is transmitted from the engine to the flywheel and a rotational speed of rotational power output to the transmission when rotational power is transmitted from the flywheel to the transmission are decided on the basis of a gear ratio of the planetary gear mechanism. As a result, even when rotational power of the engine is input to the flywheel after being speed-increased by the planetary gear mechanism, the rotational power output from the flywheel is output to the transmission after being speed-reduced by the planetary gear mechanism. That is, rotational energy stored in the flywheel cannot be efficiently output to the transmission. It is therefore difficult to effectively assist rotational power of the engine by the rotational power of the flywheel when the rotational power of the engine is insufficient.

Therefore, when the disclosed technique is applied to a working vehicle that drives a working device by rotational power of an engine, rotational power of the engine cannot be effectively assisted by rotational power of a flywheel in a state where a work load is large.

SUMMARY OF THE INVENTION

In view of the above problems, example embodiments of the present invention provide working vehicles that can each effectively assist rotational power of an engine by rotational power of a flywheel in a state where a work load is large.

Example embodiments of the present invention may have the following characteristics.

A working vehicle according to an example embodiment of the present invention includes an engine, a first flywheel to rotate upon receipt of rotational power of the engine, a transmission to selectively receive the rotational power of the engine or rotational power of the engine and the first flywheel, speed-change the received rotational power, and output the speed-changed rotational power, a first power transmission path to transmit the rotational power of the engine to the first flywheel, and a second power transmission path to transmit the rotational power of the first flywheel to the transmission. The first power transmission path and the second power transmission path are independent of each other. The first power transmission path includes a first clutch to selectively allow or interrupt transmission of rotational power from the engine to the first flywheel. The second power transmission path includes a second clutch to selectively allow or interrupt transmission of rotational power from the first flywheel to the transmission.

The first power transmission path may include a speed increasing mechanism to speed-increase the rotational power of the engine and transmit the speed-increased rotational power to the first flywheel. The second power transmission path may transmit the rotational power of the first flywheel to the transmission without passing through a speed reduction mechanism.

The working vehicle may include a third power transmission path to transmit the rotational power of the engine to the transmission without passing through the first flywheel. The third power transmission path may constantly connect an output shaft of the engine and an input shaft of the transmission.

The speed increasing mechanism may include a planetary gear mechanism including a sun gear, a planetary gear, and a ring gear, the ring gear may be fixed non-rotatably, the rotational power of the engine may be input to the planetary gear and transmitted to the first flywheel via the sun gear, and the rotational power of the first flywheel may be transmitted to the transmission without passing through the planetary gear mechanism.

The working vehicle may include a second flywheel connected to an output shaft of the engine. The first flywheel may be rotatable independently of the second flywheel.

The first flywheel may be located between the second flywheel and the transmission in an axial direction of the output shaft.

The working vehicle may include an intermediate shaft interposed between the output shaft and the transmission to define the third power transmission path. The intermediate shaft may pass through the first flywheel.

The first clutch and the second clutch may be arranged in a radial direction of the intermediate shaft.

The first clutch and the second clutch may be arranged in an axial direction of the intermediate shaft.

The working vehicle may include a housing to store the first flywheel, the first clutch, and the second clutch. The housing may include a partition wall to partition an inside of the housing into a space in which the first flywheel is stored and a space in which the first clutch and the second clutch are stored. The first clutch and the second clutch may face the partition wall.

The first clutch and the second clutch may be multiplate clutches each including a plurality of friction plates and may be located radially inward of the first flywheel.

The above and other elements, features, steps, characteristics and advantages of the present invention will become more apparent from the following detailed description of the example embodiments with reference to the attached drawings.

BRIEF DESCRIPTION OF THE DRAWINGS

A more complete appreciation of example embodiments of the present invention and many of the attendant advantages thereof will be readily obtained as the same becomes better understood by reference to the following detailed description when considered in connection with the accompanying drawings described below.

FIG. 14 illustrates states of an engine, the first flywheel, a first clutch, and a second clutch in each operation mode executed by the control system.

FIG. 16 illustrates conditions (threshold values) for shift of the operation mode.

DETAILED DESCRIPTION OF THE EXAMPLE EMBODIMENTS

Figure 1:
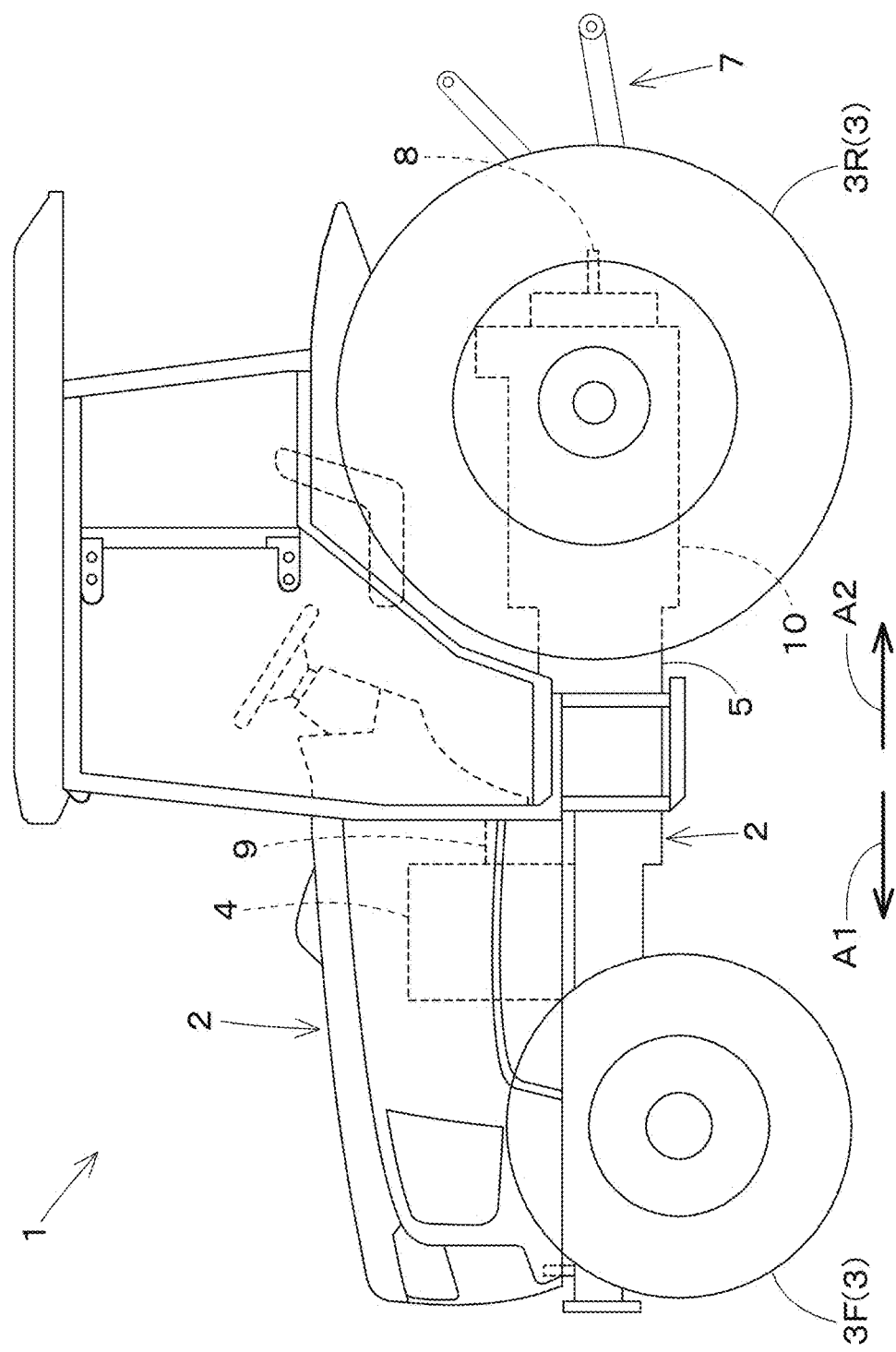
FIG. 1 is a schematic side view illustrating a working vehicle according to an example embodiment of the present invention.

Example embodiments will now be described with reference to the accompanying drawings, wherein like reference numerals designate corresponding or identical elements throughout the various drawings. The drawings are to be viewed in an orientation in which the reference numerals are viewed correctly.

Example embodiments of the present invention are described below while referring to the drawings as appropriate.

In the following description, it is assumed that a direction indicated by arrow A1 and a direction indicated by arrow A2 in FIG. 1 are a forward direction and a rearward direction, respectively.

Working Vehicle

FIG. 1 is a schematic side view illustrating a working vehicle 1 according to the present invention. In the present example embodiment, a tractor is illustrated as the working vehicle 1. Note, however, that the working vehicle 1 is not limited to a tractor and may be, for example, another working vehicle such as a wheel loader, a compact track loader, a backhoe, or a rice planter.

The working vehicle 1 includes a vehicle body 2 and a traveling device 3.

The vehicle body 2 includes an engine 4 and a power transmission case 5 coupled to a rear portion of the engine 4. The traveling device 3 supports the vehicle body 2 so that the vehicle body 2 can travel. The traveling device 3 includes a front wheel 3F and a rear wheel 3R.

A raising/lowering device 7 is provided on a rear portion of the vehicle body 2. A working device can be attached to the raising/lowering device 7. The working device attached to the raising/lowering device 7 performs work on an agricultural field and is, for example, a cultivator, a spreader, or the like. The raising/lowering device 7 may include, for example, a three-point linkage. The raising/lowering device 7 can raise and lower the attached working device.

A PTO shaft 8 is provided on a rear portion of the power transmission case 5 so as to protrude. The working device attached to the raising/lowering device 7 can be driven by a driving force transmitted from the PTO shaft 8.

The power transmission case 5 includes a flywheel housing 9 and a transmission case 10. In the flywheel housing 9, members such as flywheels (a first flywheel 13 and a second flywheel 14), which will be described later, are stored. The flywheel housing 9 is provided on a front portion of the power transmission case 5. Hereinafter, the flywheel housing 9 is sometimes referred to simply as a housing 9. In the transmission case 10, members such as a transmission 16, which will be described later, are stored. The transmission case 10 is provided in a rear portion of the power transmission case 5.

Power Transmission Mechanism

Figure 2:
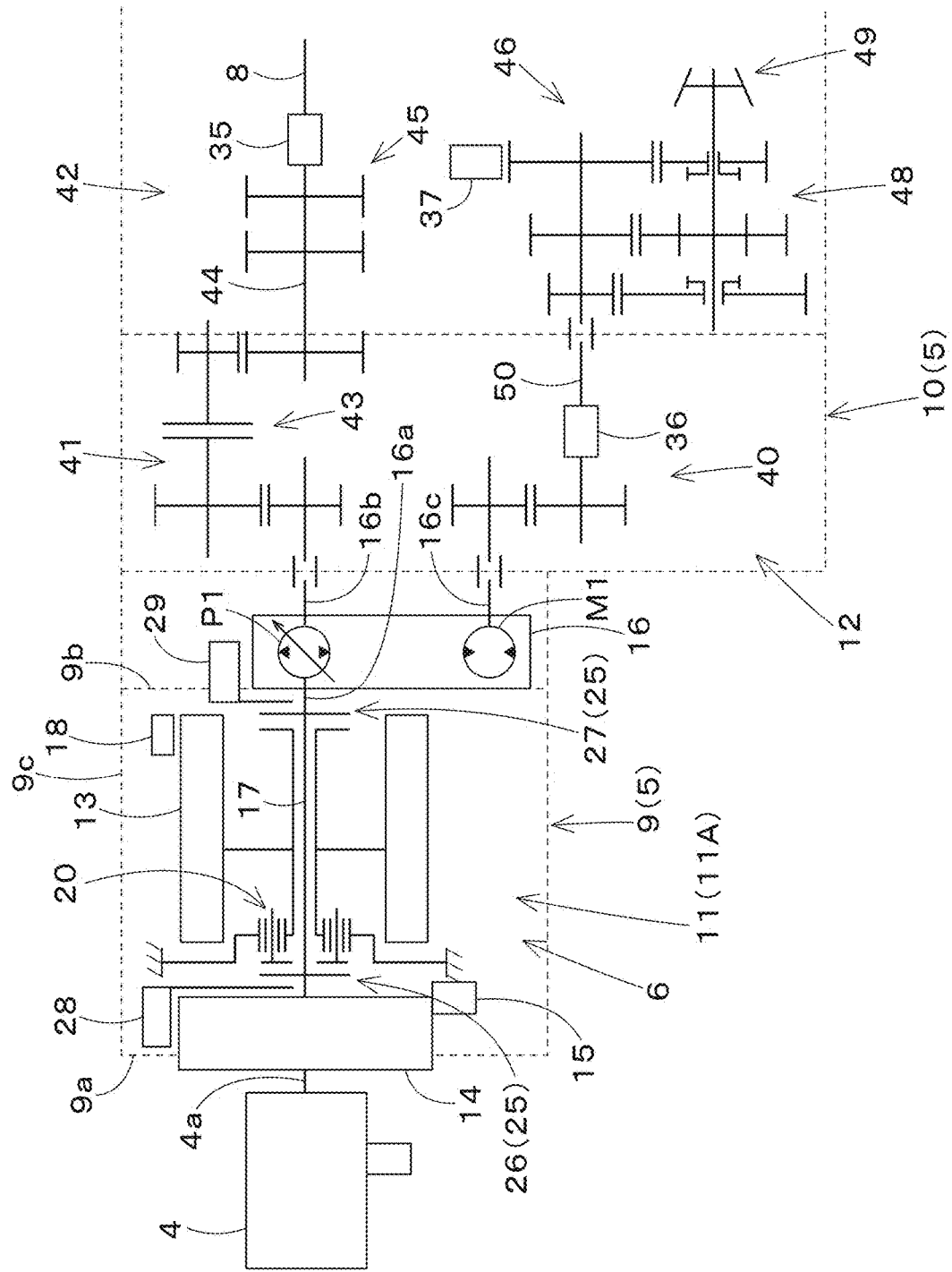
FIG. 2 illustrates a configuration of a power transmission mechanism of the working vehicle.

As illustrated in FIG. 2, a power transmission mechanism 6 is disposed in the power transmission case 5. The power transmission mechanism 6 transmits rotational power of the engine 4 to the traveling device 3 and the PTO shaft 8 illustrated in FIG. 1.

The power transmission mechanism 6 includes a first power transmitter 11 and a second power transmitter 12. The first power transmitter 11 is disposed in the flywheel housing 9. The second power transmitter 12 is disposed in the transmission case 10. The first power transmitter 11 receives rotational power of the engine 4 and transmits this rotational power to the second power transmitter 12. The second power transmitter 12 transmits the rotational power transmitted from the first power transmitter 11 to the traveling device 3 and the PTO shaft 8.

Figure 3:
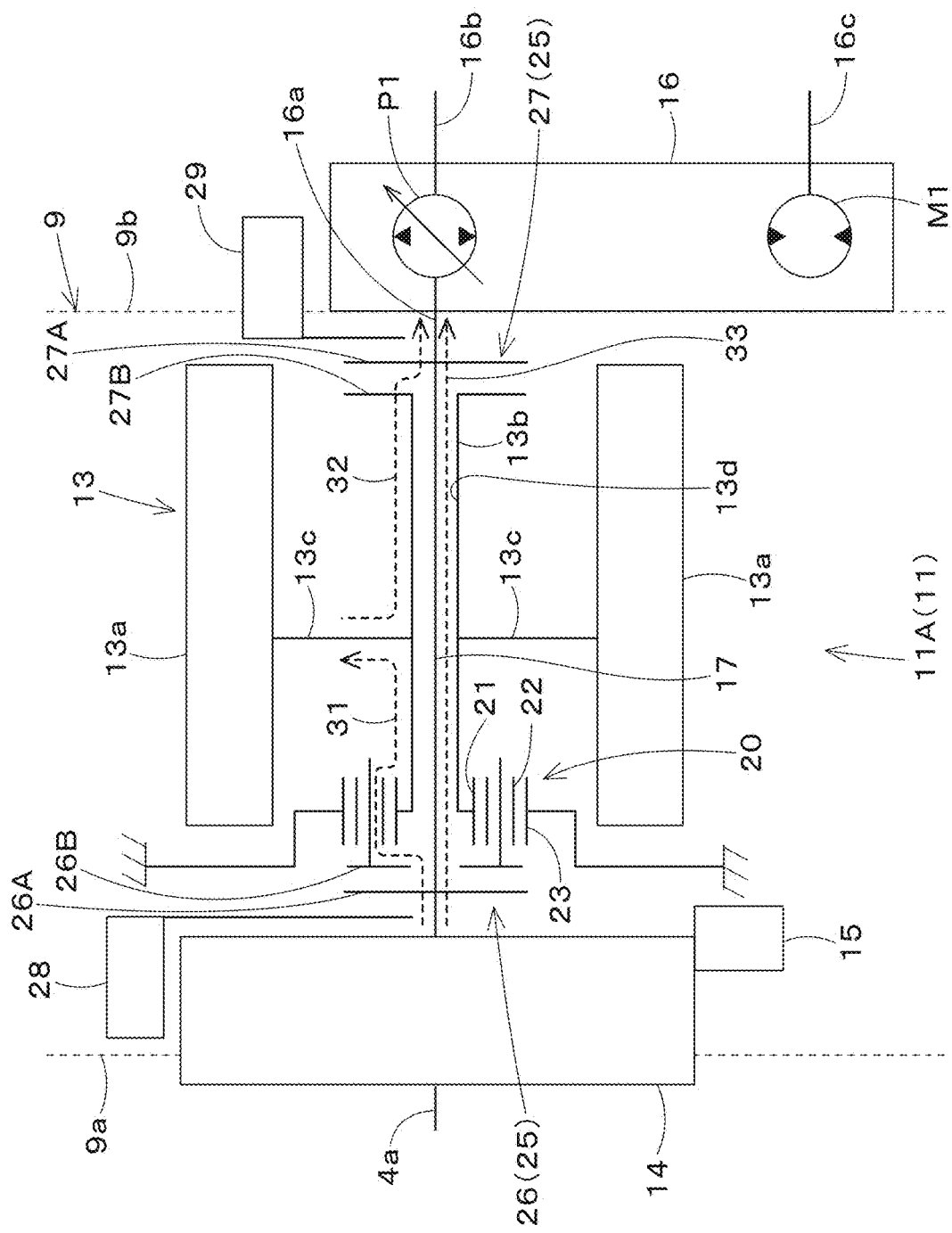
FIG. 3 illustrates a configuration of a first example embodiment of a first power transmitter.
Figure 4:
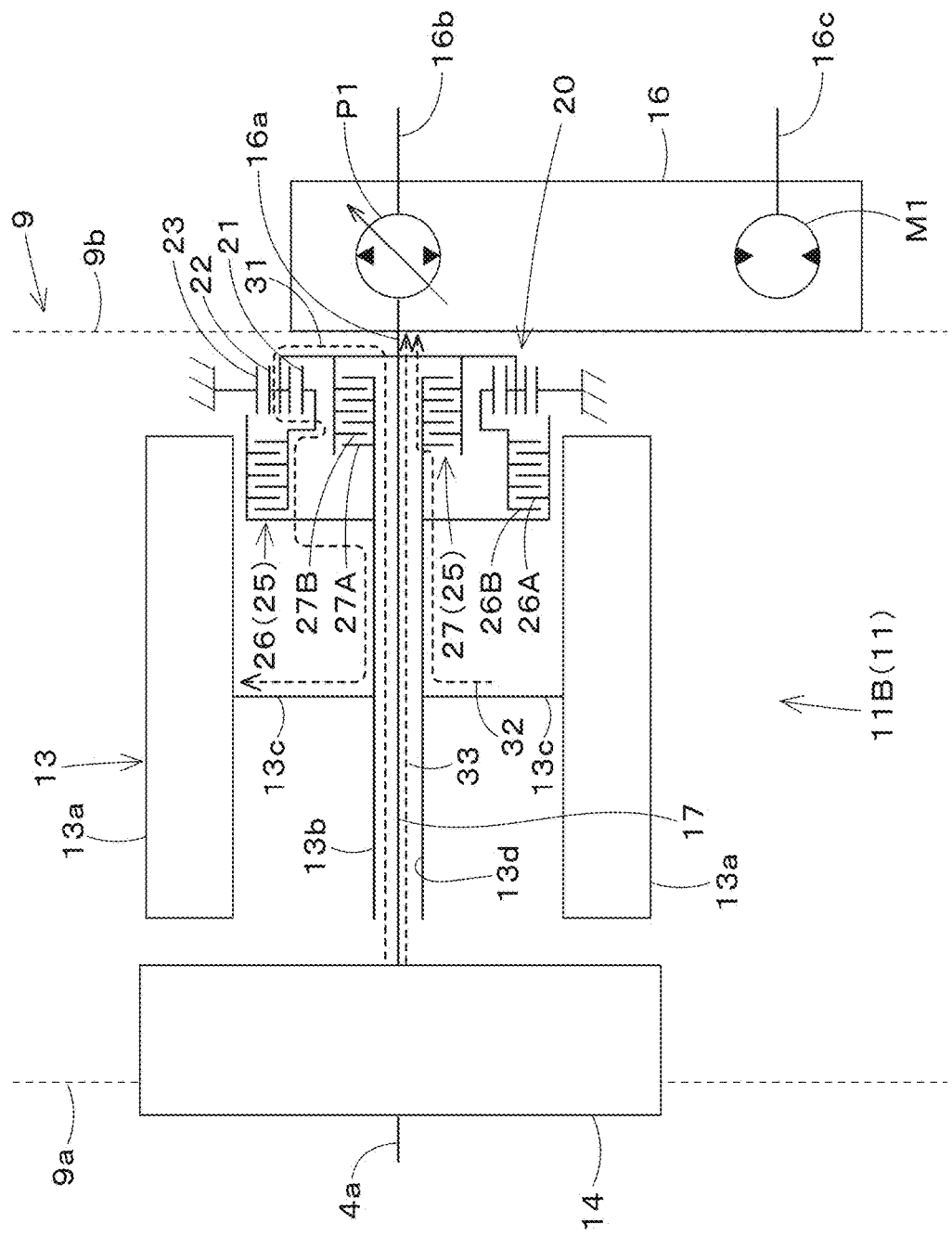
FIG. 4 illustrates a configuration of a second example embodiment of the first power transmitter.
Figure 5:
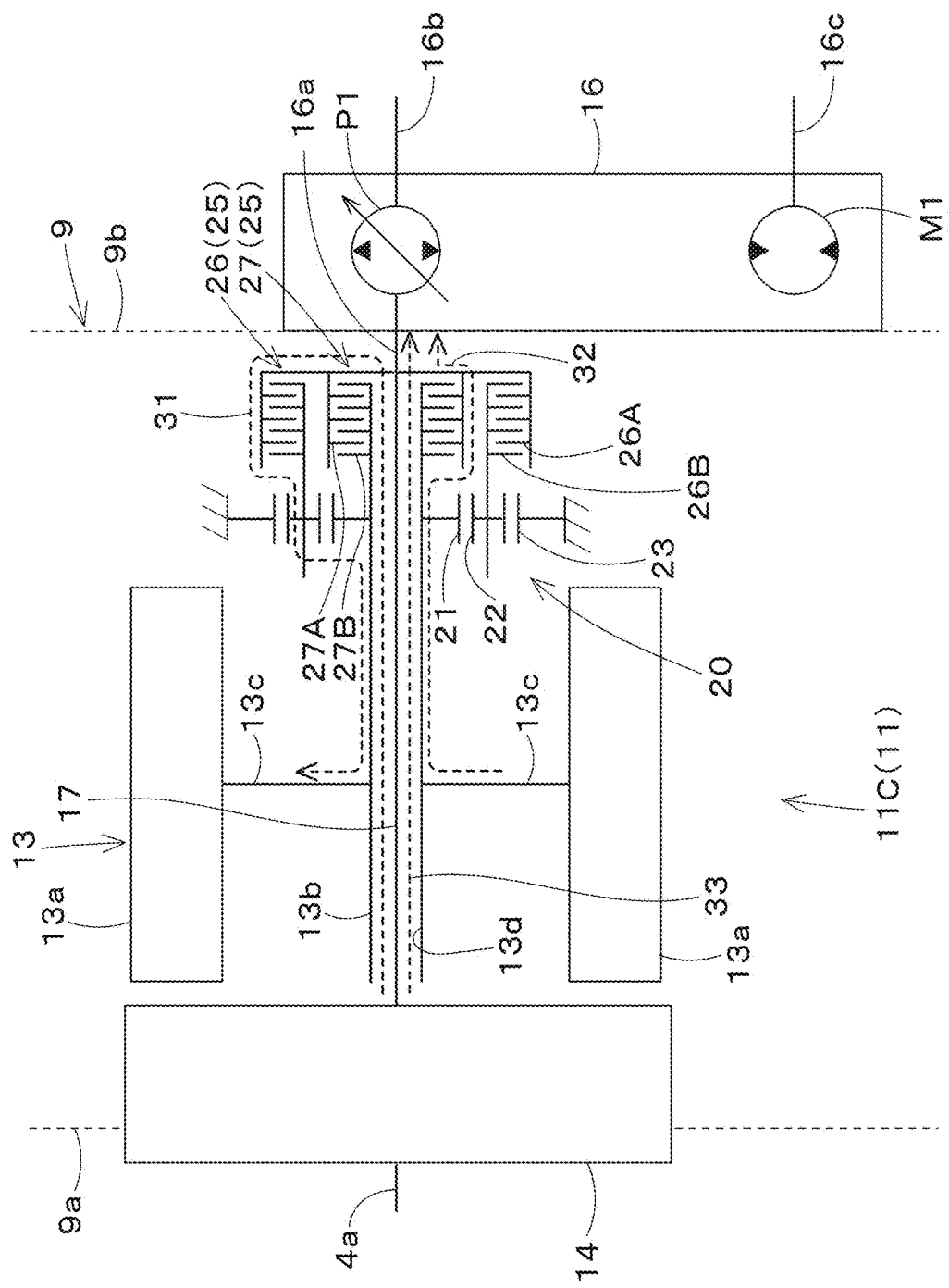
FIG. 5 illustrates a configuration of a third example embodiment of the first power transmitter.
Figure 6:
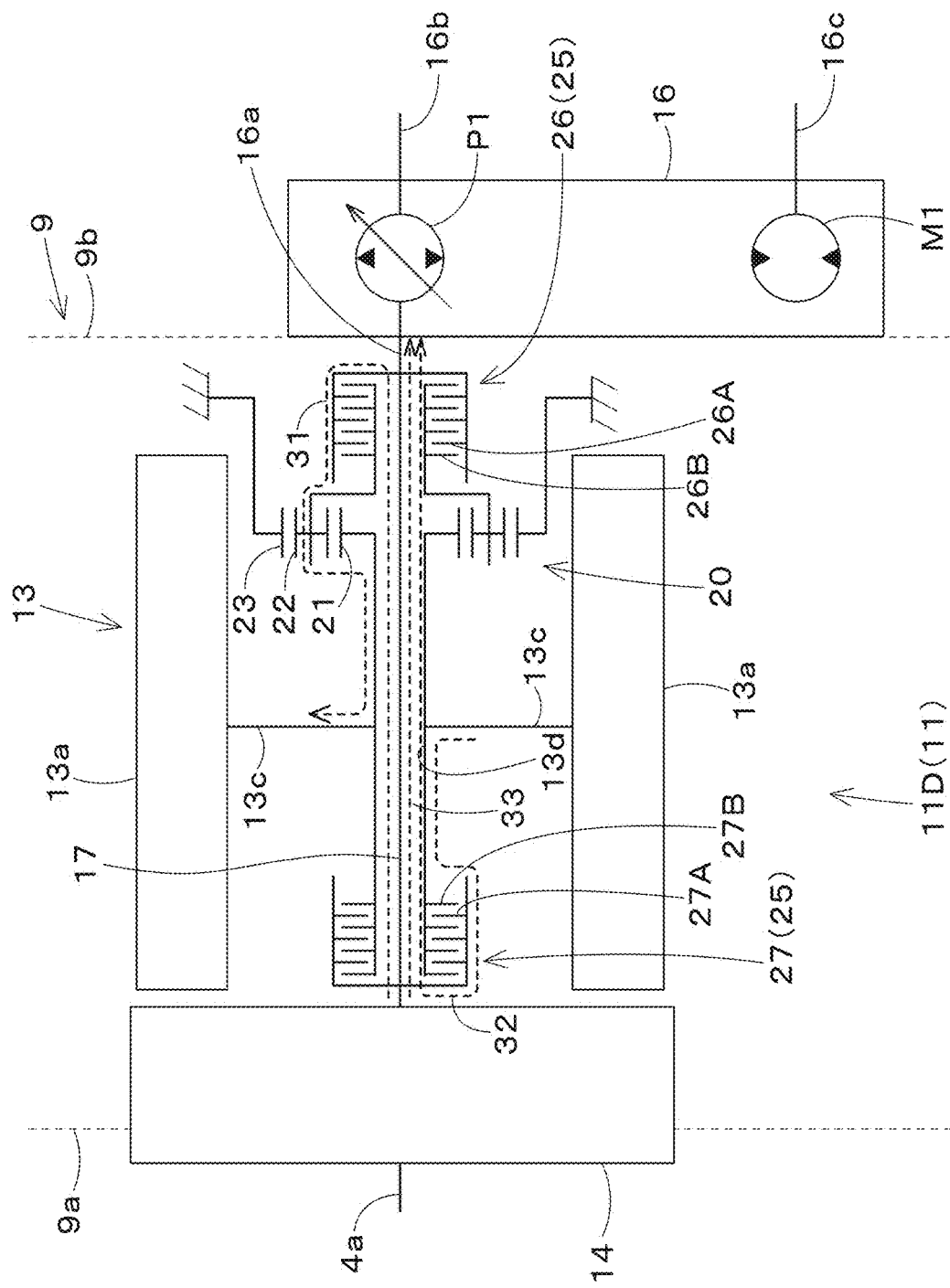
FIG. 6 illustrates a configuration of a fourth example embodiment of the first power transmitter.
Figure 7:
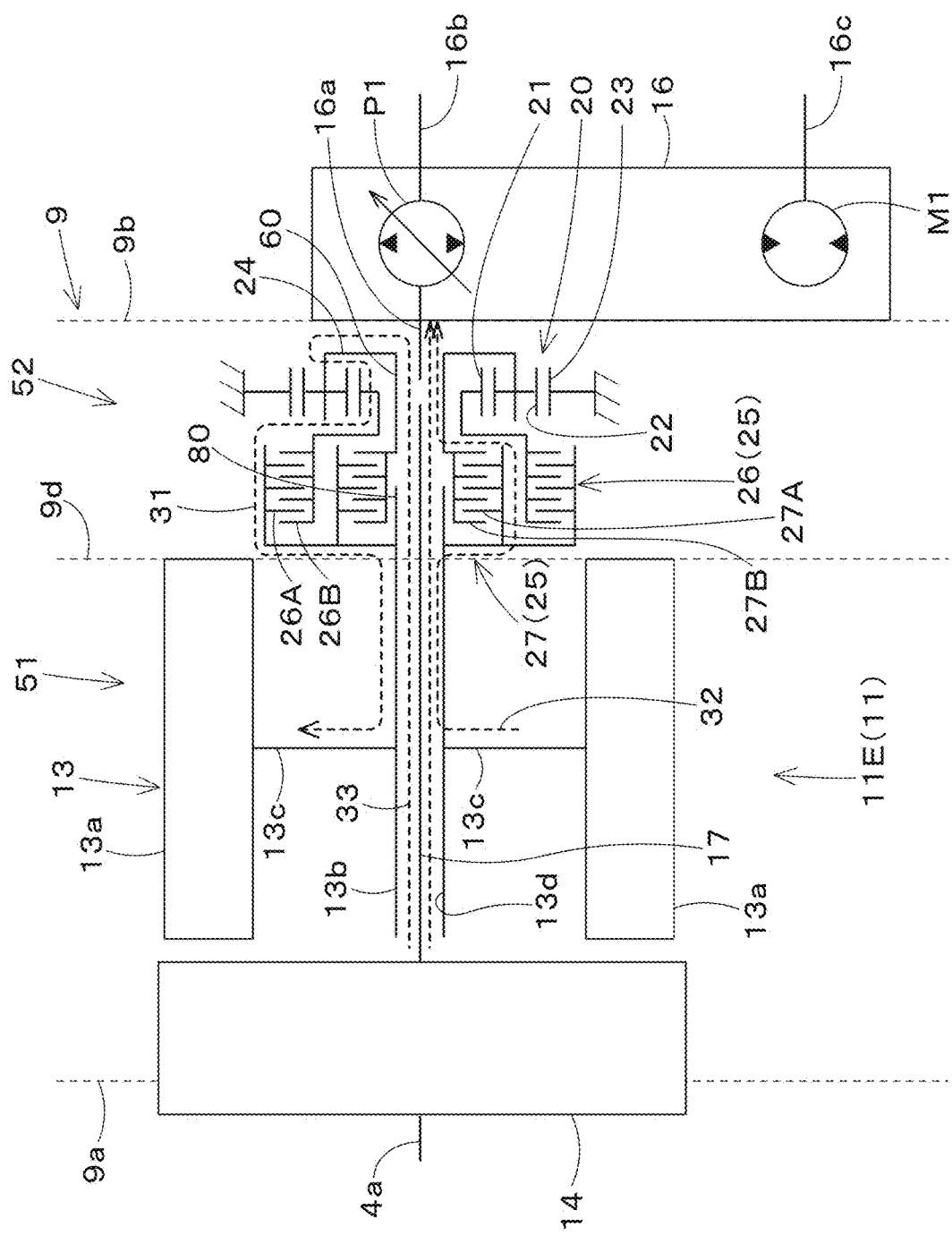
FIG. 7 illustrates a configuration of a fifth example embodiment of the first power transmitter.
Figure 8:
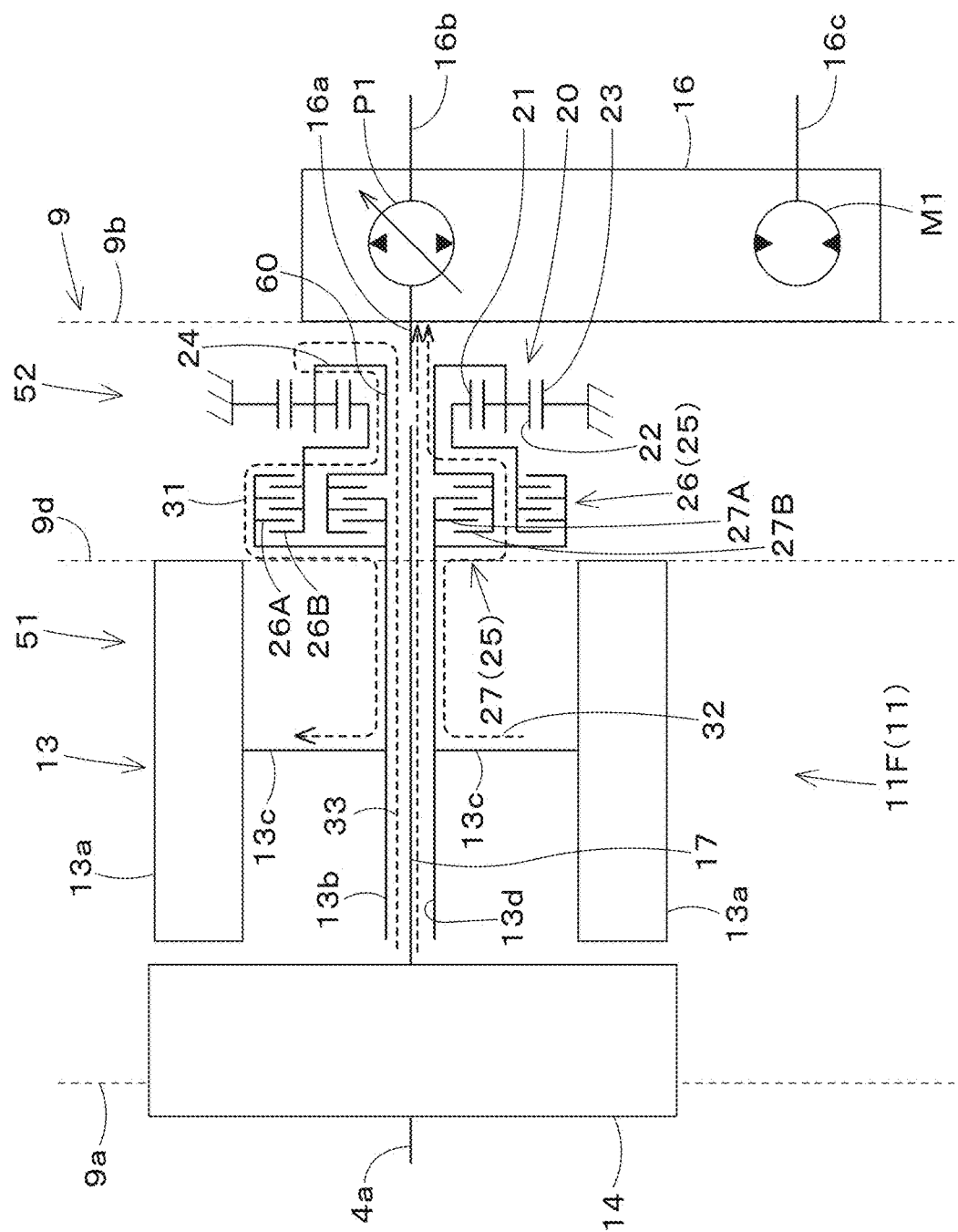
FIG. 8 illustrates a configuration of a sixth example embodiment of the first power transmitter.

FIGS. 3 to 8 illustrate different example embodiments of the first power transmitter 11. FIG. 3 illustrates a first example embodiment of the first power transmitter 11, FIG. 4 illustrates a second example embodiment of the first power transmitter 11, FIG. 5 illustrates a third example embodiment of the first power transmitter 11, FIG. 6 illustrates a fourth example embodiment of the first power transmitter 11, FIG. 7 illustrates a fifth example embodiment of the first power transmitter 11, and FIG. 8 illustrates a sixth example embodiment of the first power transmitter 11.

First Power Transmitter (Basic Configuration)

A configuration of the first power transmitter 11 is described below.

First, a configuration (a basic configuration of the first power transmitter 11) common to all of the example embodiments (the first to sixth example embodiments) among configurations of the first power transmitter 11 is described.

As illustrated in FIGS. 2 to 8, the first power transmitter 11 includes the first flywheel 13 and the second flywheel 14. The first flywheel 13 and the second flywheel 14 rotate upon receipt of rotational power of the engine 4.

The second flywheel 14 has a circular plate shape. The second flywheel 14 is connected to an output shaft (crankshaft) 4a of the engine 4. Accordingly, the second flywheel 14 rotates at a rotational speed equal to a rotational speed of the engine 4. Note that the "rotational speed" as used herein refers to the number of rotations per unit time (e.g., rpm).

The first flywheel 13 has a cylindrical shape having a through-hole 13d passing through the first flywheel 13 in a front-rear direction. Specifically, the first flywheel 13 includes an outer cylindrical portion 13a, an inner cylindrical portion 13b, and a coupling portion 13c. The outer cylindrical portion 13a is a cylindrical portion including an outer circumferential surface of the first flywheel 13. The inner cylindrical portion 13b is a cylindrical portion including an inner circumferential surface of the first flywheel 13 and is disposed inward (radially inward) of the outer cylindrical portion 13a. The through-hole 13d is provided inward of the inner cylindrical portion 13b. The coupling portion 13c has a circular plate shape that couples the outer cylindrical portion 13a and the inner cylindrical portion 13b.

Note that the first flywheel 13 may not include all the outer cylindrical portion 13a, the inner cylindrical portion 13b, and the coupling portion 13c but include only the outer cylindrical portion 13a. In this case, a member different from the first flywheel 13 defines the inner cylindrical portion 13b and the coupling portion 13c, and this member and the outer cylindrical portion 13a are connected and rotate integrally.

An intermediate shaft 17 extends through the through-hole 13d of the first flywheel 13. The intermediate shaft 17 extends in the front-rear direction so as to pass through a center of the first flywheel 13. The intermediate shaft 17 relays the second flywheel 14 and the transmission 16. The inner cylindrical portion 13b is supported on a shaft bearing provided on the intermediate shaft 17. The inner cylindrical portion 13b is thus supported so as to be rotatable relative to the intermediate shaft 17. This allows the first flywheel 13 to rotate about an axial center of the intermediate shaft 17 independently of the intermediate shaft 17.

Note that the inner cylindrical portion 13b may be directly supported on the shaft bearing provided on the intermediate shaft 17 or may be indirectly supported on the shaft bearing provided on the intermediate shaft 17 with another member interposed therebetween. In the latter case, the first flywheel 13 is connected to another member (a support body 65 (see FIG. 11) or the like, which will be described later), and the another member is supported on the intermediate shaft 17 with the shaft bearing interposed therebetween.

The first flywheel 13 is disposed between the second flywheel 14 and the transmission 16 in an axial direction of the output shaft 4a (the front-rear direction). The first flywheel 13 rotates by receiving the rotational power of the engine 4 via a speed increasing mechanism 20, which will be described later.

A first rotational speed sensor 18 to measure a rotational speed of the first flywheel 13 is provided in the vicinity of the first flywheel 13. A second rotational speed sensor 15 to measure a rotational speed of the second flywheel 14 (=a rotational speed of the engine 4) is provided in the vicinity of the second flywheel 14.

The first power transmitter 11 includes a first power transmission path 31 and a second power transmission path 32.

The first power transmission path 31 is a path for transmitting the rotational power of the engine 4 to the first flywheel 13. The second power transmission path 32 is a path for transmitting the rotational power of the first flywheel 13 to the transmission 16.

The first power transmission path 31 and the second power transmission path 32 are paths independent of each other. Accordingly, when the rotational power of the engine 4 is transmitted to the first flywheel 13, the rotational power of the engine 4 is transmitted to the first flywheel 13 through the first power transmission path 31 without passing through the second power transmission path 32. When the rotational power of the first flywheel 13 is transmitted to the transmission 16, the rotational power of the first flywheel 13 is transmitted to the transmission 16 through the second power transmission path 32 without passing through the first power transmission path 31.

The first power transmitter 11 includes a clutch device 25 including a first clutch 26 and a second clutch 27. The first clutch 26 is provided on the first power transmission path 31. The second clutch 27 is provided on the second power transmission path 32.

The first power transmission path 31 is a path that passes the first clutch 26 but does not pass the second clutch 27. The second power transmission path 32 is a path that passes the second clutch 27 but does not pass the first clutch 26.

The first clutch 26 turns on or off (cuts off or connects) transmission of rotational power from the engine 4 to the first flywheel 13. The second clutch 27 turns on or off (cuts off or connects) transmission of rotational power from the first flywheel 13 to the transmission 16.

The first clutch 26 and the second clutch 27 are hydraulic clutches that operate upon supply of a hydraulic fluid. The first clutch 26 includes a first friction plate 26A, a second friction plate 26B, and a hydraulic piston. The second clutch 27 includes a first friction plate 27A, a second friction plate 27B, and a hydraulic piston. When the hydraulic piston is driven, the first friction plate 26A, 27A moves, and thus it is possible to switch between a state where the first friction plate 26A, 27A and the second friction plate 26B, 27B are pressed against each other and a state where the first friction plate 26A, 27A and the second friction plate 26B, 27B are separated away from each other.

In the first to sixth example embodiments, the first friction plate 26A is configured to be pressed against or separated away from the second friction plate 26B, and the first friction plate 27A is configured to be pressed against or separated away from the second friction plate 27B. However, in each of the example embodiments, the second friction plate 26B may be configured to be pressed against or separated away from the first friction plate 26A, and the second friction plate 27B may be configured to be pressed against or separated away from the first friction plate 27A.

The first clutch 26 is engaged in a state where the first friction plate 26A and the second friction plate 26B are pressed against each other, and is disengaged in a state where the first friction plate 26A and the second friction plate 26B are separated away from each other. The second clutch 27 is engaged in a state where the first friction plate 27A and the second friction plate 27B are pressed against each other, and is disengaged in a state where the first friction plate 27A and the second friction plate 27B are separated away from each other.

The first clutch 26 and the second clutch 27 each include a hydraulic control valve (not illustrated) that controls supply of a hydraulic fluid to an oil chamber of the hydraulic piston. The hydraulic control valve is a solenoid valve controlled by supply of an electric current. The hydraulic control valve is, for example, a proportional valve with an opening that changes in accordance with a current value. By supplying a current to the hydraulic control valve, opening and closing of the hydraulic control valve are controlled, and thus supply of a hydraulic fluid to the oil chamber of the hydraulic piston is controlled. Operation of the hydraulic piston is thus controlled, and on and off of the first clutch 26 and the second clutch 27 are controlled.

The first friction plates 26A and 27A are biased in a return direction (a direction away from the second friction plates 26B and 27B) by a spring, and approach the second friction plates 26B and 27B by moving against biasing force of the spring when a hydraulic fluid is supplied to the oil chamber of the hydraulic piston.

When the first clutch 26 and the second clutch 27 are engaged, first, a hydraulic fluid of a set amount that balances out with the biasing force of the spring is supplied in a one-shot manner, and thereby a pressure of the hydraulic fluid in the oil chamber of the piston is increased (hereinafter referred to as a "connection preparation state"). Then, in the connection preparation state, when conditions for engaging the first clutch 26 and the second clutch 27 are met, a hydraulic fluid of a pressure that allows the first friction plates 26A and 27A to be pressed against the second friction plates 26B and 27B is continuously supplied. The first clutch 26 and the second clutch 27 are thus engaged. That is, the connection preparation state shifts to a connection state. By thus shifting to the connection state after the connection preparation state when connecting the clutch (the first clutch 26 or the second clutch 27), response of clutch connection can be improved.

To supply a hydraulic fluid of a set amount that balances out with the biasing force of the spring in a one-shot manner, a one-shot current (one-shot pulse current) is supplied to the hydraulic control valve (solenoid valve). That is, when the one-shot pulse current is supplied to the hydraulic control valve, a hydraulic fluid of a set amount that balances out with the biasing force of the spring is supplied in a one-shot manner, and thus the connection preparation state is established.

Hereinafter, supply of the one-shot pulse current is referred to as execution of one shot. Furthermore, the number of times of supply of the one-shot pulse current is referred to as the number of times of execution of one shot or the number of attempts of engaging the clutch (the first clutch 26 or the second clutch 27).

As illustrated in FIG. 3, the first clutch 26 includes a first pressure sensor 28. The second clutch 27 includes a second pressure sensor 29.

Although illustration of the first pressure sensor 28 and the second pressure sensor 29 is omitted in FIGS. 4 to 8 (the second to sixth example embodiments), the first pressure sensor 28 and the second pressure sensor 29 are provided in the second to sixth example embodiments, as in the first example embodiment. Although illustration of the first rotational speed sensor 18 and the second rotational speed sensor 15 is omitted in FIGS. 4 to 8 (the second to sixth example embodiments), the first rotational speed sensor 18 and the second rotational speed sensor 15 are provided in the second to sixth example embodiments, as in the first example embodiment.

The first pressure sensor 28 detects a pressure (a working pressure of a fluid passage piston) of a hydraulic fluid in a fluid passage for supplying a hydraulic fluid to the hydraulic piston of the first clutch 26. The second pressure sensor 29 detects a pressure (a working pressure of a fluid passage piston) of a hydraulic fluid in a fluid passage for supplying a hydraulic fluid to the hydraulic piston of the second clutch 27. States (engaged states and disengaged states) of the first clutch 26 and the second clutch 27 can be grasped on the basis of the pressures of the hydraulic fluid detected by the first pressure sensor 28 and the second pressure sensor 29.

As illustrated in FIGS. 3 to 8, the speed increasing mechanism 20 is provided on the first power transmission path 31. That is, the first power transmission path 31 is a path passing the speed increasing mechanism 20. On the other hand, the second power transmission path 32 is a path that does not pass the speed increasing mechanism 20. Note, however, that the speed increasing mechanism 20 need not necessarily be provided on the first power transmission path 31.

The speed increasing mechanism 20 accelerates the rotational power of the engine 4 and transmitting the speed-increased rotational power to the first flywheel 13. The speed increasing mechanism 20 is a planetary gear mechanism including a sun gear 21, a planetary gear 22, and a ring gear 23. The ring gear 23 is fixed on the flywheel housing 9. Accordingly, the ring gear 23 is incapable of rotating. The planetary gear 22 is engaged with inner teeth of the ring gear 23. The sun gear 21 is engaged with the planetary gear 22. The sun gear 21 is rotatable about the axial center of the intermediate shaft 17. The planetary gear 22 is rotatable (capable of orbiting) around the sun gear 21.

Figure 9:
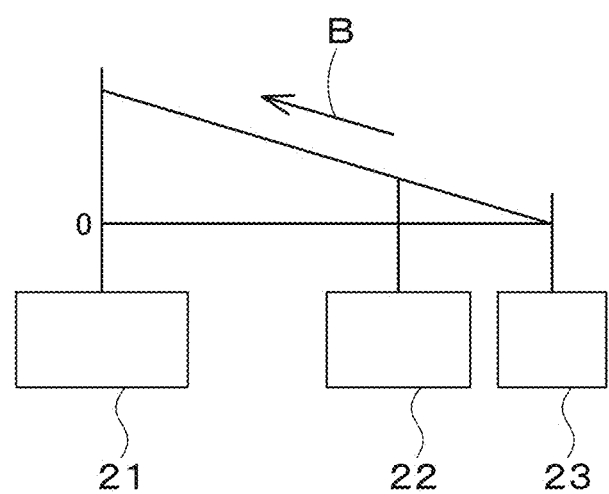
FIG. 9 is a collinear diagram of a planetary gear mechanism included in a speed increasing mechanism.

FIG. 9 is a collinear diagram of the planetary gear mechanism that defines the speed increasing mechanism 20.

The vertical axis of FIG. 9 is the number of rotations (rotational speed). As indicated by arrow B in FIG. 9, according to the planetary gear mechanism included in the speed increasing mechanism 20, rotational power input from the planetary gear 22 can be speed-increased and the speed-increased rotational power can be output from the sun gear 21. A speed increase ratio of the speed increasing mechanism 20 is set to a value exceeding 1 (that is, speed increase ratio>1), preferably 2 or more, more preferably 3 or more. For example, the speed increase ratio can be set within a range of 3 to 5.

The rotational power of the engine 4 is input to the planetary gear 22 of the speed increasing mechanism 20, is transmitted from the planetary gear 22 to the sun gear 21, and is transmitted from the sun gear 21 to the first flywheel 13. In this way, the rotational power of the engine 4 is speed-increased and the speed-increased rotational power is transmitted to the first flywheel 13. As a result, the rotational speed of the first flywheel 13 is higher than the rotational speed (actual rotational speed) of the engine 4. (The rotational speed of the engine 4 refers to the actual rotational speed of the engine 4, unless otherwise specified.) In this way, large rotational energy can be accumulated in the first flywheel 13.

As described above, since the speed increasing mechanism 20 is provided on the first power transmission path 31, the first power transmission path 31 can speed-increase the rotational power of the engine 4 by the speed increasing mechanism 20 and transmit the speed-increased rotational power to the first flywheel 13.

On the other hand, the speed increasing mechanism 20 is not provided on the second power transmission path 32. If the second power transmission path 32 is a path passing the speed increasing mechanism 20 provided on the first power transmission path 31, the speed increasing mechanism 20 functions as a speed reduction mechanism. Specifically, the rotational power of the first flywheel 13 is input to the sun gear 21 and is transmitted to the transmission 16 via the planetary gear 22. Accordingly, the rotational power of the first flywheel 13 is speed-reduced, and the reduced-speed rotational power is transmitted to the transmission 16. On the other hand, in the present example embodiment of the present invention, the speed increasing mechanism 20 is not provided on the second power transmission path 32, and the rotational power of the first flywheel 13 is transmitted to the transmission 16 without being speed-reduced. It can therefore be said that no speed reduction mechanism is provided on the second power transmission path 32.

Since no speed reduction mechanism is provided on the second power transmission path 32 as described above, the second power transmission path 32 transmits the rotational power of the first flywheel 13 to the transmission 16 without causing the rotational power to pass a speed reduction mechanism. Therefore, the second power transmission path 32 can transmit the rotational power of the first flywheel 13 to the transmission 16 without decelerating the rotational power.

In the first to sixth example embodiments, the second power transmission path 32 is not provided with a mechanism to speed-increase the rotational power of the first flywheel 13 and transmit the speed-increased rotational power to the transmission 16, either. Accordingly, the rotational speed of the first flywheel 13 and a rotational speed input to an input shaft 16a of the transmission 16 are equal.

As can be said from the above, "the first power transmission path 31 and the second power transmission path 32 are independent of each other" means specifically that "the first power transmission path 31 is a path passing the speed increasing mechanism 20, whereas the second power transmission path 32 is a path that does not pass the speed increasing mechanism 20 provided on the first power transmission path 31".

However, a speed increasing mechanism different from the speed increasing mechanism 20 provided on the first power transmission path 31 (a speed increasing mechanism independent of the speed increasing mechanism 20) may be provided on the second power transmission path 32. In this case, the second power transmission path 32 can speed-increase the rotational power of the first flywheel 13 and transmit the speed-increased rotational power to the transmission 16. Accordingly, the rotational speed input to the input shaft 16a of the transmission 16 is higher than the rotational speed of the first flywheel 13.

As illustrated in FIGS. 3 to 8, the first power transmitter 11 includes a third power transmission path 33.

The third power transmission path 33 is a path that transmits the rotational power of the engine 4 to the transmission 16 without passing through the first flywheel 13. The third power transmission path 33 is a path that transmits the rotational power of the engine 4 to the transmission 16 without passing through the first clutch 26 and the second clutch 27. That is, the third power transmission path 33 is not provided with a clutch to selectively allow or interrupt transmission of power via the path. Accordingly, the third power transmission path 33 constantly connects the output shaft 4a of the engine 4 and the input shaft 16a of the transmission 16.

The third power transmission path 33 includes the intermediate shaft 17 interposed between the output shaft 4a of the engine 4 and the transmission 16. The intermediate shaft 17 extends through the through-hole 13d of the first flywheel 13. Accordingly, the third power transmission path 33 extends through the through-hole 13d of the first flywheel 13. The third power transmission path 33 linearly connects the output shaft 4a of the engine 4 and the input shaft 16a of the transmission 16 with the second flywheel 14 and the intermediate shaft 17 interposed therebetween.

One end (front end) of the intermediate shaft 17 is connected to the second flywheel 14. The other end (rear end) of the intermediate shaft 17 is connected to the input shaft 16a of the transmission 16. The intermediate shaft 17 thus connects the second flywheel 14 and the transmission 16.

As illustrated in FIG. 2, the first flywheel 13, the second flywheel 14, the first clutch 26, and the second clutch 27 are stored in the flywheel housing 9. The flywheel housing 9 includes a first wall 9a, a second wall 9b, and a peripheral wall 9c. The first wall 9a and the second wall 9b face each other. The first wall 9a is disposed close to the engine 4 (on a front side). The second flywheel 14 is disposed in the vicinity of an inner surface (rear surface) of the first wall 9a. The second wall 9b is disposed close to the transmission 16 (on a rear side). The transmission 16 is disposed in the vicinity of an outer surface (rear surface) of the second wall 9b. The peripheral wall 9c connects the first wall 9a and the second wall 9b. The peripheral wall 9c is provided so as to surround (provided radially outward of) the first flywheel 13, the second flywheel 14, the first clutch 26, and the second clutch 27.

The first flywheel 13 can rotate independently of the second flywheel 14. Specifically, the first flywheel 13 can rotate independently of the second flywheel 14 in a state where the first clutch 26 and the second clutch 27 are disengaged. In the state where the first clutch 26 and the second clutch 27 are disengaged, once the first flywheel 13 rotates, the first flywheel 13 can continue the rotation even when the second flywheel 14 is stopped.

The basic configuration of the first power transmitter 11 (the configuration common to all of the example embodiments) has been described above.

Next, the configuration of the second power transmitter 12 is described for understanding of the overall configuration of the power transmission mechanism 6 before configurations other than the basic configuration of the first power transmitter 11 are described.

Second Power Transmitter

The configuration of the second power transmitter 12 is described below with reference to FIG. 2.

The second power transmitter 12 includes the transmission 16.

The transmission 16 is a hydrostatic continuously variable transmission (Hydro Static Transmission (HST)). The transmission 16 includes a hydraulic pump P1 and a hydraulic motor M1. The hydraulic pump P1 and the hydraulic motor M1 are connected by a fluid passage (circulating fluid passage) through which a hydraulic fluid flows. The hydraulic pump P1 is a variable displacement pump that can change a delivery amount of hydraulic fluid. The hydraulic pump P1 delivers a hydraulic fluid by being driven by power input from the input shaft 16a of the transmission 16. The hydraulic motor M1 is driven by the hydraulic fluid delivered from the hydraulic pump P1. The hydraulic motor M1 can continuously adjust a drive speed by increasing or decreasing an amount of hydraulic fluid supplied from the hydraulic pump P1.

Rotational power is transmitted from the first power transmitter 11 to the transmission 16. The transmission 16 selectively receives the rotational power of the engine 4 or the rotational power of the engine 4 and the first flywheel 13, speed-changes the rotational power, and outputs the rotational power. That is, there are a case where the transmission 16 receives the rotational power of the engine 4, speed-changes the rotational power, and outputs the rotational power and a case where the transmission 16 receives the rotational power of the engine 4 and the first flywheel 13, speed-changes the rotational power, and outputs the rotational power.

Specifically, when the second clutch 27 is disengaged, the transmission 16 receives only the rotational power of the engine 4, speed-changes the rotational speed, and outputs the rotational power. In this case, the rotational power of the engine 4 is transmitted through the third power transmission path 33. When the second clutch 27 is engaged, the transmission 16 receives the rotational power of the engine 4 and the first flywheel 13, speed-changes the rotational power, and outputs the rotational power. In this case, the rotational power of the engine 4 is transmitted through the third power transmission path 33, and the rotational power of the first flywheel 13 is transmitted through the second power transmission path 32.

The transmission 16 includes a first output shaft 16b and a second output shaft 16c. The first output shaft 16b is a shaft that outputs power to the PTO shaft 8. The second output shaft 16c is a shaft that outputs power to the traveling device 3.

The second power transmitter 12 includes a clutch portion 41 and a transmission portion 42.

The clutch portion 41 includes a PTO clutch 43.

The PTO clutch 43 can selectively allow or interrupt passage of the rotational power output from the first output shaft 16b. When the PTO clutch 43 is engaged, the rotational power output from the first output shaft 16b can be taken out from a first transmission shaft 44, and the PTO shaft 8 can be rotated by the rotational power thus taken out. When the PTO clutch 43 is disengaged, the rotational power output from the first output shaft 16b is not taken out from the first transmission shaft 44, and therefore rotation of the PTO shaft 8 stops.

The transmission portion 42 includes a PTO transmission portion 45 and a traveling transmission portion 46.

The PTO transmission portion 45 can speed-change the rotational power taken out from the first transmission shaft 44 and output the rotational power to the PTO shaft 8. A first torque sensor 35 is provided between the PTO transmission portion 45 and the PTO shaft 8. Torque that acts on the PTO shaft 8 can be detected by the first torque sensor 35.

A power relay portion 40 is provided between the traveling transmission portion 46 and the second output shaft 16c. The power relay portion 40 transmits power output from the second output shaft 16c to the traveling transmission portion 46. A second transmission shaft 50 that takes out power from the power relay portion 40 includes a second torque sensor 36. Torque that acts on the second transmission shaft 50 can be detected by the second torque sensor 36.

The traveling transmission portion 46 speed-changes the rotational power transmitted from the second output shaft 16c of the transmission 16 via the second transmission shaft 50 and transmits the rotational power to the traveling device 3. The traveling transmission portion 46 includes a third rotational speed sensor 37. A rotational speed of the rotational power transmitted to the traveling device 3 can be detected by the third rotational speed sensor 37.

The traveling transmission portion 46 includes a gear transmission mechanism 48 and a differential gear 49. The gear transmission mechanism 48 can speed-change the rotational power taken out from the second transmission shaft 50 and transmit the rotational power to the differential gear 49. The differential gear 49 transmits the rotational power transmitted from the gear transmission mechanism 48 to the rear wheel 3R of the traveling device 3.

First Power Transmitter (Specific Configuration)

Next, a specific configuration of the first power transmitter 11 is described.

The specific configuration of the first power transmitter 11 varies among the first to sixth example embodiments illustrated in FIGS. 3 to 8 and is therefore described for each example embodiment.

First Example Embodiment

First, a specific configuration of the first power transmitter 11 according to the first example embodiment is described with reference to FIG. 3. Hereinafter, the first power transmitter 11 according to the first example embodiment is referred to as a "first power transmitter 11A".

In the first power transmitter 11A, the first clutch 26 and the second clutch 27 are arranged in the axial direction of the intermediate shaft 17 (the front-rear direction). The first clutch 26 is disposed close to the second flywheel 14 (on a front side). The second clutch 27 is disposed close to the transmission 16 (on a rear side). The first clutch 26 is disposed in the vicinity of the first wall 9a of the flywheel housing 9. The second clutch 27 is disposed in the vicinity of the second wall 9b of the flywheel housing 9. The second clutch 27 is disposed radially inward of the first flywheel 13.

The first clutch 26 is a single plate clutch and includes one first friction plate 26A and one second friction plate 26B.

The first friction plate 26A has a circular plate shape or a circular ring shape. The second friction plate 26B has a circular ring shape.

The first friction plate 26A of the first clutch 26 is attached to one end of the intermediate shaft 17 (close to the second flywheel 14) and is movable in the axial direction of the intermediate shaft 17. The second friction plate 26B of the first clutch 26 is attached to the planetary gear 22 of the speed increasing mechanism 20.

The second clutch 27 is also a single plate clutch and includes one first friction plate 27A and one second friction plate 27B. The first friction plate 27A has a circular plate shape or a circular ring shape. The second friction plate 27B has a circular ring shape.

The first friction plate 27A of the second clutch 27 is attached to the other end of the intermediate shaft 17 (close to the transmission 16) and is movable in the axial direction of the intermediate shaft 17. The second friction plate 27B of the second clutch 27 is attached to the first flywheel 13.

The first power transmission path 31 of the first power transmitter 11A is a path that transmits the rotational power of the engine 4 to the first flywheel 13 after transmitting the rotational power to the second flywheel 14, the intermediate shaft 17, the first clutch 26, the planetary gear 22, and the sun gear 21 in this order.

The second power transmission path 32 of the first power transmitter 11A is a path that transmits the rotational power of the first flywheel 13 to the transmission 16 after transmitting the rotational power to the second clutch 27 and the intermediate shaft 17 in this order.

The third power transmission path 33 of the first power transmitter 11A is a path that transmits the rotational power of the engine 4 to the transmission 16 through the intermediate shaft 17.

Operation of the first power transmitter 11A is described below.

The rotational power output from the output shaft 4a of the engine 4 is transmitted to the second flywheel 14. As a result, the second flywheel 14 rotates, and the intermediate shaft 17 connected to the second flywheel 14 also rotates. In this case, the rotational speed of the engine 4, the rotational speed of the second flywheel 14, and the rotational speed of the intermediate shaft 17 are identical. The rotational power transmitted from the output shaft 4a to the intermediate shaft 17 is transmitted from the intermediate shaft 17 to the input shaft 16a of the transmission 16.

In this way, the rotational power output from the output shaft 4a of the engine 4 is transmitted to the transmission 16 through the intermediate shaft 17 that defines the third power transmission path 33. The third power transmission path 33 constantly allows transmission of the rotational power therethrough irrespective of engaged/disengaged states of the first clutch 26 and the second clutch 27.

When the first clutch 26 is engaged and the second clutch 27 is disengaged, the rotational power output from the output shaft 4a of the engine 4 is transmitted to the first flywheel 13 through the first power transmission path 31. Specifically, the rotational power transmitted from the output shaft 4a of the engine 4 to the second flywheel 14 and the intermediate shaft 17 is transmitted from the first friction plate 26A of the first clutch 26 to the second friction plate 26B. As a result, the planetary gear 22 rotates, and the sun gear 21 rotates in response to the rotation of the planetary gear 22. Since the sun gear 21 is connected to the first flywheel 13, the first flywheel 13 rotates together with the sun gear 21. In this way, the rotational power of the engine 4 is transmitted to the first flywheel 13 through the first clutch 26 and the speed increasing mechanism 20.

The rotational power of the engine 4 is speed-increased while being transmitted from the planetary gear 22 to the sun gear 21. Accordingly, the rotational power of the engine 4 is speed-increased, and the speed-increased rotational power is transmitted to the first flywheel 13. Accordingly, the first flywheel 13 rotates at a rotational speed higher than the rotational speed of the engine 4. As a result, high rotational energy can be accumulated in the first flywheel 13.

When the first clutch 26 is disengaged and the second clutch 27 is engaged, the rotational power of the first flywheel 13 is transmitted to the transmission 16 through the second power transmission path 32. Specifically, the rotational power of the first flywheel 13 is transmitted from the second friction plate 27B of the second clutch 27 to the first friction plate 27A. As a result, the rotational power of the first flywheel 13 is transmitted from the first friction plate 27A to the intermediate shaft 17 and is transmitted from the intermediate shaft 17 to the input shaft 16a of the transmission 16. In this case, the rotational power of the first flywheel 13 is transmitted to the input shaft 16a of the transmission 16 without being speed-reduced (without passing a speed reduction mechanism).

According to the power transmission mechanism 6 including the first power transmitter 11A, the following effects can be produced.

When the first clutch 26 is engaged and the second clutch 27 is disengaged, the rotational power of the engine 4 can be speed-increased, and the speed-increased rotational power can be transmitted to the first flywheel 13. Therefore, high rotational energy can be accumulated in the first flywheel 13.

When the first clutch 26 is disengaged and the second clutch 27 is engaged, the rotational power of the first flywheel 13 can be transmitted to the transmission 16 without being speed-reduced. Therefore, the high rotational energy accumulated in the first flywheel 13 can be transmitted to the transmission 16. In this case, the rotational power output from the output shaft 4a of the engine 4 can also be transmitted to the transmission 16 through the third power transmission path 33. As a result, both of the rotational power of the engine 4 and the rotational power of the first flywheel 13 are transmitted to the transmission 16. Therefore, when the rotational power of the engine 4 is insufficient, for example, because a load of a working device connected to the PTO shaft 8 is large, the rotational power of the engine 4 can be effectively assisted by the rotational power of the first flywheel 13. This makes it possible to prevent or reduce a decrease in rotational speed of the engine 4 when the load of the working device connected to the PTO shaft 8 is large.

Each of the first power transmitters 11 according to the first to sixth example embodiments has unique characteristics, and the first power transmitter 11A according to the first example embodiment has the following characteristics.

In the case of the first power transmitter 11A according to the first example embodiment, the first clutch 26 is disposed in the vicinity of the first wall 9a of the flywheel housing 9, and the second clutch 27 is disposed in the vicinity of the second wall 9b of the flywheel housing 9. Accordingly, a fluid passage for supplying a hydraulic fluid to the first clutch 26 can be provided along the first wall 9a, and a fluid passage for supplying a hydraulic fluid to the second clutch 27 can be provided along the second wall 9b. This makes it easy to provide fluid passages for supplying a hydraulic fluid to the first clutch 26 and the second clutch 27. That is, the first power transmitter 11A according to the first example embodiment is advantageous ease of formation of a fluid passage.

Furthermore, by providing a shaft bearing on the first wall 9a of the flywheel housing 9, one end of the intermediate shaft 17 can be rotatably supported. Furthermore, by providing a shaft bearing on the second wall 9b of the flywheel housing 9, the other end of the intermediate shaft 17 or the input shaft 16a of the transmission 16 connected to the other end can be rotatably supported. This makes it possible to rotatably support both ends of the intermediate shaft 17 easily with certainty. That is, the first power transmitter 11A according to the first example embodiment is advantageous in ease of establishment of shaft support.

Furthermore, since the first clutch 26 and the second clutch 27 are single plate clutches, the clutches and a structure accompanying the clutches can be simplified, and the number of components can be reduced. That is, the first power transmitter 11A according to the first example embodiment is advantageous in reduction of the number of components.

Second Example Embodiment

Next, a specific configuration of the first power transmitter 11 according to the second example embodiment is described with reference to FIG. 4. Hereinafter, the first power transmitter 11 according to the second example embodiment is referred to as a "first power transmitter 11B".

In the first power transmitter 11B, the first clutch 26 and the second clutch 27 are disposed close to the transmission 16 (on a rear side) in the axial direction of the intermediate shaft 17 (the front-rear direction). Positions of the first clutch 26 and the second clutch 27 are shifted in the front-rear direction. Specifically, the first clutch 26 is disposed forward of the second clutch 27. A rear portion of the first clutch 26 and a front portion of the second clutch 27 overlap in the front-rear direction.

The first clutch 26 is disposed radially outward (far from the intermediate shaft 17). The second clutch 27 is disposed radially inward (close to the intermediate shaft 17). That is, the second clutch 27 is disposed radially inward of the first clutch 26.

The first clutch 26 is disposed radially inward of the first flywheel 13. The first clutch 26 overlaps the first flywheel 13 in the front-rear direction. Only a front portion of the second clutch 27 overlaps the first flywheel 13 in the front-rear direction.

The first clutch 26 is disposed radially inward of the speed increasing mechanism 20 (radially inward of the sun gear 21). The second clutch 27 is disposed forward of the speed increasing mechanism 20.

The first clutch 26 is a multiplate clutch and includes a plurality of first friction plates 26A and a plurality of second friction plates 26B. The first friction plate 26A and the second friction plate 26B are alternately disposed in the front-rear direction. The first friction plates 26A and the second friction plates 26B have a circular ring shape. The intermediate shaft 17 extends through centers of the first friction plates 26A and the second friction plates 26B.

The first friction plates 26A are attached to the first flywheel 13. The first friction plates 26A are movable in the axial direction of the intermediate shaft 17. The second friction plates 26B are attached to the sun gear 21 of the speed increasing mechanism 20.

The second clutch 27 is also multiplate clutch and includes a plurality of first friction plates 27A and a plurality of second friction plates 27B. The first friction plate 27A and the second friction plate 27B are alternately disposed in the front-rear direction. The first friction plates 27A and the second friction plates 27B have a circular ring shape. The intermediate shaft 17 extends through centers of the first friction plates 27A and the second friction plates 27B.

The first friction plates 27A are attached to the first flywheel 13. The first friction plates 27A are movable in the axial direction of the intermediate shaft 17. The second friction plates 27B are connected to the planetary gear 22 of the speed increasing mechanism 20.

The first power transmission path 31 of the first power transmitter 11B is a path that transmits the rotational power of the engine 4 to the first flywheel 13 after transmitting the rotational power to the second flywheel 14, the intermediate shaft 17, the planetary gear 22, the sun gear 21, and the first clutch 26 in this order.

The second power transmission path 32 of the first power transmitter 11B is a path that transmits the rotational power of the first flywheel 13 to the transmission 16 via the second clutch 27.

The third power transmission path 33 of the first power transmitter 11B is a path that transmits the rotational power of the engine 4 to the transmission 16 via the intermediate shaft 17. The third power transmission path 33 transmits the rotational power of the engine 4 to the transmission 16 without passing through the first clutch 26 and the second clutch 27.

Operation of the first power transmitter 11B is described below.

The rotational power output from the output shaft 4a of the engine 4 is transmitted to the second flywheel 14. As a result, the second flywheel 14 rotates, and the intermediate shaft 17 connected to the second flywheel 14 also rotates. In this case, the rotational speed of the engine 4, the rotational speed of the second flywheel 14, and the rotational speed of the intermediate shaft 17 are identical. The rotational power transmitted to the intermediate shaft 17 is transmitted to the input shaft 16a of the transmission 16.

In this way, the rotational power output from the output shaft 4a of the engine 4 is transmitted to the transmission 16 through the third power transmission path 33. The transmission of the rotational power through the third power transmission path 33 is constantly performed irrespective of engaged/disengaged states of the first clutch 26 and the second clutch 27.

When the first clutch 26 is engaged and the second clutch 27 is disengaged, the rotational power output from the output shaft 4a of the engine 4 is transmitted to the first flywheel 13 through the first power transmission path 31. Specifically, the rotational power transmitted from the engine 4 to the second flywheel 14 is transmitted from the second flywheel 14 to the planetary gear 22 via the intermediate shaft 17. As a result, the planetary gear 22 rotates, and the sun gear 21 rotates in response to the rotation of the planetary gear 22. The sun gear 21 is connected to the second friction plates 26B of the first clutch 26. Accordingly, the rotational power of the sun gear 21 is transmitted to the second friction plates 26B and is transmitted from the second friction plates 26B to the first flywheel 13 via the first friction plates 26A.

The rotational power of the engine 4 is speed-increased while being transmitted from the planetary gear 22 to the sun gear 21. That is, the rotational power of the engine 4 is speed-increased, and the speed-increased rotational power is transmitted to the first flywheel 13. Accordingly, the first flywheel 13 rotates at a rotational speed higher than the rotational speed of the engine 4. As a result, high rotational energy can be accumulated in the first flywheel 13.

When the first clutch 26 is disengaged and the second clutch 27 is engaged, the second power transmission path 32 is connected, and therefore the rotational power of the first flywheel 13 is transmitted to the transmission 16. Specifically, the rotational power of the first flywheel 13 is transmitted from the first friction plates 27A of the second clutch 27 to the second friction plates 27B. In this way, the rotational power of the first flywheel 13 is transmitted from the second friction plates 27B to the input shaft 16a of the transmission 16 via the intermediate shaft 17. In this case, the rotational power of the first flywheel 13 is transmitted to the input shaft 16a of the transmission 16 without being speed-reduced (without passing through a speed reduction mechanism). Accordingly, the high rotational energy of the first flywheel 13 can be input to the transmission 16 as it is.

When both of the first clutch 26 and the second clutch 27 are disengaged, the first power transmission path 31 and the second power transmission path 32 are shut off, and therefore the rotational power of the engine 4 is not transmitted to the first flywheel 13, and the rotational power of the first flywheel 13 is not transmitted to the transmission 16.

The first power transmitter 11B can produce effects equal to those of the first power transmitter 11A.

The first power transmitter 11B according to the second example embodiment has the following characteristics.

Since the first clutch 26 and the second clutch 27 are multiplate clutches, the first power transmitter 11B according to the second example embodiment can obtain high power transmission performance between the first friction plates 26A and 27A and the second friction plates 26B and 27B. Therefore, the first power transmitter 11B is better in power transmission performance of the clutch device 25 than the first power transmitter 1A.

Due to the advantageous power transmission performance of the clutch device 25, power can be transmitted to the first flywheel 13 with certainty, and high rotational energy can be accumulated in the first flywheel 13. Therefore, the first power transmitter 11B is better in rotational energy accumulation performance of the first flywheel 13 than the first power transmitter 1A.

Third Example Embodiment

Next, a specific configuration of the first power transmitter 11 according to the third example embodiment is described with reference to FIG. 5. Hereinafter, the first power transmitter 11 according to the third example embodiment is referred to as a "first power transmitter 11C".

In the first power transmitter 11C, the first clutch 26 and the second clutch 27 are arranged in a radial direction of the intermediate shaft 17 (a direction away from the axial center of the intermediate shaft 17). The first clutch 26 is disposed radially outward (far from the intermediate shaft 17). The second clutch 27 is disposed radially inward (close to the intermediate shaft 17). In other words, the second clutch 27 is disposed radially inward of the first clutch 26. The first clutch 26 and the second clutch 27 are disposed in the vicinity of the second wall 9b of the flywheel housing 9. Specifically, the first clutch 26 and the second clutch 27 are disposed so as to face the second wall 9b.

The first clutch 26 and the second clutch 27 are disposed between the first flywheel 13 and the transmission 16 in the front-rear direction. The first clutch 26 and the second clutch 27 are shifted from the first flywheel 13 in the front-rear direction. In other words, the first clutch 26 and the second clutch 27 do not overlap the first flywheel 13 in the front-rear direction. An external diameter of the clutch device 25 including the first clutch 26 and the second clutch 27 is smaller than an external diameter of the first flywheel 13.

The first clutch 26 is a multiplate clutch and includes a plurality of first friction plates 26A and a plurality of second friction plates 26B. The first friction plate 26A and the second friction plate 26B of the first clutch 26 are alternately arranged in the front-rear direction. The first friction plates 26A and the second friction plates 26B have a circular ring shape. The intermediate shaft 17 extends through centers of the first friction plates 26A and the second friction plates 26B.

The first friction plates 26A are attached to the intermediate shaft 17 and are movable in the axial direction of the intermediate shaft 17. The second friction plates 26B are attached to the planetary gear 22 of the speed increasing mechanism 20.

The second clutch 27 is also a multiplate clutch and includes a plurality of first friction plates 27A and a plurality of second friction plates 27B. The first friction plate 27A and the second friction plate 27B are alternately arranged in the front-rear direction. The first friction plates 27A and the second friction plates 27B have a circular ring shape. The intermediate shaft 17 extends through centers of the first friction plates 27A and the second friction plates 27B.

The first friction plates 27A are attached to the intermediate shaft 17 and are movable in the axial direction of the intermediate shaft 17. The second friction plates 27B are attached to the sun gear 21 of the speed increasing mechanism 20.

The first power transmission path 31 of the first power transmitter 11C is a path that transmits the rotational power of the engine 4 to the first flywheel 13 after transmitting the rotational power to the second flywheel 14, the intermediate shaft 17, the first clutch 26, the planetary gear 22, and the sun gear 21 in this order.

The second power transmission path 32 of the first power transmitter 11C is a path that transmits the rotational power of the first flywheel 13 to the transmission 16 after transmitting the rotational power to the second clutch 27 and the intermediate shaft 17 in this order.

The third power transmission path 33 of the first power transmitter 11C is a path that transmits the rotational power of the engine 4 to the transmission 16 via the intermediate shaft 17. The third power transmission path 33 transmits the rotational power of the engine 4 to the transmission 16 without passing through the first clutch 26 and the second clutch 27.

Operation of the first power transmitter 11C is described below.

The rotational power output from the output shaft 4a of the engine 4 is transmitted to the second flywheel 14. As a result, the second flywheel 14 rotates, and the intermediate shaft 17 connected to the second flywheel 14 also rotates. In this case, the rotational speed of the engine 4, the rotational speed of the second flywheel 14, and the rotational speed of the intermediate shaft 17 are identical. The rotational power transmitted from the output shaft 4a to the intermediate shaft 17 is transmitted from the intermediate shaft 17 to the input shaft 16a of the transmission 16.

In this way, the rotational power output from the output shaft 4a of the engine 4 is transmitted to the transmission 16 via the intermediate shaft 17 that defines the third power transmission path 33. The transmission of the rotational power through the third power transmission path 33 is constantly performed irrespective of engaged/disengaged states of the first clutch 26 and the second clutch 27.

When the first clutch 26 is engaged and the second clutch 27 is disengaged, the rotational power output from the output shaft 4a of the engine 4 is transmitted to the first flywheel 13 through the first power transmission path 31. Specifically, the rotational power transmitted from the output shaft 4a of the engine 4 to the second flywheel 14 and the intermediate shaft 17 is transmitted from the first friction plates 26A of the first clutch 26 to the second friction plates 26B. As a result, the planetary gear 22 rotates, and the sun gear 21 rotates in response to the rotation of the planetary gear 22. Since the sun gear 21 is connected to the first flywheel 13, the first flywheel 13 rotates together with the sun gear 21. In this way, the rotational power of the engine 4 is transmitted to the first flywheel 13 via the first clutch 26 and the speed increasing mechanism 20.

The rotational power of the engine 4 is speed-increased while being transmitted from the planetary gear 22 to the sun gear 21. That is, the rotational power of the engine 4 is speed-increased, and the speed-increased rotational power is transmitted to the first flywheel 13. Accordingly, the first flywheel 13 rotates at a rotational speed higher than the rotational speed of the engine 4. As a result, high rotational energy can be accumulated in the first flywheel 13.

When the first clutch 26 is disengaged and the second clutch 27 is engaged, the rotational power of the first flywheel 13 is transmitted to the transmission 16 through the second power transmission path 32. Specifically, the rotational power of the first flywheel 13 is transmitted from the second friction plates 27B of the second clutch 27 to the first friction plates 27A. As a result, the rotational power of the first flywheel 13 is transmitted from the first friction plates 27A to the intermediate shaft 17, and is transmitted from the intermediate shaft 17 to the input shaft 16a of the transmission 16. In this case, the rotational power of the first flywheel 13 is transmitted to the input shaft 16a of the transmission 16 without being speed-reduced (without passing through a speed reduction mechanism).

The first power transmitter 11C can produce effects equal to those of the first power transmitter 11A.

The first power transmitter 11C according to the third example embodiment has the following characteristics.

Since the first clutch 26 and the second clutch 27 are multiplate clutches, the first power transmitter 11C according to the third example embodiment can obtain high power transmission performance between the first friction plates 26A and 27A and the second friction plates 26B and 27B. That is, the first power transmitter 11C is advantageous in power transmission performance of the clutch device 25.

Since the first clutch 26 and the second clutch 27 are arranged in the radial direction of the intermediate shaft 17, both of the first clutch 26 and the second clutch 27 can be disposed in the vicinity of the second wall 9b of the flywheel housing 9. Accordingly, a fluid passage for supplying a hydraulic fluid to the first clutch 26 and a fluid passage for supplying a hydraulic fluid to the second clutch 27 can be provided along the second wall 9b. It is therefore easy to provide fluid passages for supplying a hydraulic fluid in the first clutch 26 and the second clutch 27. That is, the first power transmitter 11C is advantageous in ease of formation of a fluid passage.

By providing a shaft bearing on the first wall 9a of the flywheel housing 9, one end of the intermediate shaft 17 can be rotatably supported. By providing a shaft bearing on the second wall 9b of the flywheel housing 9, the other end of the intermediate shaft 17 or the input shaft 16a of the transmission 16 connected to the other end can be rotatably supported. This makes it possible to rotatably support both ends of the intermediate shaft 17 easily with certainty. That is, the first power transmitter 11C is advantageous in ease of establishment of shaft support.

Since the first clutch 26 and the second clutch 27 are arranged in the radial direction of the intermediate shaft 17 in the vicinity of the second wall 9b, common members can be used to support the first clutch 26 and the second clutch 27, and therefore the number of components can be reduced. That is, the first power transmitter 11C is advantageous in reduction of the number of components.

Fourth Example Embodiment

Next, a specific configuration of the first power transmitter 11 according to the fourth example embodiment is described with reference to FIG. 6. Hereinafter, the first power transmitter 11 according to the fourth example embodiment is referred to as a "first power transmitter 11D".

In the first power transmitter 11D, the first clutch 26 and the second clutch 27 are arranged in the axial direction of the intermediate shaft 17 (the front-rear direction). The first clutch 26 is disposed in a rear portion in the axial direction of the intermediate shaft 17 (close to the transmission 16). The second clutch 27 is disposed in a front portion in the axial direction of the intermediate shaft 17 (close to the second flywheel 14). The first clutch 26 is disposed in the vicinity of the second wall 9b of the flywheel housing 9. The second clutch 27 is disposed in the vicinity of the first wall 9a of the flywheel housing 9.

An external diameter of the first clutch 26 and an external diameter of the second clutch 27 are smaller than an external diameter of the first flywheel 13. The first clutch 26 and the second clutch 27 are disposed radially inward of the first flywheel 13. Specifically, the first clutch 26 and the second clutch 27 are disposed radially inward of the outer cylindrical portion 13a of the first flywheel 13.

The first clutch 26 is disposed between the speed increasing mechanism 20 and the transmission 16 in the front-rear direction. The speed increasing mechanism 20 is disposed between the first clutch 26 and the second clutch 27 in the front-rear direction.

The first clutch 26 and the second clutch 27 at least partially overlap the first flywheel 13 in the front-rear direction. Specifically, the second clutch 27 entirely overlaps the first flywheel 13 in the front-rear direction. A front portion of the first clutch 26 overlaps the first flywheel 13 in the front-rear direction.

The first clutch 26 is a multiplate clutch and includes a plurality of first friction plates 26A and a plurality of second friction plates 26B. The first friction plate 26A and the second friction plate 26B are alternately arranged in the front-rear direction. The first friction plates 26A and the second friction plates 26B have a circular ring shape. The intermediate shaft 17 extends through centers of the first friction plates 26A and the second friction plates 26B.

The first friction plates 26A are attached to the intermediate shaft 17 and are movable in the axial direction of the intermediate shaft 17. The second friction plates 26B are attached to the planetary gear 22 of the speed increasing mechanism 20.

The second clutch 27 is also a multiplate clutch and includes a plurality of first friction plates 27A and a plurality of second friction plates 27B. The first friction plate 27A and the second friction plate 27B are alternately arranged in the front-rear direction. The first friction plates 27A and the second friction plates 27B have a circular ring shape. The intermediate shaft 17 extends through centers of the first friction plates 27A and the second friction plates 27B.

The first friction plates 27A are attached to the intermediate shaft 17 and are movable in the axial direction of the intermediate shaft 17. The second friction plates 27B are attached to the first flywheel 13.

The first power transmission path 31 of the first power transmitter 11D is a path that transmits the rotational power of the engine 4 to the first flywheel 13 after transmitting the rotational power to the second flywheel 14, the intermediate shaft 17, the first clutch 26, the planetary gear 22, and the sun gear 21 in this order.

The second power transmission path 32 of the first power transmitter 11D is a path that transmits the rotational power of the first flywheel 13 to the transmission 16 after transmitting the rotational power to the second clutch 27 and the intermediate shaft 17 in this order.

The third power transmission path 33 of the first power transmitter 11D is a path that transmits the rotational power of the engine 4 to the transmission 16 via the intermediate shaft 17. The third power transmission path 33 transmits the rotational power of the engine 4 to the transmission 16 without passing through the first clutch 26 and the second clutch 27.

Operation of the first power transmitter 11D is described below.

The rotational power output from the output shaft 4a of the engine 4 is transmitted to the second flywheel 14. As a result, the second flywheel 14 rotates, and the intermediate shaft 17 connected to the second flywheel 14 also rotates. In this case, the rotational speed of the engine 4, the rotational speed of the second flywheel 14, and the rotational speed of the intermediate shaft 17 are identical. The rotational power transmitted from the output shaft 4a to the intermediate shaft 17 is transmitted from the intermediate shaft 17 to the input shaft 16a of the transmission 16.

In this way, the rotational power output from the output shaft 4a of the engine 4 is transmitted to the transmission 16 via the intermediate shaft 17 that defines the third power transmission path 33. The transmission of the rotational power through the third power transmission path 33 is constantly performed irrespective of engaged/disengaged states of the first clutch 26 and the second clutch 27.

When the first clutch 26 is engaged and the second clutch 27 is disengaged, the rotational power output from the output shaft 4a of the engine 4 is transmitted to the first flywheel 13 through the first power transmission path 31. Specifically, the rotational power transmitted from the output shaft 4a of the engine 4 to the second flywheel 14 and the intermediate shaft 17 is transmitted from the first friction plates 26A of the first clutch 26 to the second friction plates 26B. As a result, the planetary gear 22 rotates, and the sun gear 21 rotates in response to the rotation of the planetary gear 22. Since the sun gear 21 is connected to the first flywheel 13, the first flywheel 13 rotates together with the sun gear 21. In this way, the rotational power of the engine 4 is transmitted to the first flywheel 13 via the first clutch 26 and the speed increasing mechanism 20.

The rotational power of the engine 4 is speed-increased while being transmitted from the planetary gear 22 to the sun gear 21. That is, the rotational power of the engine 4 is speed-increased, and the speed-increased rotational power is transmitted to the first flywheel 13. Accordingly, the first flywheel 13 rotates at a rotational speed higher than the rotational speed of the engine 4. As a result, high rotational energy can be accumulated in the first flywheel 13.

When the first clutch 26 is disengaged and the second clutch 27 is engaged, the rotational power of the first flywheel 13 is transmitted to the transmission 16 through the second power transmission path 32. Specifically, the rotational power of the first flywheel 13 is transmitted from the second friction plates 27B of the second clutch 27 to the first friction plates 27A. In this way, the rotational power of the first flywheel 13 is transmitted from the first friction plates 27A to the intermediate shaft 17 and is transmitted from the intermediate shaft 17 to the input shaft 16a of the transmission 16. In this case, the rotational power of the first flywheel 13 is transmitted to the input shaft 16a of the transmission 16 without being speed-reduced (without passing through a speed reduction mechanism).

The first power transmitter 11D can produce effects equal to those of the first power transmitter 11A.

The first power transmitter 11D according to the fourth example embodiment has the following characteristics.

Since the first clutch 26 and the second clutch 27 are multiplate clutches, the first power transmitter 11D according to the fourth example embodiment can obtain high power transmission performance between the first friction plates 26A and 27A and the second friction plates 26B and 27B. That is, the first power transmitter 11D is advantageous in power transmission performance of the clutch device 25.

Furthermore, since the first clutch 26 and the second clutch 27 are multiplate clutches and are arranged in the axial direction of the intermediate shaft 17, the clutch device 25 can be reduced in external diameter and can be disposed radially inward of the first flywheel 13 while maintaining high power transmission performance. This makes it possible to prolong an axial length (a length in the front-rear direction) of the first flywheel 13. It is therefore possible to increase moment of inertia of the first flywheel 13 and increase rotational energy that can be accumulated in the first flywheel 13. That is, the first power transmitter 11D is advantageous in rotational energy accumulation performance of the first flywheel 13.

Since the first clutch 26 and the second clutch 27 are arranged in the axial direction of the intermediate shaft 17, the external diameter of the clutch device 25 including the first clutch 26 and the second clutch 27 can be reduced as compared with the first power transmitters 11B and 11C. This makes it possible to reduce drag torque (friction torque that causes corotation).

Since the first clutch 26 is disposed in the vicinity of the second wall 9b and the second clutch 27 is disposed in the vicinity of the first wall 9a, a fluid passage for supplying a hydraulic fluid to the first clutch 26 can be provided along the second wall 9b, and a fluid passage for supplying a hydraulic fluid to the second clutch 27 can be provided along the first wall 9a. It is therefore easy to provide fluid passages for supplying a hydraulic fluid to the first clutch 26 and the second clutch 27. That is, the first power transmitter 11D is advantageous in ease of formation of a fluid passage.

Fifth Example Embodiment

Next, a specific configuration of the first power transmitter 11 according to the fifth example embodiment is described with reference to FIG. 7. The first power transmitter 11 according to the fifth example embodiment is referred to as a "first power transmitter 11E".

A partition wall 9d is provided in the flywheel housing 9 in which the first power transmitter 11E according to the fifth example embodiment is stored. The partition wall 9d is provided between the first wall 9a and the second wall 9b.

One surface of the partition wall 9d faces the first wall 9a. The other surface of the partition wall 9d faces the second wall 9b.

The partition wall 9d partitions an inside of the flywheel housing 9 into a space 51 in which the first flywheel 13 is stored and a space 52 in which the first clutch 26 and the second clutch 27 are stored. Hereinafter, the space 51 in which the first flywheel 13 is stored is referred to as a "first space 51", and the space 52 in which the first clutch 26 and the second clutch 27 are stored is referred to as a "second space 52".

The first space 51 is provided in a front portion of the flywheel housing 9 (close to the engine 4). In the first space 51, the second flywheel 14 is stored in addition to the first flywheel 13. The second space 52 is provided in a rear portion of the flywheel housing 9 (close to the transmission 16). In the second space 52, the speed increasing mechanism 20 is stored in addition to the first clutch 26 and the second clutch 27.

In the first power transmitter 11E, the first clutch 26 and the second clutch 27 are arranged in the radial direction of the intermediate shaft 17 (a direction away from the axial center of the intermediate shaft 17). The first clutch 26 is disposed radially outward (far from the intermediate shaft 17). The second clutch 27 is disposed radially inward (close to the intermediate shaft 17). That is, the second clutch 27 is disposed radially inward of the first clutch 26.

The first clutch 26 and the second clutch 27 are disposed in the vicinity of the partition wall 9d of the flywheel housing 9. Specifically, the first clutch 26 and the second clutch 27 are disposed so as to face the partition wall 9d.

The first clutch 26 and the second clutch 27 are disposed between the first flywheel 13 and the transmission 16 in the front-rear direction. The first clutch 26 and the second clutch 27 are shifted from the first flywheel 13 in the front-rear direction. In other words, the first clutch 26 and the second clutch 27 do not overlap the first flywheel 13 in the front-rear direction. The first clutch 26 and the second clutch 27 are disposed between the first flywheel 13 and the speed increasing mechanism 20 in the front-rear direction.

The first clutch 26 is a multiplate clutch and includes a plurality of first friction plates 26A and a plurality of second friction plates 26B. The first friction plate 26A and the second friction plate 26B are alternately disposed in the front-rear direction. The first friction plates 26A and the second friction plates 26B have a circular ring shape. The intermediate shaft 17 extends through centers of the first friction plates 26A and the second friction plates 26B.

The first friction plates 26A are attached to the first flywheel 13. Specifically, the first friction plates 26A are attached to the first flywheel 13 with the support body 65 (see FIG. 11) interposed therebetween, which will be described later. The first friction plates 26A are movable in the axial direction of the intermediate shaft 17. The second friction plates 26B are attached to the sun gear 21 of the speed increasing mechanism 20. Specifically, the second friction plates 26B are attached to the sun gear 21 with an attachment assembly 69 (see FIG. 11) interposed therebetween, which will be described later.

The second clutch 27 is also multiplate clutch and includes a plurality of first friction plates 27A and a plurality of second friction plates 27B. The first friction plate 27A and the second friction plate 27B are alternately disposed in the front-rear direction. The first friction plates 27A and the second friction plates 27B have a circular ring shape. The intermediate shaft 17 extends through centers of the first friction plates 27A and the second friction plates 27B.

The first friction plates 27A are attached to the first flywheel 13. Specifically, the first friction plates 27A are attached to the first flywheel 13 with the support body 65 (FIG. 11) interposed therebetween, which will be described later. The first friction plates 27A are movable in the axial direction of the intermediate shaft 17. The second friction plates 27B are connected to the planetary gear 22 of the speed increasing mechanism 20. Specifically, the second friction plates 27B are connected to the planetary gear 22 with a connector 60 and a planetary carrier 24 interposed therebetween. The connector 60 connects the intermediate shaft 17 and the input shaft 16a of the transmission 16. The planetary carrier 24 supports the planetary gear 22.

The first power transmission path 31 of the first power transmitter 11E is a path that transmits the rotational power of the engine 4 to the first flywheel 13 after transmitting the rotational power to the second flywheel 14, the intermediate shaft 17, the connector 60, the planetary carrier 24, the planetary gear 22, the sun gear 21, and the first clutch 26 in this order.

The second power transmission path 32 of the first power transmitter 11E is a path that transmits the rotational power of the first flywheel 13 to the transmission 16 after transmitting the rotational power to the second clutch 27 and the connector 60 in this order.

The third power transmission path 33 of the first power transmitter 11E is a path that transmits the rotational power of the engine 4 to the transmission 16 via the intermediate shaft 17 and the connector 60. The third power transmission path 33 transmits the rotational power of the engine 4 to the transmission 16 without passing through the first clutch 26 and the second clutch 27.

Operation of the first power transmitter 11E is described below.

The rotational power output from the output shaft 4a of the engine 4 is transmitted to the second flywheel 14. As a result, the second flywheel 14 rotates, and the intermediate shaft 17 connected to the second flywheel 14 also rotates. In this case, the rotational speed of the engine 4, the rotational speed of the second flywheel 14, and the rotational speed of the intermediate shaft 17 are identical. The rotational power transmitted to the intermediate shaft 17 is transmitted to the input shaft 16a of the transmission 16 via the connector 60.

In this way, the rotational power output from the output shaft 4a of the engine 4 is transmitted to the transmission 16 through the third power transmission path 33. The transmission of the rotational power through the third power transmission path 33 is constantly performed irrespective of engaged/disengaged states of the first clutch 26 and the second clutch 27.

When the first clutch 26 is engaged and the second clutch 27 is disengaged, the rotational power output from the output shaft 4a of the engine 4 is transmitted to the first flywheel 13 through the first power transmission path 31. Specifically, the rotational power transmitted from the engine 4 to the second flywheel 14 is transmitted from the second flywheel 14 to the planetary gear 22 via the intermediate shaft 17, the connector 60, and the planetary carrier 24. As a result, the planetary gear 22 rotates, and the sun gear 21 rotates in response to the rotation of the planetary gear 22. The sun gear 21 is connected to the second friction plates 26B of the first clutch 26. Accordingly, the rotational power of the sun gear 21 is transmitted to the second friction plates 26B and is transmitted from the second friction plates 26B to the first flywheel 13 via the first friction plates 26A.

The rotational power of the engine 4 is speed-increased while being transmitted from the planetary gear 22 to the sun gear 21. That is, the rotational power of the engine 4 is speed-increased, and the speed-increased rotational power is transmitted to the first flywheel 13. Accordingly, the first flywheel 13 rotates at a rotational speed higher than the rotational speed of the engine 4. As a result, high rotational energy can be accumulated in the first flywheel 13.

When the first clutch 26 is disengaged and the second clutch 27 is engaged, the second power transmission path 32 is connected, and therefore the rotational power of the first flywheel 13 is transmitted to the transmission 16. Specifically, the rotational power of the first flywheel 13 is transmitted from the first friction plates 27A of the second clutch 27 to the second friction plates 27B. In this way, the rotational power of the first flywheel 13 is transmitted from the second friction plates 27B to the input shaft 16a of the transmission 16 via the connector 60. In this case, the rotational power of the first flywheel 13 is transmitted to the input shaft 16a of the transmission 16 without being speed-reduced (without passing through a speed reduction mechanism). Accordingly, the high rotational energy of the first flywheel 13 can be input to the transmission 16 as it is.

When both of the first clutch 26 and the second clutch 27 are disengaged, the first power transmission path 31 and the second power transmission path 32 are shut off, and therefore the rotational power of the engine 4 is not transmitted to the first flywheel 13, and the rotational power of the first flywheel 13 is not transmitted to the transmission 16.

The first power transmitter 11E can produce effects equal to those of the first power transmitter 11A.

The first power transmitter 11E according to the fifth example embodiment has the following characteristics.

Since the first clutch 26 and the second clutch 27 are multiplate clutches, the first power transmitter 11E according to the fifth example embodiment can obtain high power transmission performance between the first friction plates 26A and 27A and the second friction plates 26B and 27B. That is, the first power transmitter 11E is advantageous in power transmission performance of the clutch device 25.

Since the first clutch 26 and the second clutch 27 are arranged in the radial direction of the intermediate shaft 17, a length in the front-rear direction can be shortened. This makes it possible to prolong an axial length (a length in the front-rear direction) of the first flywheel 13. It is therefore possible to increase moment of inertia of the first flywheel 13 and increase rotational energy that can be accumulated in the first flywheel 13. That is, the first power transmitter 11E is advantageous in rotational energy accumulation performance of the first flywheel 13.

Since the first clutch 26 and the second clutch 27 face the partition wall 9d of the flywheel housing 9, a fluid passage for supplying a hydraulic fluid to the first clutch 26 and the second clutch 27 can be provided along the partition wall 9d. It is therefore easy to provide a fluid passage for supplying a hydraulic fluid to the first clutch 26 and the second clutch 27. That is, the first power transmitter 11E is advantageous in ease of formation of a fluid passage.

By providing a shaft bearing on the first wall 9a of the flywheel housing 9, one end of the intermediate shaft 17 can be rotatably supported. By providing a shaft bearing on the second wall 9b of the flywheel housing 9, the other end of the intermediate shaft 17 or the input shaft 16a of the transmission 16 connected to the other end can be rotatably supported. By providing a shaft bearing on the partition wall 9d, an intermediate portion of the intermediate shaft 17 can be rotatably supported. This makes it possible to rotatably support both ends and the intermediate portion of the intermediate shaft 17 easily with certainty. That is, the first power transmitter 11E is advantageous in ease of establishment of shaft support.

Since the first clutch 26 and the second clutch 27 are arranged in the radial direction of the intermediate shaft 17 in the vicinity of the partition wall 9d, common members can be used to support the first clutch 26 and the second clutch 27, and therefore the number of components can be reduced. That is, the first power transmitter 11E is advantageous in reduction of the number of components.

As described above, the first power transmitter 11E according to the fifth example embodiment is advantageous in power transmission performance, rotational energy accumulation performance, ease of formation of a fluid passage, ease of establishment of shaft support, and reduction in the number of components. It is therefore possible to achieve both characteristics concerning performance (power transmission performance, rotational energy accumulation performance) and characteristics concerning a structure (ease of formation of a fluid passage, ease of establishment of shaft support, and reduction in the number of components) at a high level in a well-balanced manner.

Sixth Example Embodiment

Next, a specific configuration of the first power transmitter 11 according to the sixth example embodiment is described with reference to FIG. 8. Hereinafter, the first power transmitter 11 according to the sixth example embodiment is referred to as a "first power transmitter 11F".

The partition wall 9d is provided in the flywheel housing 9 in which the first power transmitter 11F according to the sixth example embodiment is stored. The partition wall 9d is provided between the first wall 9a and the second wall 9b. One surface of the partition wall 9d faces the first wall 9a. The other surface of the partition wall 9d faces the second wall 9b.

The partition wall 9d partitions an inside of the flywheel housing 9 into the first space 51 in which the first flywheel 13 is stored and the second space 52 in which the first clutch 26 and the second clutch 27 are stored.

The first space 51 is provided in a front portion of the flywheel housing 9 (close to the engine 4). In the first space 51, the second flywheel 14 is stored in addition to the first flywheel 13. The second space 52 is provided in a rear portion of the flywheel housing 9 (close to the transmission 16). In the second space 52, the speed increasing mechanism 20 is stored in addition to the first clutch 26 and the second clutch 27.

In the first power transmitter 11F, the first clutch 26 and the second clutch 27 are arranged in the radial direction of the intermediate shaft 17 (a direction away from the axial center of the intermediate shaft 17). The first clutch 26 is disposed radially outward (far from the intermediate shaft 17). The second clutch 27 is disposed radially inward (close to the intermediate shaft 17). In other words, the second clutch 27 is disposed radially inward of the first clutch 26. The first clutch 26 and the second clutch 27 are disposed in the vicinity of the partition wall 9d of the flywheel housing 9. Specifically, the first clutch 26 and the second clutch 27 are disposed so as to face the partition wall 9d.

The first clutch 26 and the second clutch 27 are disposed between the first flywheel 13 and the transmission 16 in the front-rear direction. The first clutch 26 and the second clutch 27 are shifted from the first flywheel 13 in the front-rear direction. In other words, the first clutch 26 and the second clutch 27 do not overlap the first flywheel 13 in the front-rear direction. The first clutch 26 and the second clutch 27 are disposed between the first flywheel 13 and the speed increasing mechanism 20 in the front-rear direction.

The first clutch 26 is a multiplate clutch and includes a plurality of first friction plates 26A and a plurality of second friction plates 26B. The first friction plate 26A and the second friction plate 26B are alternately disposed in the front-rear direction. The first friction plates 26A and the second friction plates 26B have a circular ring shape. The intermediate shaft 17 extends through centers of the first friction plates 26A and the second friction plates 26B.

The first friction plates 26A are attached to the first flywheel 13 and are movable in the axial direction of the intermediate shaft 17. The second friction plates 26B are attached to the sun gear 21 of the speed increasing mechanism 20.

The second clutch 27 is also multiplate clutch and includes a plurality of first friction plates 27A and a plurality of second friction plates 27B. The first friction plate 27A and the second friction plate 27B are alternately disposed in the front-rear direction. The first friction plates 27A and the second friction plates 27B have a circular ring shape. The intermediate shaft 17 extends through centers of the first friction plates 27A and the second friction plates 27B.

The first friction plates 27A are attached to the first flywheel 13 and are movable in the axial direction of the intermediate shaft 17. The second friction plates 27B are attached to the planetary gear 22 of the speed increasing mechanism 20. The second friction plates 27B are connected to the planetary gear 22 of the speed increasing mechanism 20 with the connector 60 and the planetary carrier 24 interposed therebetween. The connector 60 connects the intermediate shaft 17 and the input shaft 16a of the transmission 16. The planetary carrier 24 supports the planetary gear 22. The second friction plates 27B are disposed radially outward of the first friction plates 27A.

The first power transmission path 31 of the first power transmitter 11F is a path that transmits the rotational power of the engine 4 to the first flywheel 13 after transmitting the rotational power to the second flywheel 14, the intermediate shaft 17, the connector 60, the planetary carrier 24, the planetary gear 22, the sun gear 21, and the first clutch 26 in this order.

The second power transmission path 32 of the first power transmitter 11F is a path that transmits the rotational power of the first flywheel 13 to the transmission 16 after transmitting the rotational power to the second clutch 27 and the connector 60 in this order.

The third power transmission path 33 of the first power transmitter 11F is a path that transmits the rotational power of the engine 4 to the transmission 16 via the connector 60 and the intermediate shaft 17. The third power transmission path 33 transmits the rotational power of the engine 4 to the transmission 16 without passing through the first clutch 26 and the second clutch 27.

Operation of the first power transmitter 11F is described below.

The rotational power output from the output shaft 4a of the engine 4 is transmitted to the second flywheel 14. As a result, the second flywheel 14 rotates, and the intermediate shaft 17 connected to the second flywheel 14 also rotates. In this case, the rotational speed of the engine 4, the rotational speed of the second flywheel 14, and the rotational speed of the intermediate shaft 17 are identical. The rotational power transmitted to the intermediate shaft 17 is transmitted to the input shaft 16a of the transmission 16 via the connector 60.

In this way, the rotational power output from the output shaft 4a of the engine 4 is transmitted to the transmission 16 through the third power transmission path 33. The transmission of the rotational power through the third power transmission path 33 is constantly performed irrespective of engaged/disengaged states of the first clutch 26 and the second clutch 27.

When the first clutch 26 is engaged and the second clutch 27 is disengaged, the rotational power output from the output shaft 4a of the engine 4 is transmitted to the first flywheel 13 through the first power transmission path 31. Specifically, the rotational power of the engine 4 is transmitted from the second flywheel 14 to the planetary gear 22 via the intermediate shaft 17, the connector 60, and the planetary carrier 24. As a result, the planetary gear 22 rotates, and the sun gear 21 rotates in response to the rotation of the planetary gear 22. The sun gear 21 is connected to the second friction plates 26B of the first clutch 26. Accordingly, the rotational power transmitted to the sun gear 21 is transmitted from the second friction plates 26B to the first friction plates 26A and is transmitted from the first friction plates 26A to the first flywheel 13.

The rotational power of the engine 4 is speed-increased while being transmitted from the planetary gear 22 to the sun gear 21. That is, the rotational power of the engine 4 is speed-increased, and the speed-increased rotational power is transmitted to the first flywheel 13. Accordingly, the first flywheel 13 rotates at a rotational speed higher than the rotational speed of the engine 4. As a result, high rotational energy can be accumulated in the first flywheel 13.

When the first clutch 26 is disengaged and the second clutch 27 is engaged, the second power transmission path 32 is connected, and therefore the rotational power of the first flywheel 13 is transmitted to the transmission 16. Specifically, the rotational power of the first flywheel 13 is transmitted from the first friction plates 27A of the second clutch 27 to the second friction plates 27B. In this way, the rotational power of the first flywheel 13 is transmitted from the second friction plates 27B to the input shaft 16a of the transmission 16 via the connector 60. In this case, the rotational power of the first flywheel 13 is transmitted to the input shaft 16a of the transmission 16 without being speed-reduced (without passing through a speed reduction mechanism). Accordingly, the high rotational energy of the first flywheel 13 can be input to the transmission 16 as it is.

When both of the first clutch 26 and the second clutch 27 are disengaged, the first power transmission path 31 and the second power transmission path 32 are shut off, and therefore the rotational power of the engine 4 is not transmitted to the first flywheel 13, and the rotational power of the first flywheel 13 is not transmitted to the transmission 16.

The first power transmitter 11F can produce effects equal to those of the first power transmitter 11A.

The first power transmitter 11F according to the sixth example embodiment has the following characteristics.

Since the first clutch 26 and the second clutch 27 are multiplate clutches, the first power transmitter 11F according to the sixth example embodiment can obtain high power transmission performance between the first friction plates 26A and 27A and the second friction plates 26B and 27B. That is, the first power transmitter 11F is advantageous in power transmission performance of the clutch device 25.

Since the first clutch 26 and the second clutch 27 are arranged in the radial direction of the intermediate shaft 17, a length in the front-rear direction can be shortened. This makes it possible to prolong an axial length (a length in the front-rear direction) of the first flywheel 13. It is therefore possible to increase moment of inertia of the first flywheel 13 and increase rotational energy that can be accumulated in the first flywheel 13. That is, the first power transmitter 11F is advantageous in rotational energy accumulation performance of the first flywheel 13.

Since the first clutch 26 and the second clutch 27 face the partition wall 9*d* of the flywheel housing 9, a fluid passage for supplying a hydraulic fluid to the first clutch 26 and the second clutch 27 can be provided along the partition wall 9*d*. It is therefore easy to provide a fluid passage for supplying a hydraulic fluid to the first clutch 26 and the second clutch 27. That is, the first power transmitter 11F is advantageous in ease of formation of a fluid passage.

By providing a shaft bearing on the first wall 9*a* of the flywheel housing 9, one end of the intermediate shaft 17 can be rotatably supported. By providing a shaft bearing on the second wall 9*b* of the flywheel housing 9, the other end of the intermediate shaft 17 or the input shaft 16*a* of the transmission 16 connected to the other end can be rotatably supported. By providing a shaft bearing on the partition wall 9*d*, an intermediate portion of the intermediate shaft 17 can be rotatably supported. This makes it possible to rotatably support both ends and the intermediate portion of the intermediate shaft 17 easily with certainty. That is, the first power transmitter 11F is advantageous in ease of establishment of shaft support.

Since the first clutch 26 and the second clutch 27 are arranged in the radial direction of the intermediate shaft 17 in the vicinity of the partition wall 9*d*, common members can be used to support the first clutch 26 and the second clutch 27, and therefore the number of components can be reduced. That is, the first power transmitter 11F is advantageous in reduction of the number of components.

As described above, the first power transmitter 11F according to the sixth example embodiment is advantageous in power transmission performance, rotational energy accumulation performance, ease of formation of a fluid passage, ease of establishment of shaft support, and reduction in the number of components. It is therefore possible to achieve both characteristics concerning performance (power transmission performance, rotational energy accumulation performance) and characteristics concerning a structure (ease of formation of a fluid passage, ease of establishment of shaft support, and reduction in the number of components) in a well-balanced manner.

However, the fifth example embodiment is better in terms of ease of formation of a fluid passage, ease of establishment of shaft support, and reduction in the number of components. This results from a difference in specific configuration of the clutch device 25 between the fifth example embodiment and the sixth example embodiment.

In the sixth example embodiment (see FIG. 8), a portion that supports the first friction plates 26A, a portion that supports the second friction plates 26B, a portion that supports the second friction plates 27B, and a portion that supports the first friction plates 27A are arranged in this order from a radially outward side (a side far from the axial center of the intermediate shaft 17) to a radially inward side (a side close to the axial center of the intermediate shaft 17). On the other hand, in the fifth example embodiment (see FIG. 7), a portion that supports the first friction plates 26A, a portion that supports the second friction plates 26B, a portion that supports the first friction plates 27A, and a portion that supports the second friction plates 27B are arranged in this order from the radially outward side to the radially inward side.

Due to this difference in configuration, the fifth example embodiment can simplify a support structure for the clutch device 25 and reduce the number of components as compared with the sixth example embodiment. Furthermore, in the fifth example embodiment, it is easier to form a fluid passage for supplying a hydraulic fluid to the first clutch 26 and the second clutch 27 than in the sixth example embodiment.

In the fifth example embodiment, a portion 80 (see FIG. 7) extending rearward from the inner cylindrical portion 13*b* of the first flywheel 13 along the intermediate shaft 17 can be provided radially inward of the portion that supports the second friction plates 26B, and a shaft bearing (a fifth shaft bearing 66 (see FIG. 11), which will be described later) can be disposed on the portion 80. This makes it possible to rotatably support the intermediate shaft 17 easily with certainty. Note that the portion 80 corresponds to a rear portion of the support body 65 (see FIG. 11), which will be described later.

Detailed Configuration of Fifth Example Embodiment

Next, a detailed configuration of the first power transmitter 11E according to the fifth example embodiment, which is an especially example embodiment, among the first power transmitters 11 according to the first to sixth example embodiments is described with reference to FIGS. 10 and 11.

Figure 10:
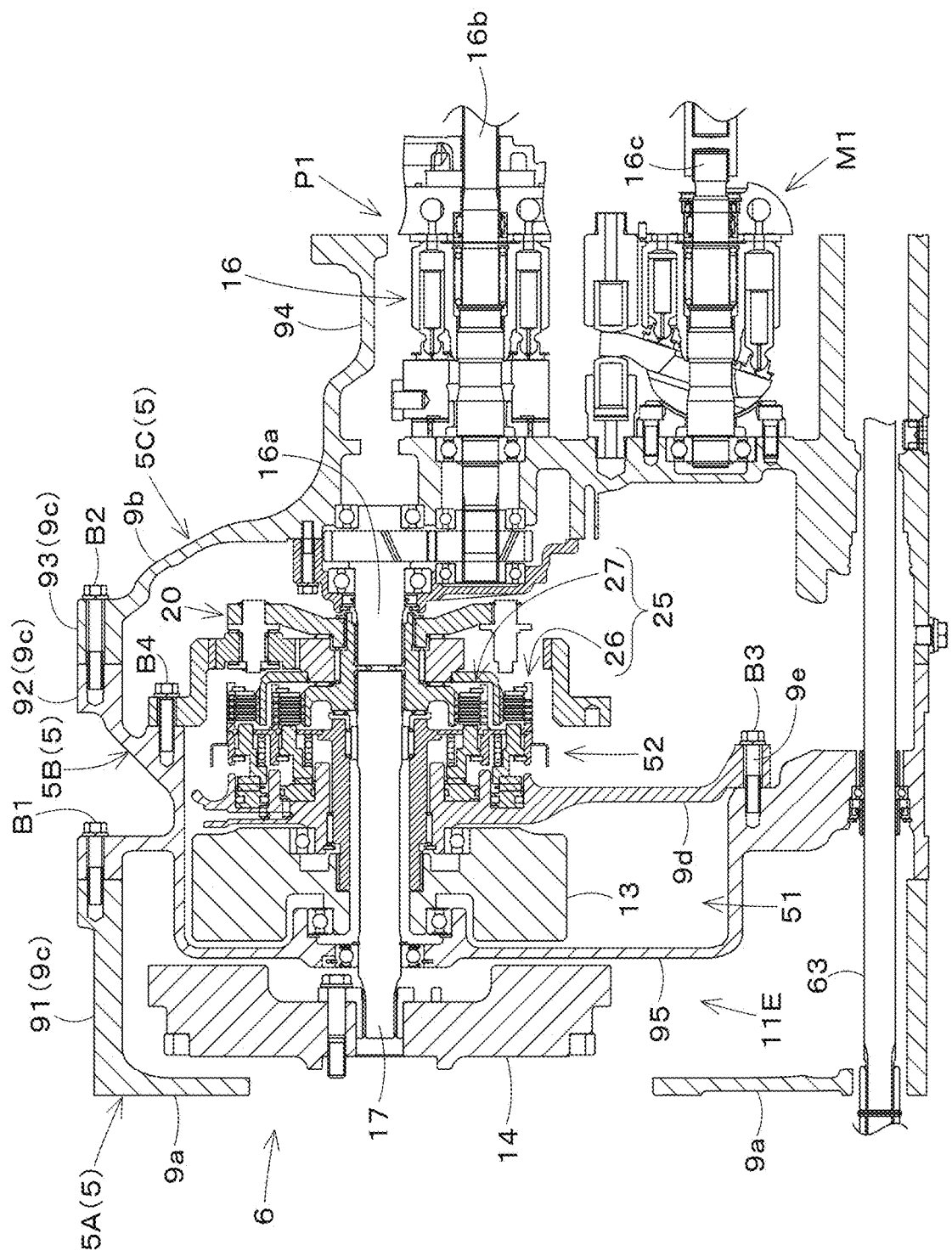
FIG. 10 is a cross-sectional view illustrating a power transmission mechanism including the first power transmitter according to the fifth example embodiment and a portion of a power transmission case in which the power transmission mechanism is stored.

FIG. 10 is a cross-sectional view illustrating the power transmission mechanism 6 including the first power transmitter 11E according to the fifth example embodiment and a portion of the power transmission case 5 in which the power transmission mechanism 6 is stored. FIG. 11 is an enlarged view of a portion of FIG. 10.

As illustrated in FIG. 10, the power transmission case 5 includes a front section 5A, an intermediate section 5B, and a rear section 5C. The front section 5A is located in a front portion of the power transmission case 5. The intermediate section 5B is connected to a rear portion of the front section 5A. The rear section 5C is connected to a rear portion of the intermediate section 5B.

In a lower portion of the power transmission case 5, a front wheel drive shaft 63 for transmitting rotational power to the front wheel 3F penetrates the power transmission case 5. The front wheel drive shaft 63 extends in the front-rear direction so as to penetrate the front section 5A, the intermediate section 5B, and the rear section 5C.

The front section 5A, the intermediate section 5B, and a front portion of the rear section 5C define the flywheel housing 9. A rear portion of the rear section 5C defines a front portion of the transmission case 10. The rear section 5C serves as both a rear portion of the flywheel housing 9 and a front portion of the transmission case 10.

The front section 5A includes a first cylindrical portion 91 and the first wall 9*a*. The first cylindrical portion 91 covers the second flywheel 14. The first wall 9*a* is the first wall 9*a* of the flywheel housing 9 and is disposed forward of the second flywheel 14.

The intermediate section 5B includes a second cylindrical portion 92 and an intermediate wall 95. The second cylindrical portion 92 is connected to a rear portion of the first cylindrical portion 91 of the front section 5A. Specifically, the second cylindrical portion 92 is connected to the rear portion of the first cylindrical portion 91 with the use of a bolt B1. The second cylindrical portion 92 covers the first flywheel 13 and a front portion of the clutch device 25 (the first clutch 26 and the second clutch 27). The intermediate wall 95 is provided between the first flywheel 13 and the second flywheel 14. The intermediate wall 95 partitions the first space 51 into a space in which the first flywheel 13 is disposed and a space in which the second flywheel 14 is disposed.

The rear section 5C includes a third cylindrical portion 93, the second wall 9b, and a fourth cylindrical portion 94. The third cylindrical portion 93 is connected to a rear portion of the second cylindrical portion 92 of the intermediate section 5B. Specifically, the third cylindrical portion 93 is connected to the rear portion of the second cylindrical portion 92 with the use of a bolt B2. The third cylindrical portion 93 covers the speed increasing mechanism 20. The second wall 9b is the second wall 9b of the flywheel housing 9 and disposed rearward of the speed increasing mechanism 20.

The first cylindrical portion 91, the second cylindrical portion 92, and the third cylindrical portion 93 define the peripheral wall 9c of the flywheel housing 9. The inside of the flywheel housing 9 is partitioned into the first space 51 and the second space 52 by the partition wall 9d.

As illustrated in FIG. 10, the partition wall 9d is fixed to the intermediate wall 95. Specifically, the intermediate wall 95 is fixed to the partition wall 9d with the use of a bolt B3 inserted into an attachment hole 9e (see FIG. 12) formed in the partition wall 9d.

Figure 11:
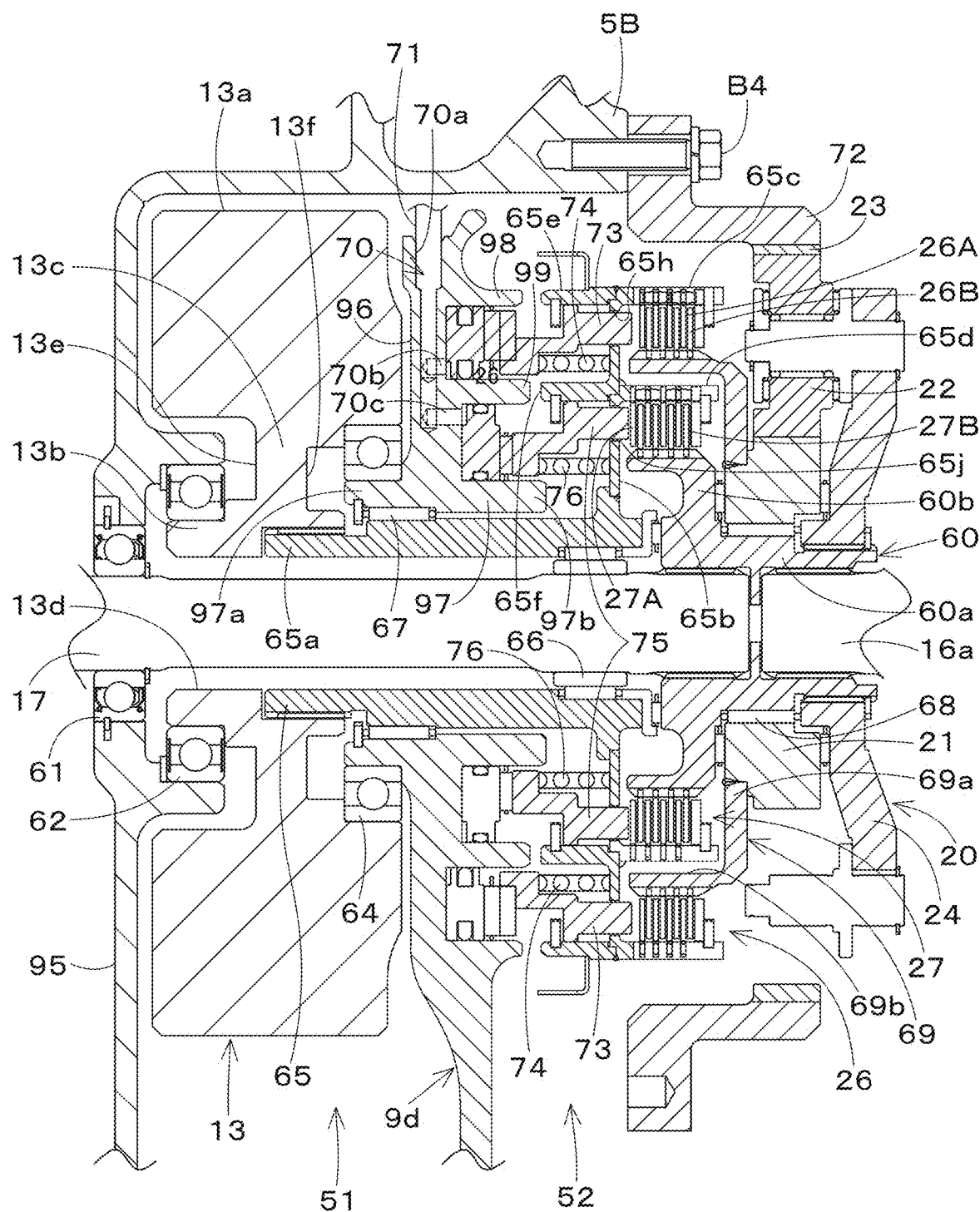
FIG. 11 is an enlarged view of a portion of FIG. 10.

As illustrated in FIG. 11, a first shaft bearing 61 and a second shaft bearing 62 are attached to the intermediate wall 95. The first shaft bearing 61 rotatably supports a front portion of the intermediate shaft 17. The second shaft bearing 62 rotatably supports a front portion of the first flywheel 13.

Figure 12:
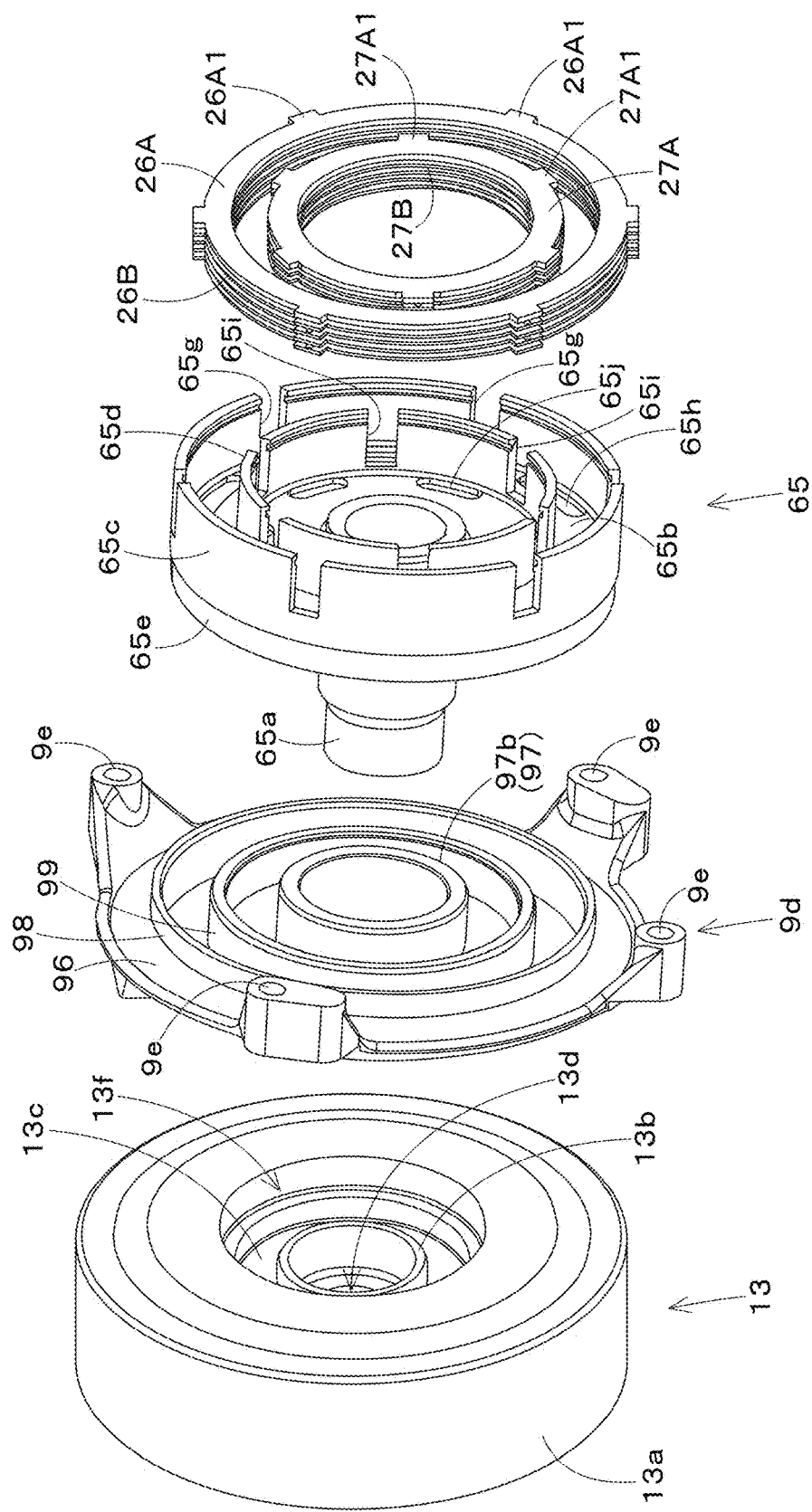
FIG. 12 is a perspective view illustrating a first flywheel, a partition wall, a support body, a first friction plate, and a second friction plate.

As illustrated in FIGS. 11 and 12, the first flywheel 13 includes the outer cylindrical portion 13a, the inner cylindrical portion 13b, and the coupling portion 13c. A length of the coupling portion 13c in the front-rear direction is smaller than a length of the outer cylindrical portion 13a and a length of the inner cylindrical portion 13b in the front-rear direction. That is, a thickness of the coupling portion 13c is smaller than a thickness of the outer cylindrical portion 13a and a thickness of the inner cylindrical portion 13b.

The first flywheel 13 includes a first recessed portion 13e and a second recessed portion 13f. The first recessed portion 13e is recessed at a position forward of the coupling portion 13c and between the outer cylindrical portion 13a and the inner cylindrical portion 13b. The second recessed portion 13f is recessed at a position rearward of the coupling portion 13c and between the outer cylindrical portion 13a and the inner cylindrical portion 13b.

The second shaft bearing 62 is disposed in the first recessed portion 13e. A third shaft bearing 64 is disposed in the second recessed portion 13f. The first flywheel 13 is rotatably supported by the second shaft bearing 62 and the third shaft bearing 64.

As illustrated in FIG. 11, the support body 65 is disposed radially outward of the intermediate shaft 17. The support body 65 supports the first flywheel 13 so that the first flywheel 13 is rotatable with respect to the intermediate shaft 17. As illustrated in FIGS. 11 and 12, the support body 65 includes a first section 65a, a second section 65b, a third section 65c, a fourth section 65d, a fifth section 65e, and a sixth section 65f.

The first section 65a has a cylindrical shape, and the intermediate shaft 17 extends through the first section 65a. A rear portion of the first section 65a is supported on the fifth shaft bearing 66 attached to an outer circumferential surface of the intermediate shaft 17. The support body 65 is thus rotatable relative to the intermediate shaft 17. An intermediate portion of the first section 65a in the front-rear direction is supported on a sixth shaft bearing 67 attached to an inner circumferential surface of the partition wall 9d. The support body 65 is thus rotatable relative to the partition wall 9d. The first flywheel 13 is attached to a front portion of the first section 65a. The first flywheel 13 and the front portion of the support body 65 are splined to each other. Accordingly, the first flywheel 13 is rotatable with respect to the intermediate shaft 17 and the partition wall 9d integrally with the support body 65.

The second section 65b extends outward (away from the intermediate shaft 17) from a rear portion of the first section 65a. The second section 65b has a circular plate shape. The third section 65c extends rearward from an outer circumferential end of the second section 65b. The third section 65c has a cylindrical shape. The fourth section 65d extends rearward from between the outer circumferential end and an inner circumferential end of the second section 65b. The fourth section 65d has a cylindrical shape having a diameter smaller than the third section 65c. The fourth section 65d is disposed radially inward of the third section 65c.

The fifth section 65e extends forward from the outer circumferential end of the second section 65b. The fifth section 65e has a cylindrical shape. A diameter of the fifth section 65e is substantially equal to the diameter of the third section 65c. The sixth section 65f extends forward from between the outer circumferential end and the inner circumferential end of the second section 65b. The sixth section 65f has a cylindrical shape having a diameter smaller than the fifth section 65e. The diameter of the sixth section 65f is substantially equal to the diameter of the fourth section 65d.

As illustrated in FIGS. 11 and 12, the partition wall 9d includes a wall portion 96, a cylinder portion 97, a first protruding portion 98, and a second protruding portion 99. The wall portion 96 has a circular plate shape and separates the first flywheel 13 and the clutch device 25. As illustrated in FIG. 11, the wall portion 96 has a fluid passage 70 for supplying a hydraulic fluid to the clutch device 25. A supply pipe 71 is connected to the fluid passage 70. A hydraulic fluid can be supplied from an outside of the flywheel housing 9 to the fluid passage 70 through the supply pipe 71.

The fluid passage 70 includes a main fluid passage 70a, a first branch fluid passage 70b, and a second branch fluid passage 70c. The main fluid passage 70a extends from a radially outward side to a radially inward side of the partition wall 9d. The supply pipe 71 is connected to a radially outward end portion of the main fluid passage 70a. The first branch fluid passage 70b and the second branch fluid passage 70c branch from the main fluid passage 70a and extend rearward.

The main fluid passage 70a is a passage that receives a hydraulic fluid from an outside of the flywheel housing 9 through the supply pipe 71. The first branch fluid passage 70b is a fluid passage that supplies, to the first clutch 26, a hydraulic fluid supplied to the main fluid passage 70a. The second branch fluid passage 70c is a fluid passage that supplies, to the second clutch 27, a hydraulic fluid supplied to the main fluid passage 70a.

The cylinder portion 97 has a cylindrical shape. The sixth shaft bearing 67 is interposed between an inner circumferential surface of the cylinder portion 97 and an outer circumferential surface of the first section 65a of the support body 65. The cylinder portion 97 includes a front cylinder portion 97a extending forward from an inner circumferential end of the wall portion 96 and a rear cylinder portion 97b extending rearward from the inner circumferential end of the wall portion 96. The third shaft bearing 64 is interposed between an outer circumferential surface of the front cylinder portion 97a and the first flywheel 13.

The first protruding portion 98 extends rearward from the wall portion 96. The first protruding portion 98 has a cylindrical shape. The second protruding portion 99 extends rearward from between the outer circumferential end and the inner circumferential end of the wall portion 96. The second protruding portion 99 has a cylindrical shape having a diameter smaller than the first protruding portion 98. The second protruding portion 99 is disposed radially inward of the first protruding portion 98.

As illustrated in FIG. 11, the intermediate shaft 17 and the input shaft 16a of the transmission 16 are connected by the connector 60. An outer spline is provided on an outer circumferential surface of a rear portion of the intermediate shaft 17 and an outer circumferential surface of a front portion of the input shaft 16a. An inner spline is provided on an inner circumferential surface of the connector 60. The outer spline and the inner spline are engaged, and thus the intermediate shaft 17 and the input shaft 16a are connected by the connector 60. The connector 60, the intermediate shaft 17, and the input shaft 16a thus rotate integrally.

The connector 60 is disposed rearward of the support body 65. The connector 60 includes a connection portion 60a having a cylindrical shape and an extension 60b that extends outward (away from the intermediate shaft 17) from a front portion of the connection portion 60a and then extends forward. The inner spline is provided on an inner circumferential surface of the connection portion 60a. An outer end portion of the extension 60b has a cylindrical shape having a diameter larger than the connection portion 60a. An outer circumferential surface of the extension 60b faces an inner circumferential surface of the fourth section 65d.

The sun gear 21 of the speed increasing mechanism 20 is supported on the outer circumferential surface of the connection portion 60a with a seventh shaft bearing 68 interposed therebetween. The sun gear 21 is thus rotatable relative to the connector 60. The attachment assembly 69 is fixed to the sun gear 21. The attachment assembly 69 includes a fixed portion 69a fixed to the sun gear 21 and a forward extension 69b extending forward from the fixed portion 69a. The fixed portion 69a has a circular plate shape. The forward extension 69b has a cylindrical shape.

The planetary gear 22 of the speed increasing mechanism 20 is supported by the planetary carrier 24. An inner spline is provided on an inner circumferential surface of the planetary carrier 24. The inner spline of the planetary carrier 24 is engaged with an outer spline provided on the outer circumferential surface of the connection portion 60a. The planetary carrier 24 is thus rotatable together with the connector 60 and the intermediate shaft 17.

The ring gear 23 of the speed increasing mechanism 20 is attached to a ring support body 72. The ring support body 72 is fixed to the intermediate section 5B of the flywheel housing 9. Specifically, the ring support body 72 is fixed to the intermediate section 5B with the use of a bolt B4. The ring gear 23 is thus non-rotatably fixed to the flywheel housing 9.

The first friction plates 26A and the second friction plates 26B of the first clutch 26 are disposed rearward of the second section 65b of the support body 65. The first friction plates 26A and the second friction plates 26B are disposed between the third section 65c of the support body 65 and the forward extension 69b of the attachment assembly 69.

The first friction plates 26A of the first clutch 26 has a circular ring shape, and outer circumferential portions thereof are supported on the third section 65c of the support body 65. Specifically, a plurality of protrusions 26A1 (see FIG. 12) provided on an outer circumference of each of the first friction plates 26A are fitted in a plurality of cutouts 65g (see FIG. 12) provided in the third section 65c. The first friction plates 26A are thus non-rotatable with respect to the support body 65 and are movable along the cutouts 65g in the front-rear direction.

The second friction plates 26B of the first clutch 26 have a circular ring shape, and inner circumferential portions thereof are supported on the forward extension 69b of the attachment assembly 69. The second friction plates 26B are immovably fixed to the forward extension 69b.

A hydraulic piston 73 (hereinafter referred to as a "first hydraulic piston 73") of the first clutch 26 is disposed between the partition wall 9d and the second section 65b of the support body 65. Specifically, the first hydraulic piston 73 is disposed in a space surrounded by the wall portion 96, the first protruding portion 98, and the second protruding portion 99 of the partition wall 9d and the second section 65b, the fifth section 65e, and the sixth section 65f of the support body 65. The second section 65b of the support body 65 has an opening 65h (see FIGS. 11 and 12), and a leading end portion of the first hydraulic piston 73 protrudes from the opening 65h. The leading end portion of the first hydraulic piston 73 is in proximity to a foremost one of the first friction plates 26A.

A hydraulic fluid is supplied from the first branch fluid passage 70b to a base end of the first hydraulic piston 73. When a hydraulic fluid is supplied from the first branch fluid passage 70b, the first hydraulic piston 73 moves rearward. This pushes the first friction plates 26A, thereby causing the first friction plates 26A to be pressed against the second friction plates 26B.

The first hydraulic piston 73 is biased forward by a first spring 74. Accordingly, when no hydraulic fluid is supplied from the first branch fluid passage 70b, the first hydraulic piston 73 moves forward due to biasing force of the first spring 74. When the first hydraulic piston 73 moves forward, the first friction plates 26A are separated away from the second friction plates 26B.

The first friction plates 27A and the second friction plates 27B of the second clutch 27 are disposed rearward of the second section 65b of the support body 65. The first friction plates 27A and the second friction plates 27B are disposed between the fourth section 65d of the support body 65 and the outer circumferential surface of the extension 60b of the connector 60.

The first friction plates 27A of the second clutch 27 have a circular ring shape, and outer circumferential portions thereof are supported on the fourth section 65d of the support body 65. Specifically, a plurality of protrusions 27A1 (see FIG. 12) provided on an outer circumference of each of the first friction plates 27A are fitted in a plurality of cutouts 65i (see FIG. 12) provided in the fourth section 65d. The first friction plates 27A are thus non-rotatable with respect to the support body 65 and are movable along the cutouts 65i in the front-rear direction.

The second friction plates 27B of the second clutch 27 have a circular ring shape, and inner circumferential portions thereof are supported on the extension 60b of the connector 60. The second friction plates 27B are immovably fixed to the extension 60b.

A hydraulic piston 75 (hereinafter referred to as a "second hydraulic piston 75") of the second clutch 27 is disposed between the partition wall 9*d* and the second section 65*b* of the support body 65. Specifically, the second hydraulic piston 75 is disposed in a space surrounded by the wall portion 96, the cylinder portion 97, and the second protruding portion 99 of the partition wall 9*d* and the first section 65*a*, the second section 65*b*, and the sixth section 65*f* of the support body 65. The second section 65*b* of the support body 65 has an opening 65*j* (see FIGS. 11 and 12), and a leading end portion of the second hydraulic piston 75 protrudes from the opening 65*j*. The leading end portion of the second hydraulic piston 75 is in proximity to a foremost one of the first friction plates 27A.

A hydraulic fluid is supplied from the second branch fluid passage 70*c* to a base end of the second hydraulic piston 75. When a hydraulic fluid is supplied from the second branch fluid passage 70*c*, the second hydraulic piston 75 moves rearward. This pushes the first friction plates 27A, thereby causing the first friction plates 27A to be pressed against the second friction plates 27B.

The second hydraulic piston 75 is biased forward by a second spring 76. Accordingly, when no hydraulic fluid is supplied from the second branch fluid passage 70*c*, the second hydraulic piston 75 moves forward due to biasing force of the second spring 76. When the second hydraulic piston 75 moves forward, the first friction plates 27A are separated away from the second friction plates 27B.

Control System

Figure 13:
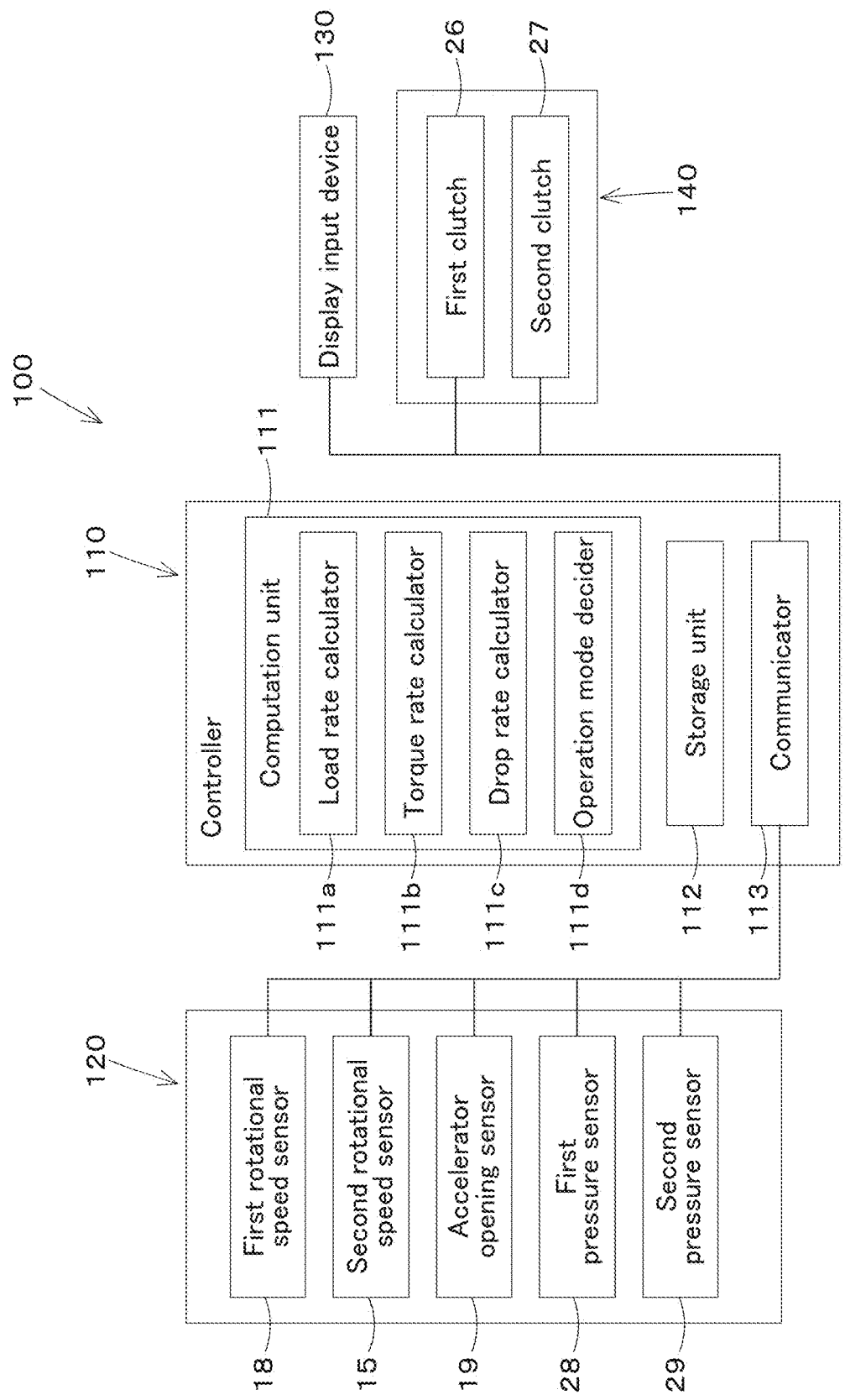
FIG. 13 is a block diagram illustrating an outline configuration of a control system included in the working vehicle.

FIG. 13 is a block diagram illustrating an outline configuration of a control system 100 included in the working vehicle 1 according to an example embodiment of the present invention. The control system 100 is a control system that can be included in the working vehicle 1. That is, the control system 100 can be applied to the working vehicle 1 including the first power transmitter 11 according to all of the example embodiments (the first to sixth example embodiments).

The control system 100 includes a controller 110, an information acquirer 120, a display input device 130, and an action unit 140.

The controller 110 includes an electronic control unit (ECU). The controller 110 is configured or programmed to receive various kinds of information and signals transmitted (input) from the information acquirer 120, perform computation, and transmit a control signal for controlling action of the action unit 140 to the action unit 140 on the basis of a computation result and the like.

The controller 110 includes a computation unit 111, a storage unit 112, and a communicator 113. The computation unit 111 is a CPU or the like, and reads out various programs stored in the storage unit 112 and performs various kinds of computation and processing. In the storage unit 112, programs to be executed by the computation unit 111 and various kinds of data are stored. The storage unit 112 is a read only memory (ROM), a random access memory (RAM), or the like. Note that the storage unit 112 may be an external memory connected to the controller 110. The communicator 113 performs communication between the controller 110 and the information acquirer 120, the display input device 130, and the action unit 140 by an electric communication line or wirelessly and transmits and receives various kinds of information and various kinds of signals.

The information acquirer 120 acquires information concerning action of the working vehicle 1 and transmits the information to the controller 110. The information acquirer 120 includes the first pressure sensor 28, the second pressure sensor 29, the first rotational speed sensor 18, the second rotational speed sensor 15, and an accelerator opening sensor 19.

As described above, the first pressure sensor 28 detects a pressure (a working pressure of the fluid passage piston) of a hydraulic fluid in a fluid passage for supplying a hydraulic fluid to the hydraulic piston of the first clutch 26. The second pressure sensor 29 detects a pressure (a working pressure of the fluid passage piston) of a hydraulic fluid in a fluid passage for supplying a hydraulic fluid to the hydraulic piston of the second clutch 27.

The first rotational speed sensor 18 measures a rotational speed of the first flywheel 13. The second rotational speed sensor 15 calculates a rotational speed (actual rotational speed) of the engine 4 by measuring a rotational speed of the second flywheel 14. The accelerator opening sensor 19 detects an indicated injection amount (an indicated value of an injection amount given to a fuel injection valve (injector)) in accordance with a pressed amount of an accelerator pedal.

The information acquirer 120 may include the first torque sensor 35, the second torque sensor 36, and the third rotational speed sensor 37 (not illustrated in FIG. 13).

The display input device 130 is capable of displaying various kinds of information and receiving manual operation. The display input device 130 is, for example, a touch panel display. The display input device 130 is, for example, disposed in the vicinity of an operator's seat of the working vehicle 1.

The computation unit 111 includes a load rate calculator 111*a*, a torque rate calculator 111*b*, a drop rate calculator 111*c*, and an operation mode decider 111*d*.

The load rate calculator 111*a* calculates a load rate of the engine 4 (hereinafter referred to simply as a "load rate"). Specifically, the load rate calculator 111*a* calculates a load rate on the basis of an indicated injection amount detected by the accelerator opening sensor 19 and a restricted injection amount corresponding to a boost pressure stored in the storage unit 112. Specifically, the load rate calculator 111*a* calculates the load rate by a calculation formula "the indicated injection amount/the restricted injection amount corresponding to the boost pressure×100".

The "boost pressure" is a pressure of compressed air forcibly delivered to the engine 4 by a supercharger. The "restricted injection amount" is a value which an amount of fuel injected by the fuel injection valve (injector) is not permitted to exceed. The "restricted injection amount corresponding to the boost pressure" is a restricted injection amount decided corresponding to the boost pressure. The restricted injection amount is decided to increase corresponding to an increase of the boost pressure. The "restricted injection amount corresponding to the boost pressure" is stored in the storage unit 112.

The torque rate calculator 111*b* calculates a torque rate of the engine 4 (hereinafter referred to simply as a "torque rate"). Specifically, the torque rate calculator 111*b* calculates the torque rate on the basis of the indicated injection amount detected by the accelerator opening sensor 19 and a restricted injection amount of a full load curve stored in the storage unit 112. Specifically, the load rate calculator 111*a* calculates the torque rate by a calculation formula "the indicated injection amount/the restricted injection amount of the full load curve×100".

The "restricted injection amount of the full load curve" is a restricted injection amount decided corresponding to the full load curve of the engine 4 (a full load curve whose horizontal axis is the rotational speed of the engine and whose vertical axis is the fuel injection amount). The "restricted injection amount of the full load curve" is stored in the storage unit 112.

The drop rate calculator 111c calculates a drop rate of the engine 4 (hereinafter sometimes referred to simply as a "drop rate"). Specifically, the drop rate calculator 111c calculates the drop rate on the basis of the actual rotational speed of the engine 4 (hereinafter sometimes referred to simply as an "actual rotational speed") detected by the second rotational speed sensor 15 and a target rotational speed of the engine 4 (hereinafter sometimes referred to simply as a "target rotational speed") stored in the storage unit 112. Specifically, the drop rate calculator 111c calculates the drop rate by a calculation formula "the actual rotational speed/the target rotational speed×100". Note that the target rotational speed of the engine 4 is a predetermined rotational speed of the engine 4 corresponding to an accelerator opening or the like.

The operation mode decider 111d decides an operation mode (described later) of the control system 100 on the basis of information (a detected value or the like) acquired by the information acquirer 120, values calculated by the load rate calculator 111a, the torque rate calculator 111b, and the drop rate calculator 111c, and the like. The controller 110 is configured or programmed to transmit a control signal to the action unit 140 on the basis of the operation mode decided by the operation mode decider 111d.

The action unit 140 operates on the basis of the control signal transmitted from the controller 110. The action unit 140 includes the first clutch 26 and the second clutch 27.

The first clutch 26 operates on the basis of a first control signal transmitted from the controller 110. The first control signal is a control signal for driving the hydraulic piston (the first hydraulic piston 73) of the first clutch 26 and includes an indicated pressure (hereinafter referred to as a "first indicated pressure") of a hydraulic fluid for driving the hydraulic piston of the first clutch 26. The working pressure of the hydraulic piston of the first clutch 26 is decided by the first indicated pressure included in the control signal transmitted from the controller 110. The first clutch 26 is engaged or disengaged by driving of the hydraulic piston based on the first indicated pressure.

The second clutch 27 operates on the basis of a second control signal transmitted from the controller 110. The second control signal is a control signal for driving the hydraulic piston (the second hydraulic piston 75) of the second clutch 27 and includes an indicated pressure (hereinafter referred to as a "second indicated pressure") of a hydraulic fluid for driving the hydraulic piston of the second clutch 27. The working pressure of the hydraulic piston of the second clutch 27 is decided by the second indicated pressure included in the control signal transmitted from the controller 110. The second clutch 27 is engaged or disengaged by driving of the hydraulic piston based on the second indicated pressure.

The controller 110 is configured or programmed to perform control engaged/disengaged states of the first clutch 26 and the second clutch 27 to switch an operation mode between a plurality of operation modes. Specifically, the controller 110 is configured or programmed to switch the operation mode by controlling engaged/disengaged states of the first clutch 26 and the second clutch 27 or notify an operator of the working vehicle 1 that the operation mode is allowed to be switched.

As illustrated in FIG. 14, the plurality of operation modes include a free mode, a charge preparation mode, a charge mode, a boost preparation mode, a boost mode, a holding-out preparation mode, a holding-out mode, and an engine off mode. These operation modes are described below.

Free Mode

The free mode is an operation mode immediately after activation of the engine 4. In the free mode, the engine 4 has been activated but has not reached an idling rotational speed. The first clutch 26 and the second clutch 27 are disengaged. Since the first clutch 26 and the second clutch 27 are disengaged, the first flywheel 13 is not rotating. However, when the operation mode has shifted from another operation mode into the free mode, the first flywheel 13 may be rotating due to inertial force.

Charge Mode

The charge mode is a mode in which rotational energy is accumulated in the first flywheel 13.

In the charge mode, the engine 4 rotates at a target rotational speed thereof exceeding the idling rotational speed. Note, however, that the rotational speed is sometimes less than the target rotational speed when the load on the engine 4 increases due to a work load or the like. In the charge mode, the rotational speed of the first flywheel 13 is higher than the rotational speed (actual rotational speed) of the engine 4 but is less than a target rotational speed of the first flywheel 13. The target rotational speed of the first flywheel 13 is a rotational speed higher than the rotational speed of the engine 4. Specifically, the target rotational speed of the first flywheel 13 is a rotational speed obtained by multiplying the actual rotational speed of the engine 4 by a speed increase ratio of the speed increasing mechanism 20. For example, when the speed increase ratio of the speed increasing mechanism 20 is 3, "the target rotational speed of the first flywheel 13=the actual rotational speed of the engine 4×3". In the following description, the target rotational speed of the first flywheel 13 is sometimes referred to as a "first target rotational speed" to distinguish the target rotational speed of the first flywheel 13 from the target rotational speed of the engine 4.

In the charge mode, the first clutch 26 is engaged, and the second clutch 27 is disengaged. By connecting the first clutch 26, the first flywheel 13 and the engine 4 are connected by a first path on which the speed increasing mechanism 20 is provided.

The first path is a path on which the speed increasing mechanism 20 and the first clutch 26 are provided among paths (power transmission paths) that connect the engine 4 and the first flywheel 13. For example, in the example embodiment illustrated in FIG. 2 (the first example embodiment of the first power transmitter 11), the first path is a path extending from the output shaft 4a of the engine 4 to the first flywheel 13 through the second flywheel 14, the intermediate shaft 17, the first clutch 26, and the speed increasing mechanism 20.

When the first flywheel 13 and the engine 4 are connected by the first path on which the speed increasing mechanism 20 is provided, the rotational power of the engine 4 is speed-increased by the speed increasing mechanism 20, and the speed-increased rotational power is transmitted to the first flywheel 13. As a result, the rotational speed of the first flywheel 13 becomes higher than the rotational speed of the engine 4, and the rotational power of the engine 4 can be effectively accumulated in the first flywheel 13.

Charge Preparation Mode

The charge preparation mode is a mode in a preparation stage before shifting into the charge mode. The charge preparation mode is a mode before shifting into the charge mode.

In the charge preparation mode, the engine 4 rotates at the target rotational speed. However, the rotational speed is sometimes less than the target rotational speed when the load on the engine 4 increases due to a work load or the like. In the charge preparation mode, the rotational speed of the first flywheel 13 is less than the target rotational speed (first target rotational speed) of the first flywheel 13. The rotational speed of the first flywheel 13 is higher than the rotational speed (actual rotational speed) of the engine 4 or is equal to the rotational speed (actual rotational speed) of the engine 4. In the charge preparation mode, the first clutch 26 is switching from a disengaged state thereof to an engaged state thereof, and the second clutch 27 is disengaged. When the first clutch 26 is switched from the disengaged state thereof to the engaged state thereof, the operation mode shifts to the charge mode.

The state where the first clutch 26 is switching from a disengaged state thereof to an engaged state thereof is a state where the first friction plate 26A of the first clutch 26 is brought close to the second friction plate 26B by being pushed by the hydraulic piston (the first hydraulic piston 73) but is not in a power transmittable state. In other words, this state is a state where one shot for preparing the first clutch 26 for connection is being performed. Hereinafter, this state is referred to as "ineffective stroke filling" of the first clutch 26. In FIG. 14, this state is expressed as "ineffective stroke filling".

Boost Mode

The boost mode is a mode in which the rotational power of the engine 4 is assisted by the rotational power of the first flywheel 13 when the rotational speed of the first flywheel 13 is higher than the rotational speed (actual rotational speed) of the engine 4.

In the boost mode, the engine 4 rotates at the target rotational speed. However, the rotational speed is sometimes less than the target rotational speed when the load on the engine 4 increases due to a work load or the like. In the boost mode, the rotational speed of the first flywheel 13 is higher than the rotational speed (actual rotational speed) of the engine 4. This is because in the charge mode executed before shifting into the boost mode, the rotational speed of the first flywheel 13 is higher than the rotational speed (actual rotational speed) of the engine 4. Another reason is that the actual rotational speed of the engine 4 decreases due to a load applied to the engine 4 due to a work load or the like in the boost mode. The work load occurs, for example, when a working device is connected to the PTO shaft 8 of the working vehicle 1 and the working device is driven by transmitting power from the PTO shaft 8 to the working device.

In the boost mode, the first clutch 26 is disengaged, and the second clutch 27 is engaged. The second clutch 27 shifts from a half clutch state to an engaged state thereof in the boost mode. When the second clutch 27 is engaged, the first flywheel 13 and the engine 4 are connected by a second path.

The second path is a path on which the speed increasing mechanism 20 is not provided and the second clutch 27 is provided among the paths (power transmission paths) connecting the engine 4 and the first flywheel 13. For example, in the example embodiment illustrated in FIG. 2 (the first example embodiment of the first power transmitter 11), the second path is a path extending from the output shaft 4a of the engine 4 to the first flywheel 13 through the second flywheel 14, the intermediate shaft 17, and the second clutch 27.

When the first flywheel 13 and the engine 4 are connected by the second path, therefore the rotational power of the engine 4 can be assisted by the rotational power of the first flywheel 13 since the rotational speed of the first flywheel 13 is higher than the rotational speed of the engine 4. That is, the boost mode is an operation mode in which the rotational power of the engine 4 is assisted by the rotational power of the first flywheel 13 when the rotational speed of the first flywheel 13 is higher than the rotational speed (actual rotational speed) of the engine 4.

Boost Preparation Mode

The boost preparation mode is a mode in a preparation stage before shifting into the boost mode. The boost preparation mode is a mode executed before shifting into the boost mode. The boost preparation mode is a mode executed when the load on the engine 4 increases due to an increase of a work load or the like. The shift into the boost preparation mode makes preparation for shift into the boost mode in which the rotational energy accumulated in the first flywheel 13 in the charge mode is used to assist the engine 4.

In the boost preparation mode, the engine 4 rotates at the target rotational speed. However, the target rotational speed is sometimes less than the target rotational speed when the load on the engine 4 increases due to a work load or the like. In the boost preparation mode, the rotational speed of the first flywheel 13 is the first target rotational speed, which is higher than the rotational speed (actual rotational speed) of the engine 4. The first clutch 26 is engaged and the second clutch 27 is switching from a disengaged state thereof to an engaged state thereof (ineffective stroke filling state). When the second clutch 27 is switched to the engaged state thereof, the operation mode shifts into the boost mode.

The state where the second clutch 27 is switching from a disengaged state thereof to an engaged state thereof is a state where the first friction plate 27A of the second clutch 27 is brought close to the second friction plate 27B by being pushed by the hydraulic piston (the second hydraulic piston 75) but has not reached a power transmittable state. In other words, this state is a state where one shot for preparing the second clutch 27 for connection is being performed. Hereinafter, this state is referred to as "ineffective stroke filling" of the second clutch 27. In FIG. 14, this state is expressed as "ineffective stroke filling".

Holding-Out Mode

The holding-out mode is a mode in which a rapid decrease of the rotational speed of the engine 4 is prevented by inertial force of the first flywheel 13 when the rotational speed of the first flywheel 13 is equal to or lower than the rotational speed (actual rotational speed) of the engine 4.

In the holding-out mode, the engine 4 rotates at the target rotational speed. However, the rotational speed is sometimes less than the target rotational speed when the load on the engine 4 increases due to a work load or the like. In the holding-out mode, the rotational speed of the first flywheel 13 is equal to or lower than the rotational speed (actual rotational speed) of the engine 4. Specifically, when the operation mode shifts from the boost mode into the holding-out mode, the rotational speed of the first flywheel 13 at the time of shift into the holding-out mode is equal to the rotational speed (actual rotational speed) of the engine 4. When the operation mode shifts from another operation mode to the holding-out mode, the rotational speed of the first flywheel 13 at the time of shift into the holding-out mode is lower than the rotational speed (actual rotational speed) of the engine 4.

In the holding-out mode, the first clutch 26 is disengaged, and the second clutch 27 is engaged. The second clutch 27 shifts from a half clutch state to an engaged state thereof in the holding-out mode. When the second clutch 27 is engaged, the first flywheel 13 and the engine 4 are connected by the second path.

When the first flywheel 13 and the engine 4 are connected by the second path, the first flywheel 13 and the engine 4 are corotated. Accordingly, when a high load is applied to the engine 4, a rapid decrease of the rotational speed of the engine 4 can be prevented by the inertial force of the first flywheel 13.

In the holding-out mode, the rotational speed of the first flywheel 13 is equal to or lower than the rotational speed of the engine 4, and therefore the rotational power of the engine 4 cannot be assisted by the rotational power of the first flywheel 13, but a rapid decrease of the rotational speed of the engine 4 cannot be prevented. Therefore, in the holding-out mode, when the rotational energy of the first flywheel 13 is not sufficient to assist the rotational power of the engine 4, the rotational power can be used to prevent a rapid decrease of the rotational speed of the engine 4 (to make the engine 4 hold out).

Holding-Out Preparation Mode

The holding-out preparation mode is a mode in a preparation mode before shifting into the holding-out mode. The holding-out preparation mode is a mode executed before shifting into the holding-out mode.

In the holding-out preparation mode, the engine 4 rotates at the target rotational speed. However, the rotational speed is sometimes less than the target rotational speed when the load on the engine 4 increases due to a work load or the like. In the holding-out preparation mode, the rotational speed of the first flywheel 13 is lower than the rotational speed (actual rotational speed) of the engine 4. The first clutch 26 is disengaged and the second clutch 27 is switching from a disengaged state thereof to an engaged state thereof (ineffective stroke filling state). When the second clutch 27 is switched to an engaged state thereof, the operation mode shifts into the holding-out mode.

Engine Off Mode

The engine off mode is a mode in which the engine 4 is in an off state (a spark plug is not ignited) but the first flywheel 13 is rotating while decelerating.

In the engine off mode, the spark plug of the engine 4 is not ignited, but the engine 4 is rotating due to inertial force while decelerating. Furthermore, the first flywheel 13 is also rotating due to inertial force while decelerating.

In the engine off mode, the first clutch 26 and the second clutch 27 are engaged. Accordingly, the first flywheel 13 is connected to the engine 4 through the first clutch 26 and the second clutch 27. The first flywheel 13 continues to rotate for a while due to large inertial force even when the engine 4 enters an off state, but the rotation can be stopped early since the rotation is braked when the first flywheel 13 is connected to the engine 4 through the first clutch 26 and the second clutch 27.

However, in the engine off mode, when the rotational speed of the first flywheel 13 is sufficiently small (for example, when the first flywheel 13 stops soon after activation of the engine 4), it is unnecessary to connect both of or one of the first clutch 26 and the second clutch 27. This is because when the rotational speed of the first flywheel 13 is sufficiently small, the first flywheel 13 stops in a short time without the need to brake the rotation. The case where the rotational speed of the first flywheel 13 is sufficiently small is, for example, a case where the rotational speed of the first flywheel 13 is equal to or lower than the idling rotational speed of the engine 4.

Regarding Shift (Switching) of Operation Mode

Next, shift of the operation mode is described.

Figure 15:
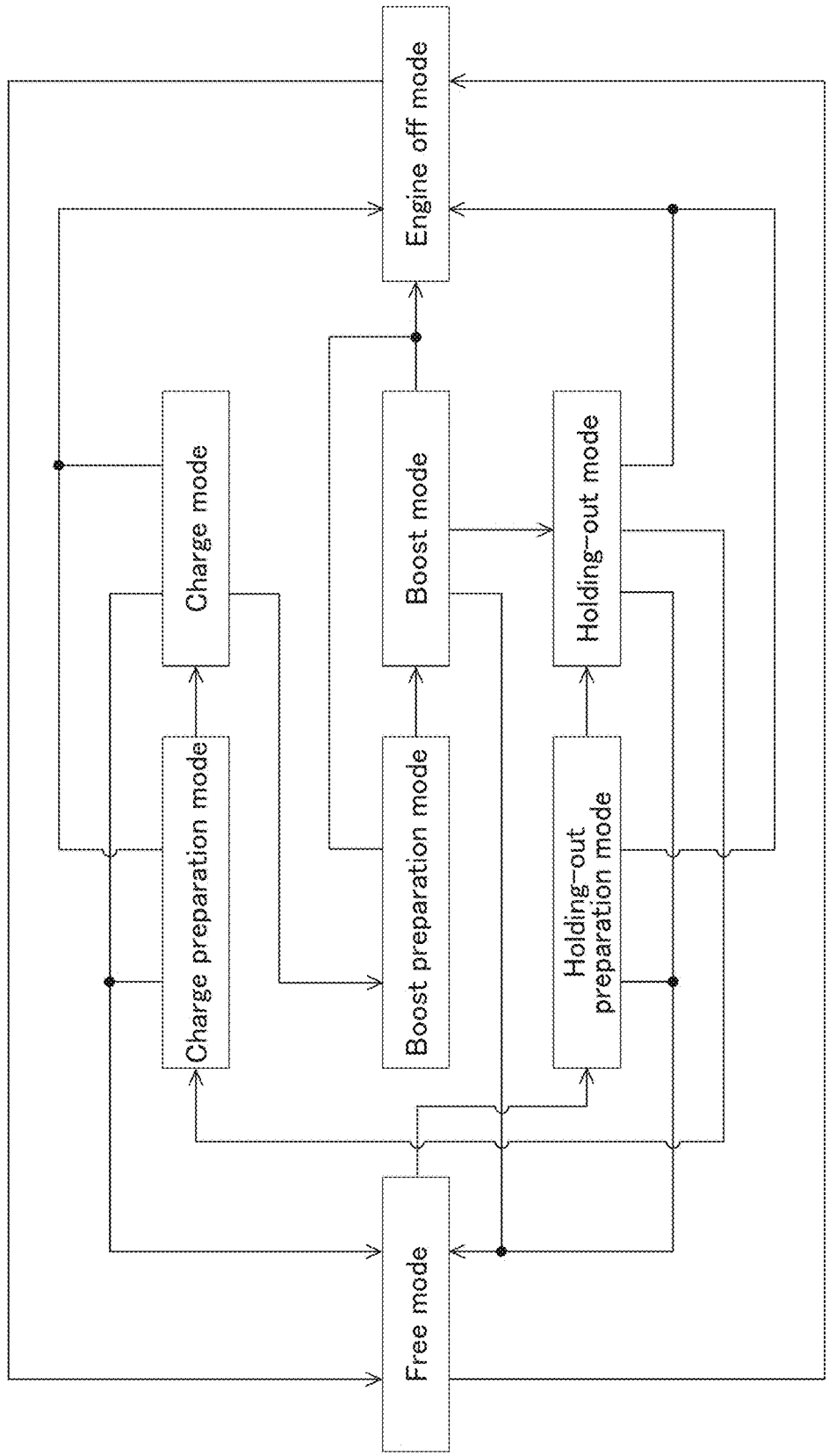
FIG. 15 is a state transition diagram of an operation mode executed by the control system.

FIG. 15 is a state transition diagram concerning the operation mode.

The shift into the free mode can occur from all of the other operation modes excluding the boost preparation mode. The shift into the charge mode can occur from the charge preparation mode. The shift into the charge preparation mode can occur from the holding-out mode. The shift into the holding-out mode can occur from the holding-out preparation mode and the boost mode. The shift into the holding-out preparation mode can occur from the free mode. The shift into the boost mode can occur from the boost preparation mode. The shift into the boost preparation mode can occur from the charge mode. The shift into the engine off mode can occur from all of the operation modes.

The following describes a condition for shift of the operation mode.

FIG. 16 illustrates a condition (threshold value) for shift of the operation mode. FIGS. 17 to 23 are flowcharts illustrating an example of flow (steps) of shift of the operation mode.

Shift from Free Mode to Holding-Out Preparation Mode

Figure 17:
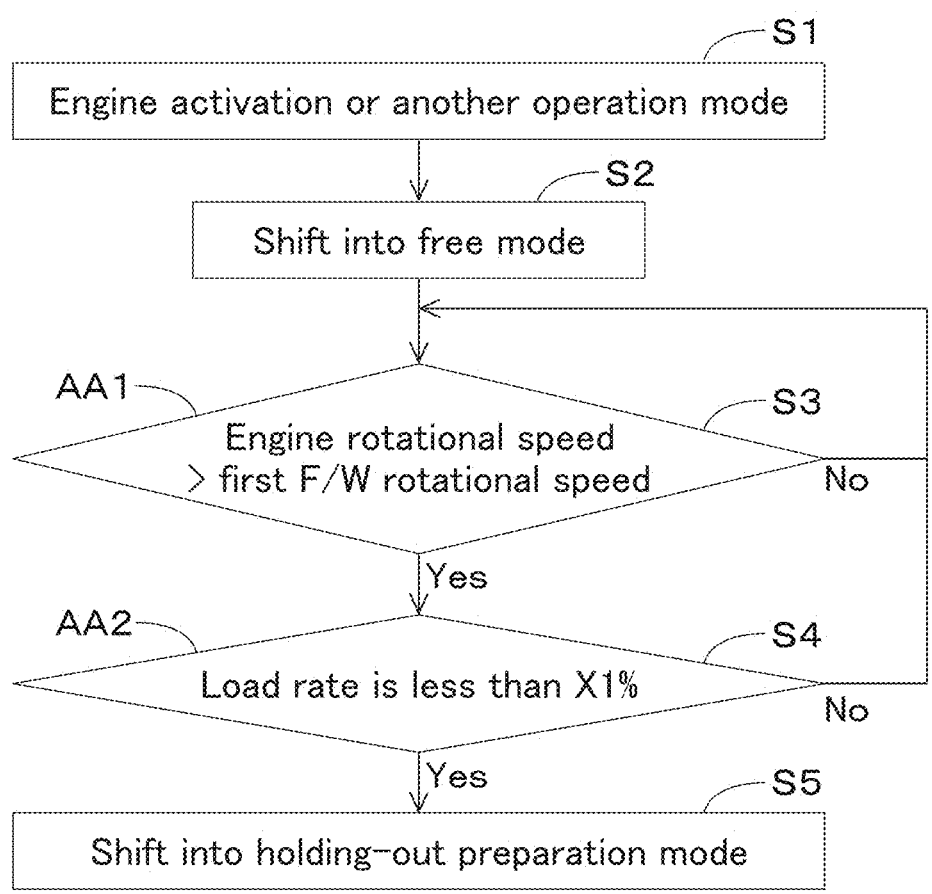
FIG. 17 is a flowchart illustrating a flow of operation performed when the operation mode shifts from a free mode into a holding-out preparation mode.

The shift from the free mode into the holding-out preparation mode is described with reference to FIG. 17.

First, the shift into the free mode is executed automatically upon activation of the engine 4 or is executed when a predetermined condition (described later) is satisfied in another operation mode (see FIGS. 18 to 21 and 23). The shift from another operation mode into the free mode will be described later.

In the free mode, the engine 4 has been activated, and the first clutch 26 and the second clutch 27 are disengaged. Since the first clutch 26 and the second clutch 27 are disengaged, the rotational power of the engine 4 is not transmitted to the first flywheel 13, and the first flywheel 13 is not rotating. However, when the shift into the free mode occurs from another operation mode, the first flywheel 13 may be rotating due to inertial force, as described above.

The shift from the free mode into the holding-out preparation mode is executed when the rotational speed of the first flywheel 13 is lower than the rotational speed (actual rotational speed) of the engine 4 and the load rate of the engine 4 is less than a predetermined value X1(%). That is, the shift from the free mode into the holding-out preparation mode is executed when a condition (first condition AA1) that the rotational speed of the first flywheel 13 is lower than the rotational speed (actual rotational speed) of the engine 4 and a condition (second condition AA2) that the load rate of the engine 4 is less than the predetermined value X1 are satisfied. The predetermined value X1 is stored in the storage unit 112.

When the shift into the free mode is executed automatically upon activation of the engine 4, the first flywheel 13 is not rotating. On the other hand, when the shift into the free mode occurs from another operation mode (see FIGS. 18 to 21 and 23), the first flywheel 13 is rotating at a rotational speed lower than the rotational speed (actual rotational speed) of the engine 4. For example, when the operation mode shifts from the holding-out mode into the free mode and then into the holding-out preparation mode, the first flywheel 13 is rotating at a rotational speed lower than the rotational speed (actual rotational speed) of the engine 4.

After the shift into the free mode, the computation unit 111 of the controller 110 determines whether or not the first condition AA1 is satisfied (S3). Specifically, the computation unit 111 determines whether or not the first condition AA1 is satisfied by comparing the rotational speed of the first flywheel 13 measured by the first rotational speed sensor 18 and the rotational speed (actual rotational speed) of the engine 4 calculated by the second rotational speed sensor 15.

When the first condition is satisfied, the computation unit 111 determines whether or not the second condition AA2 is satisfied (S4). Specifically, the computation unit 111 (the load rate calculator 111a) determines whether or not the second condition AA2 by calculating the load rate on the basis of the indicated injection amount detected by the accelerator opening sensor 19 and the restricted injection amount corresponding to the boost pressure stored in the storage unit 112 and comparing the load rate with the predetermined value X1 (S4).

When both of the first condition AA1 and the second condition AA2 are satisfied, the computation unit 111 (the operation mode decider 111d) decides to shift into the holding-out preparation mode. A control signal for shift into the holding-out preparation mode is thus transmitted from the controller 110 to the action unit 140, and the control system 100 shifts from the free mode into the holding-out preparation mode (S5). In this case, the second hydraulic piston 75 of the second clutch 27 is driven on the basis of the control signal (one-shot pulse current) transmitted from the controller 110 to move the first friction plate 27A, and thereby the second clutch 27 is switching from a disengaged state thereof to an engaged state thereof (ineffective stroke filling state). When at least one of the first condition AA1 and the second condition AA2 is not satisfied (No in S3 or No in S4), the shift into the holding-out preparation mode does not occur.

A reason why the condition (the first condition AA1) that the rotational speed of the first flywheel 13 is lower than the rotational speed (actual rotational speed) of the engine 4 is used as a condition for shift from the free mode into the holding-out preparation mode is that a load applied to the engine 4 becomes large when shift from the holding-out preparation mode into the holding-out mode occurs in a state where the rotational speed of the first flywheel 13 is higher than the rotational speed (actual rotational speed) of the engine 4. A reason why the condition (the second condition AA2) that the load rate of the engine 4 is less than the predetermined value X1 is used as a condition is that a load applied to the engine 4 becomes large when shift from the holding-out preparation mode into the holding-out mode occurs in a state where the load rate of the engine 4 is high.

Shift from Holding-Out Preparation Mode into Holding-Out Mode

Figure 18:
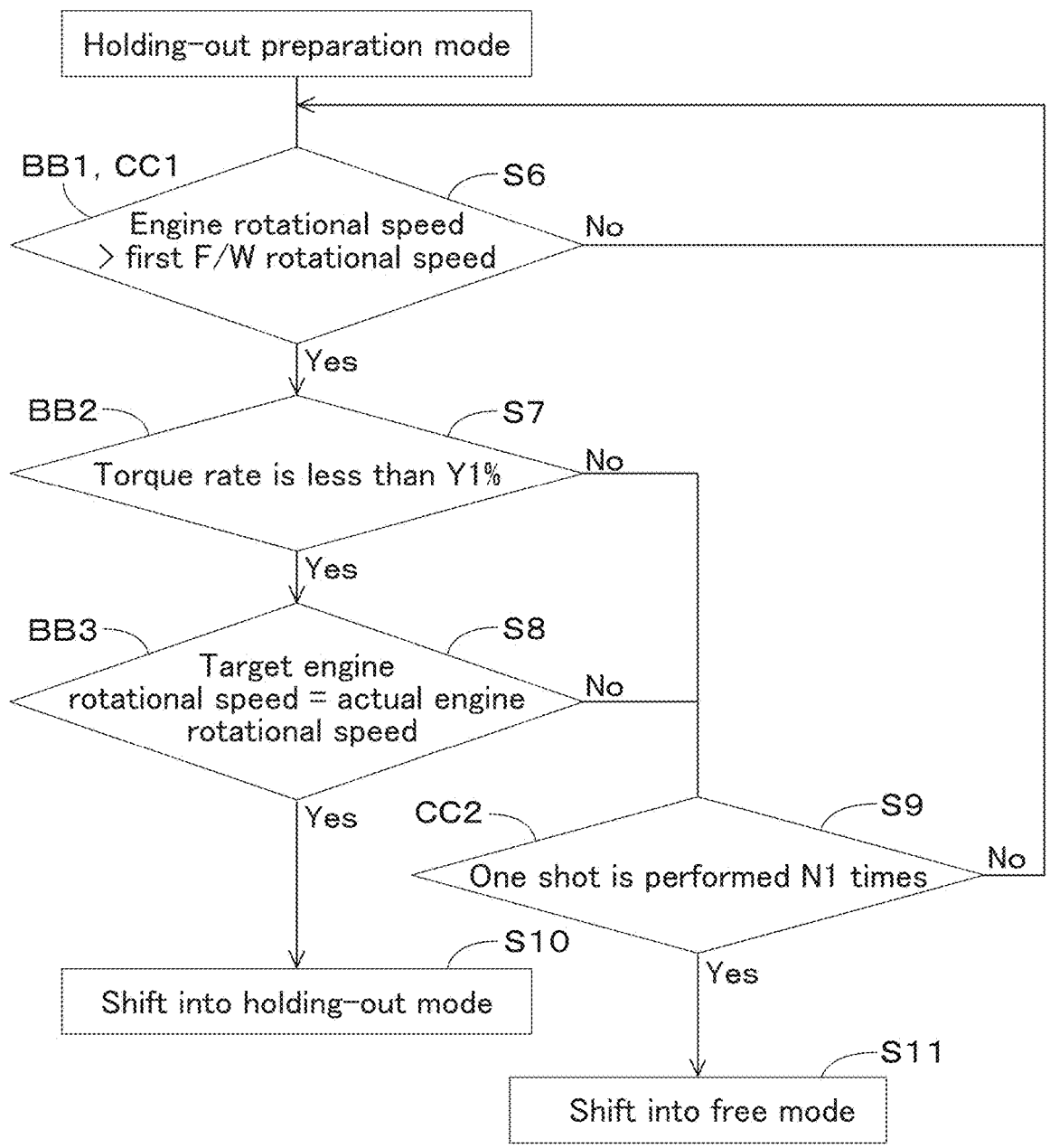
FIG. 18 is a flowchart illustrating a flow of operation performed when the operation mode shifts from a holding-out preparation mode into a holding-out mode or a free mode.

The shift from the holding-out preparation mode into the holding-out mode is described with reference to FIG. 18.

The shift from the holding-out preparation mode into the holding-out mode is executed when the rotational speed of the first flywheel 13 is lower than the rotational speed (actual rotational speed) of the engine 4, the torque rate of the engine 4 is less than a predetermined value Y1(%), and the actual rotational speed of the engine 4 is equal to the target rotational speed. That is, the shift from the holding-out preparation mode into the holding-out mode is executed when all of a condition (first condition BB1) that the rotational speed of the first flywheel 13 is lower than the rotational speed (actual rotational speed) of the engine 4, a condition (second condition BB2) that the torque rate of the engine 4 is less than the predetermined value Y1, and a condition (third condition BB3) that the actual rotational speed of the engine 4 is equal to the target rotational speed are satisfied. The predetermined value Y1 is stored in the storage unit 112.

After the shift into the holding-out preparation mode, the computation unit 111 of the controller 110 determines whether or not the first condition BB1 is satisfied (S6). Specifically, the computation unit 111 determines whether or not the first condition BB1 is satisfied by comparing the rotational speed of the first flywheel 13 measured by the first rotational speed sensor 18 and the rotational speed (actual rotational speed) of the engine 4 calculated by the second rotational speed sensor 15.

When the first condition BB1 is satisfied, the computation unit 111 determines whether or not the second condition BB2 is satisfied (S7). Specifically, the computation unit 111 (the torque rate calculator 111b) determines whether or not the second condition BB2 is satisfied by calculating the torque rate on the basis of the indicated injection amount detected by the accelerator opening sensor 19 and the restricted injection amount of the full load curve stored in the storage unit 112 and comparing the torque rate with the predetermined value Y1 (S7).

When the second condition BB2 is satisfied, the computation unit 111 determines whether or not the third condition BB3 is satisfied by comparing the target rotational speed of the engine 4 stored in the storage unit 112 and the rotational speed (actual rotational speed) of the engine 4 calculated by the second rotational speed sensor 15 (S8).

When all of the first condition BB1, the second condition BB2, and the third condition BB3 are satisfied, the computation unit 111 (the operation mode decider 111d) decides to shift into the holding-out mode. A control signal for shift into the holding-out mode is thus transmitted from the controller 110 to the action unit 140, and the control system 100 shifts from the holding-out preparation mode into the holding-out mode (S10). In this case, the second clutch 27 is switched from an ineffective stroke filling state into a half clutch state and then into an engaged state thereof on the basis of the control signal (second control signal) from the controller 110. When at least one of the first condition BB1, the second condition BB2, and the third condition BB3 is not satisfied (No in S6 or No in S7 or No in S8), the shift into the holding-out mode does not occur.

A reason why the condition (the first condition BB1) that the rotational speed of the first flywheel 13 is lower than the rotational speed (actual rotational speed) of the engine 4 is used as a condition for shift from the holding-out preparation mode into the holding-out mode is that the rotational speed of the first flywheel 13 is lower than the rotational speed (actual rotational speed) of the engine 4 in the holding-out preparation mode. A reason why the condition (the second condition BB2) that the torque rate of the engine 4 is less than the predetermined value Y1 is used as a condition is that a load applied to the engine 4 becomes large when shift into the holding-out mode occurs in a state where the torque rate of the engine 4 is high. A reason why the condition (the third condition BB3) that the actual rotational speed of the engine 4 is equal to the target rotational speed is used as a condition is that shift into the holding-out mode is executed after confirming that the actual rotational speed of the engine 4 has settled to the target rotational speed. The third condition BB3 makes it possible to prevent shift into the holding-out mode from occurring in a state where a load is applied to the engine 4 due to a work load or the like (in a state where the actual rotational speed of the engine 4 is lower than the target rotational speed).

Shift from Holding-Out Preparation Mode into Free Mode

The shift from the holding-out preparation mode into the free mode is described with reference to FIG. 18.

The shift from the holding-out preparation mode into the free mode is executed when the rotational speed of the first flywheel 13 is lower than the rotational speed (actual rotational speed) of the engine 4 and the number of attempts of engaging the second clutch 27 (the number of times of execution of one shot) within a predetermined period T1 has reached a predetermined number of times N1. That is, the shift from the holding-out preparation mode into the free mode is executed when a condition (first condition CC1) that the rotational speed of the first flywheel 13 is lower than the rotational speed (actual rotational speed) of the engine 4 and a condition (second condition CC2) that the number of attempts of engaging the second clutch 27 (the number of times of execution of one shot) within the predetermined period T1 has reached the predetermined number of times N1 are satisfied. The predetermined period T1 and the predetermined number of times N1 are stored in the storage unit 112. The predetermined period T1 is measured by a timer (not illustrated), and a measured value is transmitted to the controller 110.

The second condition CC2 is, in other words, a time when the number of times of execution of one shot for engaging the second clutch 27 within the predetermined period T1 reaches the predetermined number of times N1. The number of times of execution of one shot for engaging the second clutch 27 is the number of times of supply of a one-shot pulse current supplied to the hydraulic control valve (solenoid valve) for driving the second hydraulic piston 75 that pushes the first friction plate 27A of the second clutch 27.

After the shift into the holding-out preparation mode, the computation unit 111 of the controller 110 determines whether or not the first condition CC1 is satisfied (S6). Specifically, the computation unit 111 determines whether or not the first condition CC1 is satisfied by comparing the rotational speed of the first flywheel 13 measured by the first rotational speed sensor 18 and the rotational speed (actual rotational speed) of the engine 4 calculated by the second rotational speed sensor 15.

When the first condition CC1 is satisfied, the computation unit 111 determines whether or not the second condition CC2 is satisfied when at least one of the second condition BB2 and the third condition BB3 is not satisfied (when the condition for shift into the holding-out mode is not satisfied) (S9). Specifically, the computation unit 111 counts the number of times of execution of one shot (the number of times of one shot) within the predetermined period T1 and determines whether or not the number of times of one shot within the predetermined period T1 has reached N1 (S9).

When the first condition CC1 and the second condition CC2 are satisfied, the computation unit 111 (the operation mode decider 111d) decides to shift into the free mode. A control signal for shift into the free mode is thus transmitted from the controller 110 to the action unit 140, and the control system 100 shifts from the holding-out preparation mode into the free mode (S11). In this case, the second clutch 27 is switched from an ineffective stroke filling state into a disengaged state thereof on the basis of the control signal (second control signal) from the controller 110. When at least one of the first condition CC1 and the second condition CC2 is not satisfied (No in S6 or No in S10), the shift into the free mode does not occur.

In the holding-out preparation mode, one shot (supply of a one-shot pulse current) for engaging the second clutch 27 is executed at predetermined time intervals, but when the condition for shift into the holding-out mode is not satisfied even in a stage where one shot has been executed the predetermined number of times N1 within the predetermined period T1, execution of one shot is stopped, and a connection preparation state of the second clutch 27 is cancelled. As a result, the operation mode shifts into the free mode instead of shifting into the holding-out mode.

For example, if shift from the holding-out preparation mode into the holding-out mode occurs when the torque rate increases due to increase of the work load in the holding-out preparation mode, the engine 4 and the first flywheel 13 are connected through the second clutch 27, and therefore there is a risk of rapid decrease of the rotational speed of the engine 4. In this case, the rapid decrease of the engine rotational speed can be prevented by performing control so that the operation mode does not shift into the holding-out mode (the operation mode shifts into the free mode) when the condition for shift into the holding-out mode (the torque rate is less than Y1%) is not satisfied in the holding-out preparation mode even in a stage where one shot has been executed the predetermined number of times N1 within the predetermined period T1.

A reason why the condition (the first condition CC1) that the rotational speed of the first flywheel 13 is lower than the rotational speed (actual rotational speed) of the engine 4 is used as a condition for shift from the holding-out preparation mode into the free mode is that the rotational speed of the first flywheel 13 is lower than the rotational speed (actual rotational speed) of the engine 4 in the holding-out preparation mode. A reason why the condition (the second condition CC2) that the number of attempts of engaging the second clutch 27 (the number of times of execution of one shot) within the predetermined period T1 has reached the predetermined number of times N1 is used as a condition is that when the condition for shift into the holding-out mode is not satisfied even in a stage where one shot has been executed the predetermined number of times N1 within the predetermined period T1, it is determined that shift into the holding-out mode should be given up to prevent a rapid decrease of the engine rotational speed, as described above.

Shift from Holding-Out Mode into Charge Preparation Mode

Figure 19:
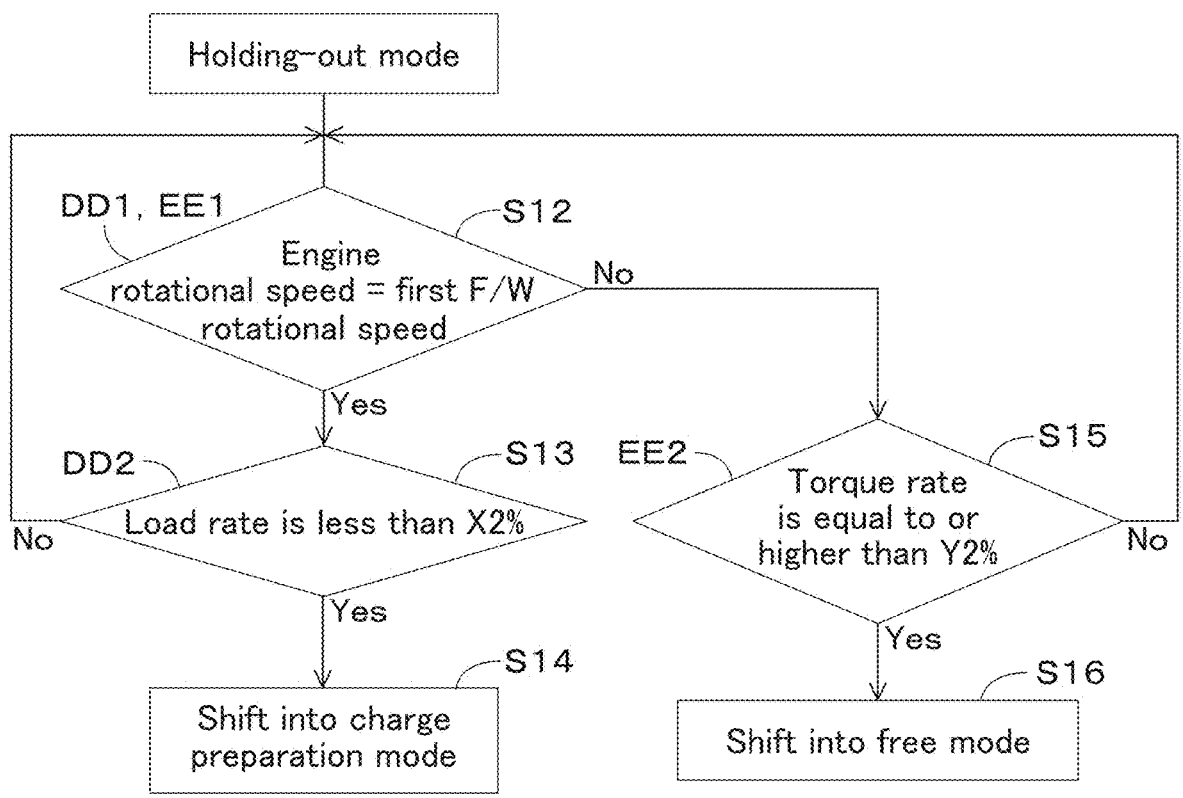
FIG. 19 is a flowchart illustrating a flow of operation performed when the operation mode shifts from a holding-out mode into a charge preparation mode or a free mode.

The shift from the holding-out mode into the charge preparation mode is described with reference to FIG. 19.

The shift from the holding-out mode into the charge preparation mode is executed when the rotational speed of the first flywheel 13 is equal to the rotational speed (actual rotational speed) of the engine 4 and the load rate of the engine 4 is less than a predetermined value X2(%). That is, the shift from the holding-out mode into the charge preparation mode is executed when a condition (first condition DD1) that the rotational speed of the first flywheel 13 is equal to the rotational speed (actual rotational speed) of the engine 4 and a condition (second condition DD2) that the load rate of the engine 4 is less than the predetermined value X2 are satisfied. The predetermined value X2 is stored in the storage unit 112.

After the shift into the holding-out mode, the computation unit 111 of the controller 110 determines whether or not the first condition CC1 is satisfied (S12). Specifically, the computation unit 111 determines whether or not the first condition DD1 is satisfied by comparing the rotational speed of the first flywheel 13 measured by the first rotational speed sensor 18 and the rotational speed (actual rotational speed) of the engine 4 calculated by the second rotational speed sensor 15.

When the first condition DD1 is satisfied, the computation unit 111 determines whether or not the second condition DD2 is satisfied (S13). Specifically, the computation unit 111 (the load rate calculator 111a) determines whether or not the second condition DD2 is satisfied by calculating the load rate on the basis of the indicated injection amount detected by the accelerator opening sensor 19 and the restricted injection amount corresponding to the boost pressure stored in the storage unit 112 and comparing the load rate with the predetermined value X2 (S13).

When the first condition DD1 and the second condition DD2 are satisfied, the computation unit 111 (the operation mode decider 111*d*) decides to shift into the charge preparation mode. A control signal for shift into the charge preparation mode is thus transmitted from the controller 110 to the action unit 140, and the control system 100 shifts from the holding-out mode into the charge preparation mode (S14). In this case, the first hydraulic piston 73 of the first clutch 26 is driven on the basis of the control signal (first control signal) transmitted from the controller 110 to move the first friction plate 26A, and thereby the first clutch 26 is switching from a disengaged state thereof to an engaged state thereof (ineffective stroke filling state). The second clutch 27 is switched from an engaged state thereof to a disengaged state thereof on the basis of the control signal (second control signal) transmitted from the controller 110. When at least one of the first condition DD1 and the second condition DD2 is not satisfied (No in S12 or No in S13), the shift into the charge preparation mode does not occur.

A reason why the condition (the first condition DD1) that the rotational speed of the first flywheel 13 is equal to the rotational speed (actual rotational speed) of the engine 4 is used as a condition for shift from the holding-out mode into the charge preparation mode is that when the rotational speed of the first flywheel 13 is equal to the actual rotational speed of the engine 4, it can be determined that preparation for increasing the rotational speed of the first flywheel 13 to a rotational speed higher than the actual rotational speed of the engine 4 has been made. A reason why the condition (the second condition DD2) that the load rate of the engine 4 is less than the predetermined value X2 is used as a condition is that in a state where the load rate of the engine 4 is low, it is unnecessary to assist the rotational power of the engine 4 by the rotational power of the first flywheel 13, and therefore it is determined that preparation for shift into the charge mode should be executed to accumulate rotational power in the first flywheel 13 in preparation for future assist.

Shift from Holding-Out Mode into Free Mode

The shift from the holding-out mode into the free mode is described with reference to FIG. 19.

The shift from the holding-out mode into the free mode is executed when the rotational speed of the first flywheel 13 is lower than the rotational speed (actual rotational speed) of the engine 4 and the torque rate of the engine 4 is equal to or higher than a predetermined value Y2(%). That is, the shift from the holding-out mode into the free mode is executed when a condition (first condition EE1) that the rotational speed of the first flywheel 13 is lower than the rotational speed (actual rotational speed) of the engine 4 and a condition (second condition EE2) that the torque rate of the engine 4 is equal to or higher than the predetermined value Y2 are satisfied. The predetermined value Y2 is stored in the storage unit 112.

After the shift into the holding-out mode, the computation unit 111 of the controller 110 determines whether or not the first condition EE1 is satisfied (S12). Specifically, the computation unit 111 determines whether or not the first condition EE1 is satisfied by comparing the rotational speed of the first flywheel 13 measured by the first rotational speed sensor 18 and the rotational speed (actual rotational speed) of the engine 4 calculated by the second rotational speed sensor 15. Note that in the holding-out mode, the rotational speed of the first flywheel 13 does not exceed the rotational speed (actual rotational speed) of the engine 4, and therefore when the condition "the engine rotational speed=the first flywheel rotational speed" is not satisfied in step 12 executed after the shift into the holding-out mode, the condition "the engine rotational speed>the first flywheel rotational speed" is satisfied.

When the first condition EE1 is satisfied, the computation unit 111 determines whether or not the second condition EE2 is satisfied (S15). Specifically, the computation unit 111 (the torque rate calculator 111*b*) determines whether or not the second condition EE2 is satisfied by calculating the torque rate on the basis of the indicated injection amount detected by the accelerator opening sensor 19 and the restricted injection amount of the full load curve stored in the storage unit 112 and comparing the torque rate with the predetermined value Y2 (S15).

When the first condition EE1 and the second condition EE2 are satisfied, the computation unit 111 (the operation mode decider 111*d*) decides to shift into the free mode. A control signal for shift into the free mode is thus transmitted from the controller 110 to the action unit 140, and the control system 100 shifts from the holding-out mode into the free mode (S16). In this case, the second clutch 27 is switched from an engaged state thereof to a disengaged state thereof on the basis of the control signal (second control signal) from the controller 110. When at least one of the first condition EE1 and the second condition EE2 is not satisfied (No in S12 or No in S15), the shift into the free mode does not occur.

A reason why the condition (the first condition EE1) that rotational speed of the first flywheel 13 is lower than the rotational speed (actual rotational speed) of the engine 4 is used as a condition for the shift from the holding-out mode into the free mode is that the rotational speed of the first flywheel 13 is lower than the rotational speed (actual rotational speed) of the engine 4 in the holding-out mode. A reason why the condition (the second condition EE2) that the torque rate of the engine 4 is equal to or higher than the predetermined value Y2 is used as a condition is that when the load (torque rate) of the engine 4 rapidly increases due to application of a work load in the holding-out mode, the load of the engine 4 is decreased by shifting the operation mode into the free mode.

Shift from Charge Preparation Mode into Charge Mode

Figure 20:
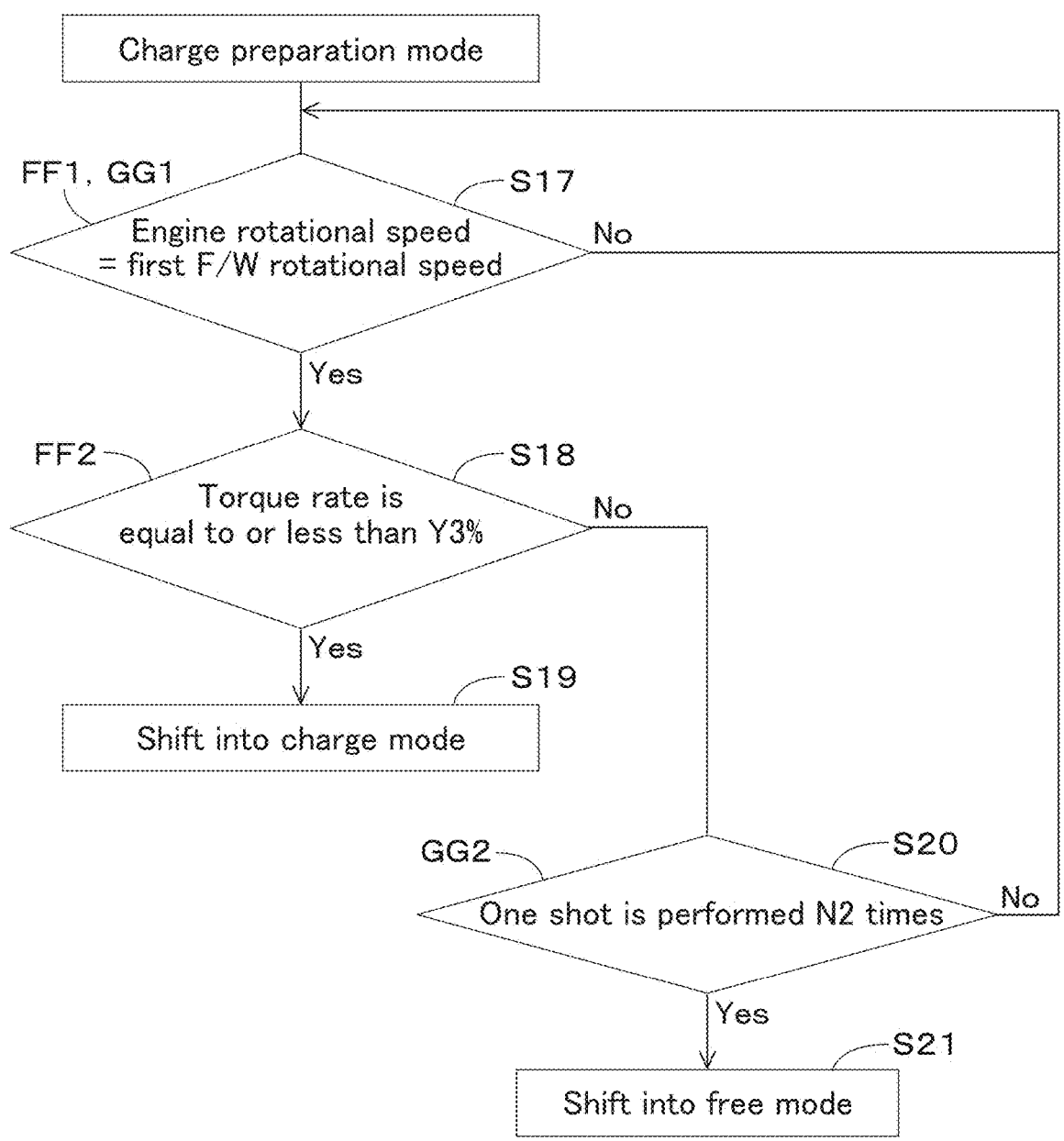
FIG. 20 is a flowchart illustrating a flow of operation performed when the operation mode shifts from a charge preparation mode into a charge mode or a free mode.

The shift from the charge preparation mode into the charge mode is described with reference to FIG. 20.

The shift from the charge preparation mode into the charge mode is executed when the rotational speed of the first flywheel 13 is equal to the rotational speed (actual rotational speed) of the engine 4 and the torque rate of the engine 4 is less than a predetermined value Y3(%). That is, the shift from the charge preparation mode into the charge mode is executed when a condition (first condition FF1) that the rotational speed of the first flywheel 13 is equal to the rotational speed (actual rotational speed) of the engine 4 and a condition (second condition FF2) that the torque rate of the engine 4 is less than the predetermined value Y3. The predetermined value Y3 is stored in the storage unit 112.

After the shift into the charge preparation mode, the computation unit 111 of the controller 110 determines whether or not the first condition FF1 is satisfied (S17). Specifically, the computation unit 111 determines whether or not the first condition FF1 is satisfied by comparing the rotational speed of the first flywheel 13 measured by the first rotational speed sensor 18 and the rotational speed (actual rotational speed) of the engine 4 calculated by the second rotational speed sensor 15.

When the first condition FF1 is satisfied, the computation unit 111 determines whether or not the second condition FF2 is satisfied (S13). Specifically, the computation unit 111 (the torque rate calculator 111*b*) determines whether or not the second condition FF2 is satisfied by calculating the torque rate on the basis of the indicated injection amount detected by the accelerator opening sensor 19 and the restricted injection amount of the full load curve stored in the storage unit 112 and comparing the torque rate with the predetermined value Y3 (S18).

When the first condition FF1 and the second condition FF2 are satisfied, the computation unit 111 (the operation mode decider 111*d*) decides to shift into the charge mode. A control signal for shift into the charge mode is thus transmitted from the controller 110 to the action unit 140, and the control system 100 shifts from the charge preparation mode into the charge mode (S19). In this case, the first clutch 26 is switched from an ineffective stroke filling state to an engaged state thereof on the basis of the control signal (first control signal) transmitted from the controller 110. When at least one of the first condition FF1 and the second condition FF2 is not satisfied (No in S17 or No in S18), the shift into the charge mode does not occur.

A reason why the condition (the first condition FF1) that the rotational speed of the first flywheel 13 is equal to the rotational speed (actual rotational speed) of the engine 4 is used as a condition for the shift from the charge preparation mode into the charge mode is that when the rotational speed of the first flywheel 13 has reached a rotational speed equal to the rotational speed (actual rotational speed) of the engine 4, it can be determined that preparation for increasing the rotational speed of the first flywheel 13 to a rotational speed higher than the actual rotational speed of the engine 4 has been made. A reason why the condition (the second condition FF2) that the torque rate of the engine 4 is less than the predetermined value Y3 is that shift into the charge mode in a state where the load (torque rate) of the engine 4 is high increases the load on the engine 4 and is therefore not preferable and it is preferable to accumulate rotational energy in the first flywheel 13 by shifting the operation mode into the charge mode in a state where the load (torque rate) on the engine 4 is low.

Shift from Charge Preparation Mode into Free Mode

The shift from the charge preparation mode into the free mode is described with reference to FIG. 20.

The shift from the charge preparation mode into the free mode is executed when the rotational speed of the first flywheel 13 is equal to the rotational speed (actual rotational speed) of the engine 4 and the number of attempts of engaging the first clutch 26 (the number of times of execution of one shot) within a predetermined period T2 has reached a predetermined number of times N2. That is, the shift from the charge preparation mode into the free mode is executed when a condition (first condition GG1) that the rotational speed of the first flywheel 13 is equal to the rotational speed (actual rotational speed) of the engine 4 and a condition (second condition GG2) that the number of attempts of engaging the first clutch 26 (the number of times of execution of one shot) within the predetermined period T2 has reached the predetermined number of times N2 are satisfied. The predetermined period T2 and the predetermined number of times N2 are stored in the storage unit 112.

The predetermined period T2 is measured by a timer (not illustrated), and a measured value is transmitted to the controller 110.

The second condition GG2 is, in other words, a time when the number of times of execution of one shot for engaging the first clutch 26 within the predetermined period T2 reaches the predetermined number of times N2. The number of times of execution of one shot for engaging the first clutch 26 is the number of times of supply of a one-shot pulse current supplied to the hydraulic control valve (solenoid valve) for driving the first hydraulic piston 73 that pushes the first friction plate 26A of the first clutch 26.

After the shift into the charge preparation mode, the computation unit 111 of the controller 110 determines whether or not the first condition GG1 is satisfied (S17). Specifically, the computation unit 111 determines whether or not the first condition GG1 is satisfied by comparing the rotational speed of the first flywheel 13 measured by the first rotational speed sensor 18 and the rotational speed (actual rotational speed) of the engine 4 calculated by the second rotational speed sensor 15.

When the first condition GG1 is satisfied, the computation unit 111 determines whether or not the second condition GG2 is satisfied when the second condition FF2 is not satisfied (when the condition for shift into the charge mode is not satisfied) (S20). Specifically, the computation unit 111 counts the number of times of one shot within the predetermined period T2 and determines whether or not the number of times of one shot within the predetermined period T2 has reached N2 (S20).

When the first condition GG1 and the second condition GG2 are satisfied, the computation unit 111 (the operation mode decider 111*d*) decides to shift into the free mode. A control signal for shift into the free mode is thus transmitted from the controller 110 to the action unit 140, and the control system 100 shifts from the charge preparation mode into the free mode (S21). In this case, the first clutch 26 is switched from an ineffective stroke filling state to a disengaged state thereof on the basis of the control signal (first control signal) from the controller 110. When at least one of the first condition GG1 and the second condition GG2 is not satisfied (No in S17 or No in S20), the shift into the free mode does not occur.

In the charge preparation mode, one shot (supply of a one-shot pulse current) for engaging the first clutch 26 is executed at predetermined time intervals, but when the condition for shift into the charge mode is not satisfied even in a stage where one shot has been executed the predetermined number of times N2 within the predetermined period T2, execution of one shot is stopped, and a connection preparation state of the first clutch 26 is cancelled. As a result, the operation mode shifts into the free mode instead of shifting into the charge mode.

A reason why the condition (the first condition GG1) that the rotational speed of the first flywheel 13 is equal to the rotational speed (actual rotational speed) of the engine 4 is used as a condition for the shift from the charge preparation mode into the free mode is that the rotational speed of the first flywheel 13 is equal to the rotational speed (actual rotational speed) of the engine 4 in the charge preparation mode. A reason why the condition (the second condition GG2) that the number of attempts of engaging the first clutch 26 (the number of times of execution of one shot) within the predetermined period T2 has reached the predetermined number of times N2 is used as a condition is that when the condition for shift into the charge mode is not satisfied even in a stage where one shot has been executed the predetermined number of times N2 within the predetermined period T2, shift into the charge mode should be given up.

Shift from Charge Mode into Boost Preparation Mode

Figure 21:
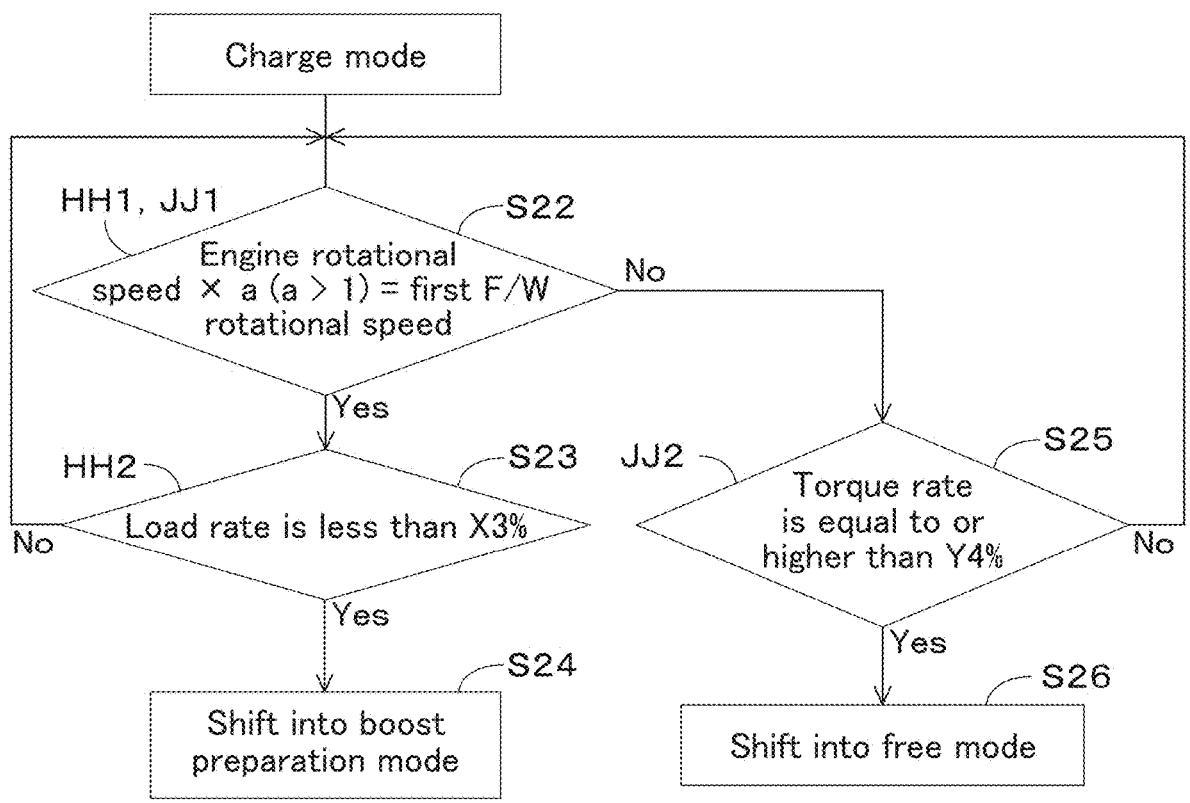
FIG. 21 is a flowchart illustrating a flow of operation performed when the operation mode shifts from a charge mode into a boost preparation mode or a free mode.

The shift from the charge mode into the boost preparation mode is described with reference to FIG. 21.

The shift from the charge mode into the boost preparation mode is executed when the rotational speed of the first flywheel 13 is equal to a target rotational speed thereof (first target rotational speed NA) higher than the rotational speed (actual rotational speed) of the engine 4 and the load rate of the engine 4 is less than a predetermined value X3(%). That is, the shift from the charge mode into the boost preparation mode is executed when a condition (first condition HH1) that the rotational speed of the first flywheel 13 is the first target rotational speed NA higher than the rotational speed (actual rotational speed) of the engine 4 and a condition (second condition HH2) that the load rate of the engine 4 is less than the predetermined value X3 are satisfied. The predetermined value X3 is stored in the storage unit 112.

The target rotational speed (first target rotational speed) NA of the first flywheel 13 is "the actual rotational speed of the engine 4×the speed increase ratio a of the speed increasing mechanism 20 (a>1)". For example, when speed increase ratio a=3, the first target rotational speed of the first flywheel 13=the actual rotational speed of the engine 4×3". That is, in this case, the target rotational speed of the first flywheel 13 is three times higher than the actual rotational speed of the engine 4. The speed increase ratio a is stored in the storage unit 112.

After the shift into the charge mode, the computation unit 111 of the controller 110 determines whether or not the first condition HH1 is satisfied (S22). Specifically, the computation unit 111 determines whether or not the first condition HH1 is satisfied on the basis of the rotational speed of the first flywheel 13 measured by the first rotational speed sensor 18, the rotational speed (actual rotational speed) of the engine 4 calculated by the second rotational speed sensor 15, and the first target rotational speed NA and the speed increase ratio a stored in the storage unit 112.

When the first condition HH1 is satisfied, the computation unit 111 determines whether or not the second condition HH2 is satisfied (S23). Specifically, the computation unit 111 (the load rate calculator 111a) determines whether or not the second condition HH2 is satisfied by calculating the load rate on the basis of the indicated injection amount detected by the accelerator opening sensor 19 and the restricted injection amount corresponding to the boost pressure stored in the storage unit 112 and comparing the load rate with the predetermined value X3 (S23).

When the first condition HH1 and the second condition HH2 are satisfied, the computation unit 111 (the operation mode decider 111d) decides to shift into the boost preparation mode. A control signal for shift into the boost preparation mode is thus transmitted from the controller 110 to the action unit 140, and the control system 100 shifts from the charge mode into the boost preparation mode (S24). In this case, the second hydraulic piston 75 of the second clutch 27 is driven on the basis of the control signal (one-shot pulse current) transmitted from the controller 110 to move the first friction plate 27A, and thereby the second clutch 27 is switching from a disengaged state thereof to an engaged state thereof (ineffective stroke filling state). When at least one of the first condition HH1 and the second condition HH2 is not satisfied (No in S22 or No in S23), the shift into the boost preparation mode does not occur.

A reason why the condition (the first condition HH1) that the rotational speed of the first flywheel 13 is the first target rotational speed NA higher than the rotational speed (actual rotational speed) of the engine 4 is used as a condition for shift from the charge mode into the boost preparation mode is that when the rotational speed of the first flywheel 13 has reached the first target rotational speed NA, it can be determined that rotational energy of an amount that can assist the engine 4 has been accumulated in the first flywheel 13. A reason why the condition (the second condition HH2) that the load rate of the engine 4 is less than the predetermined value X3 is used as a condition is that when the load rate of the engine 4 is small, it can be determined that it is unnecessary to assist the engine 4 (it is only necessary to make preparation for shift into the boost mode instead of shifting into the boost mode).

Shift from Charge Mode into Free Mode

The shift from the charge mode into the free mode is described with reference to FIG. 21.

The shift from the charge mode into the free mode is executed when the rotational speed of the first flywheel 13 is higher than the rotational speed (actual rotational speed) of the engine 4 and is less than the first target rotational speed NA and the torque rate of the engine 4 is equal to or higher than a predetermined value Y4. That is, the shift from the charge mode into the free mode is executed when a condition (first condition JJ1) that the rotational speed of the first flywheel 13 is higher than the rotational speed (actual rotational speed) of the engine 4 and is less than the first target rotational speed NA and a condition (second condition JJ2) that the torque rate of the engine 4 is equal to or higher than the predetermined value Y4 are satisfied. The first target rotational speed NA and the predetermined value Y4 are stored in the storage unit 112. As described above, the target rotational speed NA of the first flywheel 13 is "the actual rotational speed of the engine 4×the speed increase ratio a of the speed increasing mechanism 20 (a>1)".

After the shift into the charge mode, the computation unit 111 of the controller 110 determines whether or not the first condition JJ1 is satisfied (S22). Specifically, the computation unit 111 determines whether or not the first condition JJ1 is satisfied on the basis of the rotational speed of the first flywheel 13 measured by the first rotational speed sensor 18, the rotational speed (actual rotational speed) of the engine 4 calculated by the second rotational speed sensor 15, and the first target rotational speed NA and the speed increase ratio a stored in the storage unit 112. Note that in the charge mode, the rotational speed of the first flywheel 13 is higher than the actual rotational speed of the engine 4 and does not exceed the first target rotational speed NA, and therefore when "the engine rotational speed×a (a>1)=the first flywheel rotational speed" is not satisfied in step 22 performed after the shift into the charge mode, the condition that "the rotational speed of the first flywheel 13 is higher than the actual rotational speed of the engine 4 and is less than the first target rotational speed NA" is satisfied.

When the first condition JJ1 is satisfied, the computation unit 111 determines whether or not the second condition JJ2 is satisfied (S25). Specifically, the computation unit 111 (the torque rate calculator 111b) determines whether or not the second condition JJ2 is satisfied by calculating the torque rate on the basis of the indicated injection amount detected by the accelerator opening sensor 19 and the restricted injection amount of the full load curve stored in the storage unit 112 and comparing the torque rate with the predetermined value Y4 (S25).

When the first condition JJ1 and the second condition JJ2 are satisfied, the computation unit 111 (the operation mode decider 111d) decides to shift into the free mode. A control signal for shift into the free mode is thus transmitted from the controller 110 to the action unit 140, and the control system 100 shifts from the charge mode into the free mode (S26). In this case, the first clutch 26 is switched from an engaged state thereof to a disengaged state thereof on the basis of the control signal (first control signal) from the controller 110. When at least one of the first condition JJ1 and the second condition JJ2 is not satisfied (No in S22 or No in S25), the shift into the free mode does not occur.

A reason why the condition (the first condition JJ1) that the rotational speed of the first flywheel 13 is higher than the rotational speed (actual rotational speed) of the engine 4 and is less than the first target rotational speed NA and the condition (the second condition JJ2) that the torque rate of the engine 4 is equal to or higher than the predetermined value Y4 are used as conditions for the shift from the charge mode into the free mode is that when a large load is applied to the engine 4 in the middle of accumulating rotational energy of an amount that can assist the engine 4 in the first flywheel 13, the load applied to the engine 4 is decreased by shifting into the free mode.

Shift from Boost Preparation Mode into Boost Mode

Figure 22:
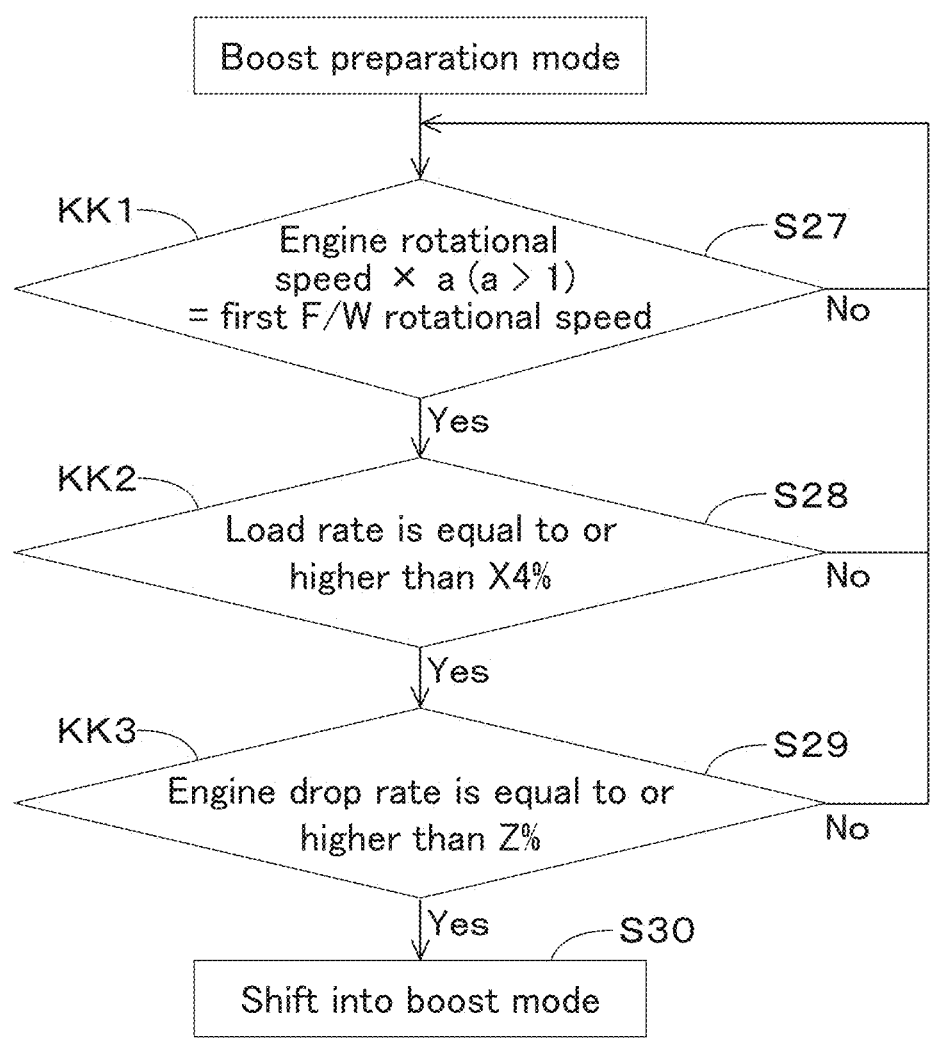
FIG. 22 is a flowchart illustrating a flow of operation performed when the operation mode shifts from a boost preparation mode into a boost mode.

The shift from the boost preparation mode into the boost mode is described with reference to FIG. 22.

The shift from the boost preparation mode into the boost mode is executed when the rotational speed of the first flywheel 13 is the first target rotational speed NA higher than the rotational speed (actual rotational speed) of the engine 4, the load rate of the engine 4 is equal to or higher than a predetermined value X4(%), and the drop rate of the engine 4 is equal to or higher than a predetermined value Z. That is, the shift from the boost preparation mode into the boost mode is executed when all of a condition (first condition KK1) that the rotational speed of the first flywheel 13 is the first target rotational speed NA higher than the rotational speed (actual rotational speed) of the engine 4, a condition (second condition KK2) that the load rate of the engine 4 is equal to or higher than the predetermined value X4, and a condition (third condition KK3) that the drop rate of the engine 4 is equal to or higher than the predetermined value Z are satisfied. The first target rotational speed NA, the predetermined value X3, and the predetermined value Z are stored in the storage unit 112. As described above, the target rotational speed NA of the first flywheel 13 is "the actual rotational speed of the engine 4×the speed increase ratio a of the speed increasing mechanism 20 (a>1)".

After the shift into the boost preparation mode, the computation unit 111 of the controller 110 determines whether or not the first condition KK1 is satisfied (S27). Specifically, the computation unit 111 determines whether or not the first condition KK1 is satisfied on the basis of the rotational speed of the first flywheel 13 measured by the first rotational speed sensor 18, the rotational speed (actual rotational speed) of the engine 4 calculated by the second rotational speed sensor 15, and the first target rotational speed NA and the speed increase ratio a stored in the storage unit 112.

When the first condition KK1 is satisfied, the computation unit 111 determines whether or not the second condition KK2 is satisfied (S28). Specifically, the computation unit 111 (the load rate calculator 111a) determines whether or not the second condition KK2 is satisfied by calculating the load rate on the basis of the indicated injection amount detected by the accelerator opening sensor 19 and the restricted injection amount corresponding to the boost pressure stored in the storage unit 112 and comparing the load rate with the predetermined value X4 (S28).

When the second condition KK2 is satisfied, the computation unit 111 determines whether or not the third condition KK3 is satisfied (S29). Specifically, the computation unit 111 (the drop rate calculator 111c) determines whether or not the third condition KK3 is satisfied by calculating the drop rate on the basis of the actual rotational speed of the engine 4 detected by the second rotational speed sensor 15 and the target rotational speed of the engine 4 stored in the storage unit 112 and comparing the drop rate with the predetermined value Z (S29).

When all of the first condition KK1, the second condition KK2, and the third condition KK3 are satisfied, the computation unit 111 (the operation mode decider 111d) decides to shift into the boost mode. A control signal for shift into the boost mode is thus transmitted from the controller 110 to the action unit 140, and the control system 100 shifts from the boost preparation mode into the boost mode (S30). In this case, the second clutch 27 is switched from an ineffective stroke filling state to a half clutch state and then into an engaged state thereof on the basis of the control signal (second control signal) from the controller 110. That is, the second clutch 27 is switched from a connection preparation state to an engaged state thereof. When at least one of the first condition KK1, the second condition KK2, and the third condition KK3 is not satisfied (No in S27 or No in S28 or No in S29), the shift into the boost mode does not occur.

A reason why the condition (the first condition KK1) that the rotational speed of the first flywheel 13 is the first target rotational speed NA higher than the rotational speed (actual rotational speed) of the engine 4 is used as a condition for the shift from the boost preparation mode into the boost mode is that when the rotational speed of the first flywheel 13 has reached the first target rotational speed NA, it can be determined that rotational energy of an amount that can assist the engine 4 has been accumulated in the first flywheel 13. A reason why the condition (the second condition KK2) that the load rate of the engine 4 is equal to or higher than the predetermined value X4 and the condition (the third condition KK3) that the drop rate of the engine 4 is equal to or higher than the predetermined value Z is used as conditions is that in a situation where these conditions are satisfied, there is a risk of engine stop unless the load on the engine 4 is decreased, and therefore it can be determined that the rotational power of the engine 4 needs to be assisted by the rotational power of the first flywheel 13.

Shift from Boost Mode into Holding-Out Mode

Figure 23:
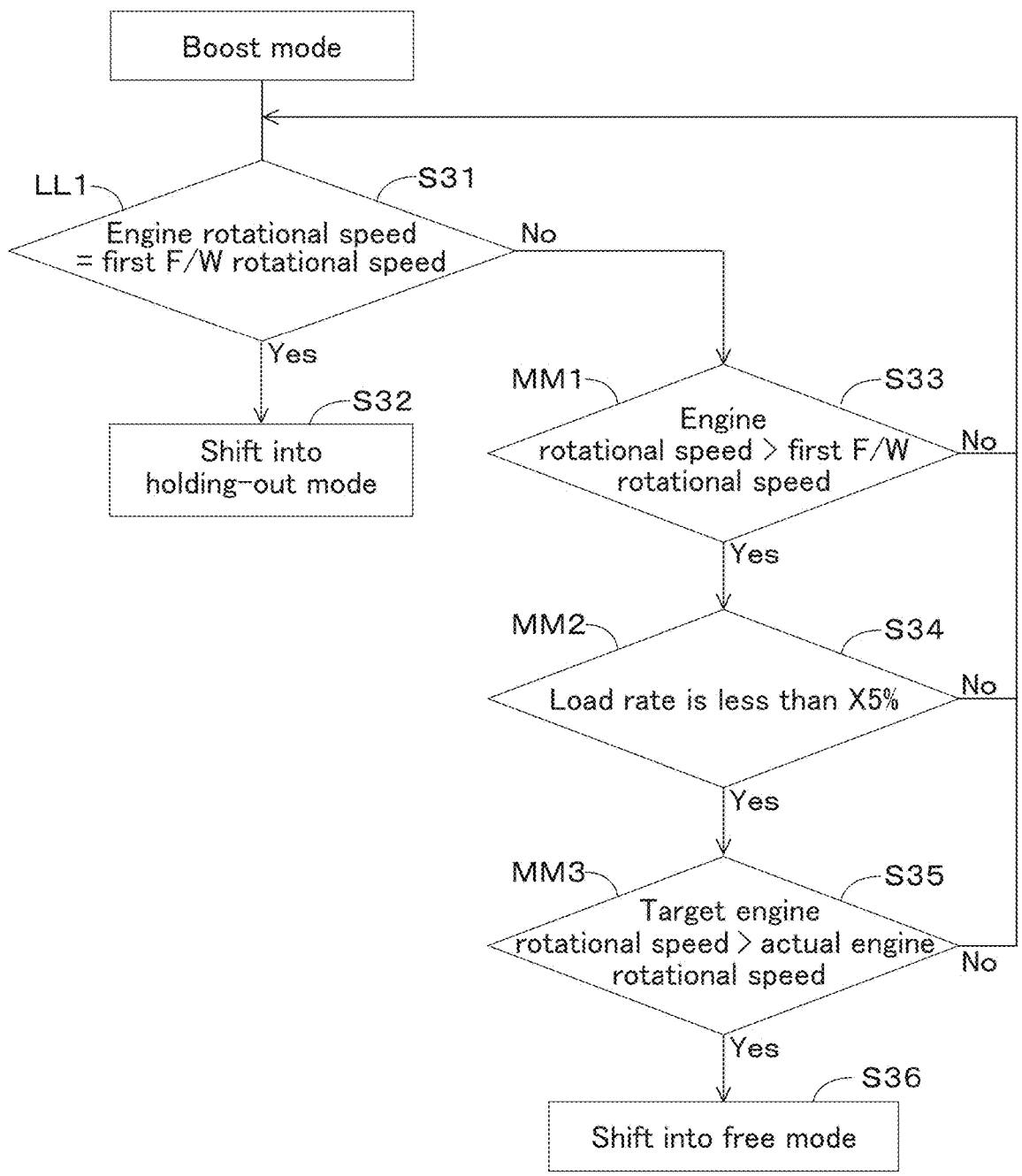
FIG. 23 is a flowchart illustrating a flow of operation performed when the operation mode shifts from a boost mode into a holding-out mode or a free mode.

The shift from the boost mode into the holding-out mode is described with reference to FIG. 23.

The shift from the boost mode into the holding-out mode is executed when the rotational speed of the first flywheel 13 is equal to the rotational speed (actual rotational speed) of the engine 4. That is, the shift from the boost mode into the holding-out mode is executed when a condition (condition LL1) that the rotational speed of the first flywheel 13 is equal to the rotational speed (actual rotational speed) of the engine 4 is satisfied.

After the shift into the boost mode, the computation unit 111 of the controller 110 determines whether or not the condition LL1 is satisfied (S31). Specifically, the computation unit 111 determines whether or not the condition LL1 is satisfied by comparing the rotational speed of the first flywheel 13 measured by the first rotational speed sensor 18 and the rotational speed (actual rotational speed) of the engine 4 calculated by the second rotational speed sensor 15.

When the condition LL1 is satisfied, the operation mode shifts into the holding-out mode (S32). Although the states of the first clutch 26 and the second clutch 27 are not changed from the ones in the boost mode, the rotational speed of the first flywheel 13 changes from a rotational speed higher than the actual rotational speed of the engine 4 to a rotational speed lower than the actual rotational speed of the engine 4. When the condition LL1 is not satisfied (No in S31), the shift into the holding-out mode does not occur.

A reason why the condition (the condition LL1) that the rotational speed of the first flywheel 13 is equal to the rotational speed (actual rotational speed) of the engine 4 is used as a condition for the shift from the boost mode into the holding-out mode is that when the rotational speed of the first flywheel 13 is equal to the rotational speed (actual rotational speed) of the engine 4, it can be determined that the rotational power accumulated in the first flywheel 13 is unable to assist the rotational power of the engine 4 (rotational energy that can be supplied for engine assist has run out). That is, it can be determined that the engine cannot be assisted in the boost mode, and therefore the operation mode shifts from the boost mode into the holding-out mode. In this way, the engine 4 can hold out although the rotational power of the engine 4 cannot be assisted, and a rapid decrease of the rotational speed of the engine 4 can be prevented or reduced.

Shift from Boost Mode into Free Mode

The shift from the boost mode into the free mode is described with reference to FIG. 23.

The shift from the boost mode into the free mode is executed when the rotational speed of the first flywheel 13 is lower than the rotational speed (actual rotational speed) of the engine 4, the load rate of the engine 4 is less than a predetermined value X5(%), and the actual rotational speed of the engine 4 is less than the target rotational speed. That is, the shift from the boost mode into the free mode is executed when all of a condition (first condition MMM1) that the rotational speed of the first flywheel 13 is lower than the rotational speed (actual rotational speed) of the engine 4, a condition (second condition MM2) that the load rate of the engine 4 is less than a predetermined value X5, and a condition (third condition MM3) that the actual rotational speed of the engine 4 is less than the target rotational speed are satisfied. The predetermined value X5 and the target rotational speed of the engine 4 are stored in the storage unit 112.

After the shift into the boost mode, the computation unit 111 of the controller 110 determines whether or not the first condition MM1 is satisfied (S33). Specifically, the computation unit 111 determines whether or not the first condition MM1 is satisfied by comparing the rotational speed of the first flywheel 13 measured by the first rotational speed sensor 18 and the rotational speed (actual rotational speed) of the engine 4 calculated by the second rotational speed sensor 15.

When the first condition MM1 is satisfied, the computation unit 111 determines whether or not the second condition MM2 is satisfied (S34). Specifically, the computation unit 111 (the load rate calculator 111a) determines whether or not the second condition MM2 is satisfied by calculating the load rate on the basis of the indicated injection amount detected by the accelerator opening sensor 19 and the restricted injection amount corresponding to the boost pressure stored in the storage unit 112 and comparing the load rate with the predetermined value X5 (S34).

When the second condition MM2 is satisfied, the computation unit 111 determines whether or not the third condition MM3 is satisfied (S34). Specifically, the computation unit 111 determines whether or not the third condition MM3 is satisfied by comparing the actual rotational speed of the engine 4 detected by the second rotational speed sensor 15 and the target rotational speed of the engine 4 stored in the storage unit 112 (S35).

When all of the first condition MM1, the second condition MM2, and the third condition MM3 are satisfied, the computation unit 111 (the operation mode decider 111d) decides to shift into the free mode. A control signal for shift into the free mode is thus transmitted from the controller 110 to the action unit 140, and the control system 100 shifts from the boost mode into the free mode (S36). In this case, the second clutch 27 is switched from an engaged state thereof to a disengaged state thereof on the basis of the control signal (second control signal) from the controller 110. When at least one of the first condition MM1, the second condition MM2, and the third condition MM3 is not satisfied (No in S33 or No in S34 or No in S35), the shift into the free mode does not occur.

A reason why the condition (the first condition MM1) that the rotational speed of the first flywheel 13 is lower than the rotational speed (actual rotational speed) of the engine 4 is used as a condition for the shift from the boost mode into the free mode is that when the rotational speed of the first flywheel 13 is lower than the rotational speed (actual rotational speed) of the engine 4, it can be determined that the rotational power of the engine 4 cannot be assisted by the rotational power of the first flywheel 13 (the boost mode cannot be maintained).

A reason why the condition (the second condition MM2) that the load rate of the engine 4 is less than the predetermined value X5 is that when a load applied to the engine 4 decreases and assist becomes unnecessary while the rotational power of the engine 4 is being assisted by the rotational power of the first flywheel 13 in the boost mode, it is necessary to prevent the rotational power of the first flywheel 13 from assisting the engine 4 although the load on the engine 4 is light. A reason why the condition (the third condition MM3) that the actual rotational speed of the engine 4 is less than the target rotational speed is used as a condition is that the actual rotational speed of the engine 4 is less than the target rotational speed in the boost mode since the actual rotational speed of the engine 4 is recovering (increasing) from a decreased state.

Shift into Engine Off Mode

The shift into the engine off mode is performed by a key off operation or the like performed by an operator on the working vehicle 1. By performing a key off operation or the like in an operation mode other than the engine off mode, the engine 4 is brought into an off state (a state where a spark plug is not ignited), and thereby the operation mode shifts into the engine off mode. When the first clutch 26 and the second clutch 27 include a clutch that is not engaged when the operation mode shifts into the engine off mode, this clutch is connected on the basis of a control signal (first control signal or the second control signal) from the controller 110. The first clutch 26 and the second clutch 27 are thus brought into an engaged state thereof. However, in the engine off mode, one or both of the first clutch 26 and the second clutch 27 need not be engaged when the rotational speed of the first flywheel 13 is sufficiently low (for example, equal to or lower than the idling rotational speed of the engine 4), as described above.

Additional Description Concerning Shift of Operation Mode

Additional description concerning the shift of the operation mode is given below.

As is clear from FIG. 15 and the above description, the control system 100 cannot shift from the free mode into the charge preparation mode and then into the charge mode although the control system 100 can shift from the free mode into the holding-out preparation mode and then into the holding-out mode. The shift into the charge mode needs to be executed after shift from the holding-out mode into the charge preparation mode. That is, shift into the holding-out mode is needed for shift from the free mode into the charge mode. A reason for this is described below.

In the charge mode, the first clutch 26 is engaged, and thereby the rotational speed of the first flywheel 13 becomes higher than the rotational speed (actual rotational speed) of the engine 4 (for example, three times higher than the rotational speed of the engine when the speed increase ratio is 3). A large load is thus applied to the engine 4. Therefore, if the operation mode shifts from the free mode into the charge mode occurs without shifting into the holding-out mode, a large load is rapidly applied to the engine 4. On the other hand, in the holding-out mode, the second clutch 27 is engaged, and therefore the rotational speed of the first flywheel 13 becomes equal to or lower than the rotational speed (actual rotational speed) of the engine 4. Accordingly, a load applied to the engine 4 is small. It is therefore possible to prevent a load from being rapidly applied to the engine 4 by shifting the operation mode from the free mode into the holding-out mode once and then into the charge mode.

In the working vehicle 1, it is desirable to rotate the first flywheel 13 at a rotational speed higher than the rotational speed of the engine 4 so that the engine 4 can be assisted when the load on the engine 4 increases due to an increase of a work load or the like. For this purpose, the rotational power of the engine 4 needs to be speed-increased and the speed-increased rotational power needs to be transmitted to the first flywheel 13 by shifting the operation mode into the charge mode. However, if the operation mode shifts into the charge mode in a state where the work load is large, the load on the engine 4 increases and hinders work. In view of this, the control system 100 is configured to increase the rotational speed of the first flywheel 13 in stages by shifting the operation mode from the free mode into the holding-out mode and then into the charge mode while checking if the load on the engine 4 hinders work.

As described above, there are a case where the load rate of the engine 4 is used as a condition for shift of the operation mode and a case where the torque rate of the engine 4 is used as a condition for shift of the operation mode. This is described below. A reason why there is a case where the torque rate is used instead of the load rate is that the load rate is 100% while the rotational speed of the engine 4 is increasing even when the load on the engine 4 is small. For example, when the operation mode shifts from the charge preparation mode into the charge mode, the first clutch 26 is brought into an engaged state thereof and the rotational speed of the first flywheel 13 increases, and thereby the rotational speed of the engine 4 increases. In this case, "the load rate is less than a predetermined value" is used as a condition (threshold value) for shift from the charge preparation mode into the charge mode, the operation mode cannot shift into the charge mode. On the other hand, when the load on the engine 4 is small, the torque rate does not become 100% even when the rotational speed of the engine 4 increases, and therefore when "the torque rate is less than a predetermined value" is used as a condition (threshold value) for shift from the charge preparation mode into the charge mode, the operation mode can shift into the charge mode.

As described above, in a state where the rotational speed of the engine 4 is increasing (the rotational speed of the first flywheel 13 is increasing) while the work load is small, deviation occurs between the load rate and the torque rate. By using the torque rate as a condition for shift of the operation mode instead of the load rate while the rotational speed of the engine 4 is increasing, shift of the operation mode can be performed with certainty even in a state where the rotational speed of the engine 4 is increasing while the work load is small.

It is therefore preferable to use the load rate as a condition for shift of the operation mode in a state where the rotational speed of the engine 4 is increasing (the rotational speed of the first flywheel 13 is increasing) and use the torque rate as a condition for shift of the operation mode in a state where the rotational speed of the engine 4 is not increasing (the rotational speed of the first flywheel 13 is not increasing).

The load rates X1, X2, X3, X4, and X5 used as conditions (threshold values) for shift of the operation mode may be the same value or some of or all of the load rates X1, X2, X3, X4, and X5 may be different values. All of the torque rates Y1, Y2, Y3, and Y4 may be the same value or some of or all of the torque rates Y1, Y2, Y3, and Y4 may be different values. The predetermined periods T1 and T2 may be the same or may be different. The number of times of one shot N1 and the number of times of one shot N2 may be the same or may be different.

As described above, shift into each operation mode (switching between a plurality of operation modes) is executed when a predetermined condition is satisfied except for shift into the engine off mode.

The controller 110 is configured or programmed to perform control engaged/disengaged states of the first clutch 26 and the second clutch 27 to switch the plurality of operation modes. To "perform control engaged/disengaged states of the first clutch 26 and the second clutch 27" includes a method (first method) in which the controller 110 transmits a control signal (the first control signal, the second control signal) for turning on/off the first clutch 26 and/or the second clutch 27 and thereby switches engaged/disengaged states of the first clutch 26 and/or the second clutch 27 on the basis of the control signal and a method (second method) in which the controller 110 is configured or programmed to notify the operator that the first clutch 26 and/or the second clutch 27 can be switched and the operator switches on/off the first clutch 26 and/or the second clutch 27 by performing predetermined operation on the basis of the notification. In the control system 100, the first method may be used or the second method may be used.

Although the first method and the second method can be applied to shift of all the operation modes (except for shift into the engine off mode), the second method can be suitably applied especially to shift from the charge mode into the boost preparation mode.

The following describes a case where the second method is applied to the shift from the charge mode into the boost preparation mode. In this case, in the charge mode, when the rotational speed of the first flywheel 13 has reached the first target rotational speed (the first condition HH1) and the load rate of the engine 4 is less than the predetermined value X3 (the second condition HH2), the controller 110 is configured or programmed to notify the operator that switching (shift) from the charge mode into the boost preparation mode can be performed.

In this case, the operation mode decider 111d of the controller 110 is configured or programmed to notify the operator that switching (shift) into the boost preparation mode can be performed after deciding to shift from the charge mode into the boost preparation mode. The controller 110 transmits a control signal for shift into the boost preparation mode to the action unit 140 on the basis of operator's operation instead of automatically transmitting a control signal for shift into the boost preparation mode to the action unit 140 on the basis of the decision of the operation mode decider 111*d*. That is, the controller 110 first notifies the operator that shift into the boost preparation mode can be performed, and transmits a control signal for shift into the boost preparation mode to the action unit 140 when the operator performs operation for switching into the boost preparation mode in response to this notification.

Figure 24A:
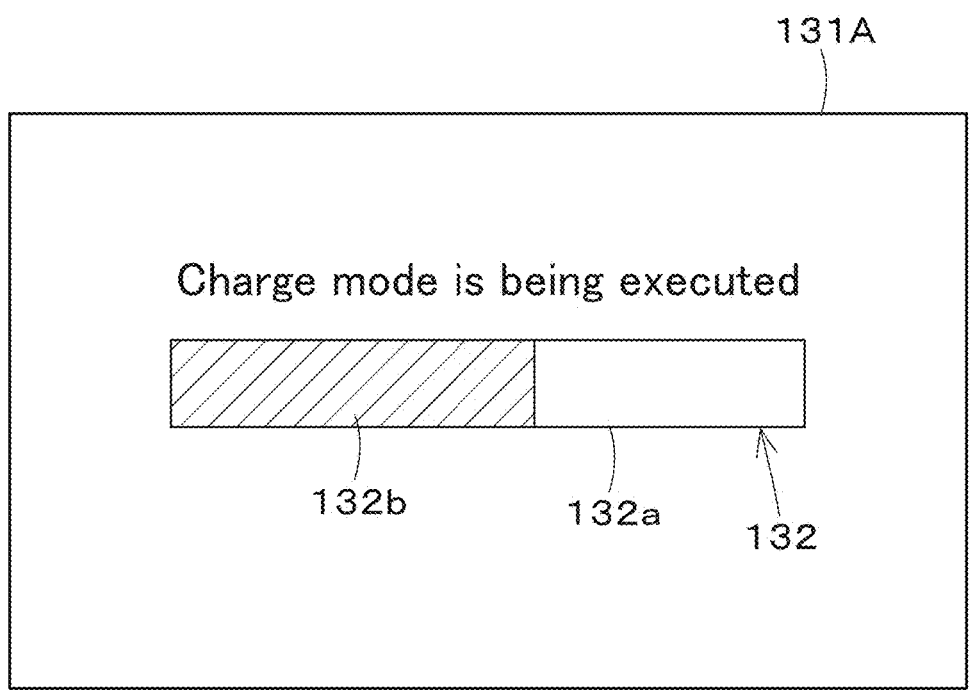
FIG. 24A illustrates an example of a screen displayed when a notification that the operation mode can be switched from the charge mode to the boost preparation is provided by being displayed on a screen of a display input device and illustrates a state in which the operation mode cannot be switched to the boost preparation mode.
Figure 24B:
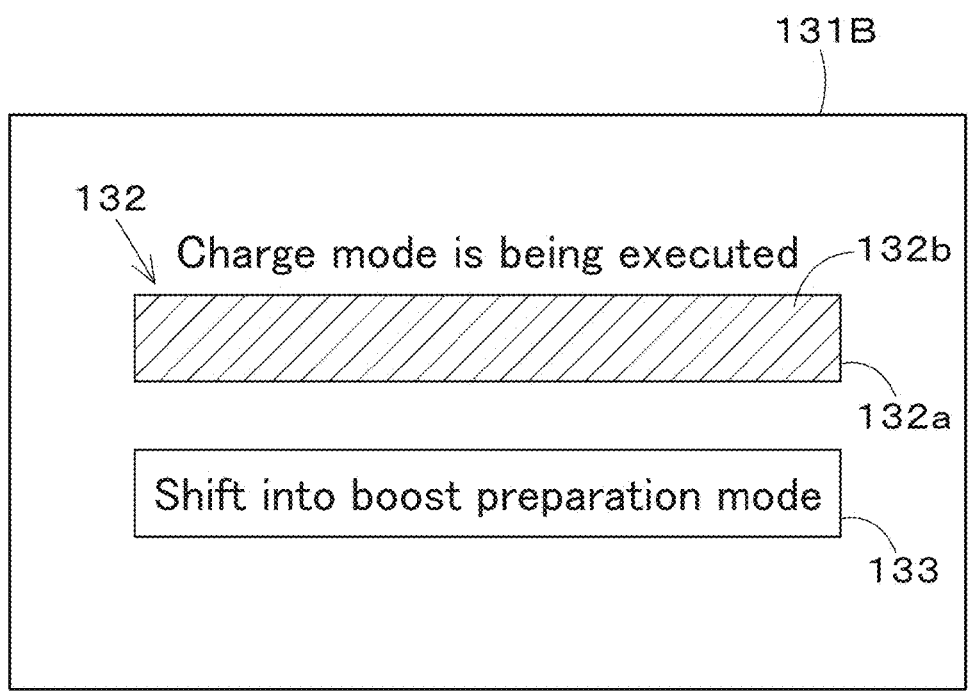
FIG. 24B illustrates an example of a screen displayed when a notification that the operation mode can be switched from the charge mode to the boost preparation is provided by being displayed on the screen of the display input device and illustrates a state in which the operation mode can be switched to the boost preparation mode.

The notification that the shift from the charge mode into the boost preparation mode can be performed is, for example, displayed on a screen of the display input device 130. FIGS. 24A and 24B illustrate an example of the screen displayed when the notification that the shift from the charge mode into the boost preparation mode can be performed is displayed on the screen of the display input device 130. FIGS. 24A and 24B illustrate a case where the display input device 130 is a touch panel display.

FIG. 24A illustrates a screen 131A of the display input device 130 displayed in a state where switching from the charge mode into the boost preparation mode cannot be performed (a state where the first condition HH1 or the second condition HH2 is not satisfied) in the charge mode. In this state, only information indicating that the charge mode is being executed (charge is in progress) is displayed on the screen 131A. In this state, the operator cannot perform operation for switching from the charge mode into the boost preparation mode. An indicator 132 indicative of a charge progress status (a status of accumulation of rotational energy into the first flywheel 13) is displayed on the screen 131A. In the example illustrated in FIG. 24A, the indicator 132 indicates a charge progress status by a length of a bar graph 132*b* in a display frame 132*a*. The charge progress status is calculated by "the actual rotational speed of the first flywheel 13/the target rotational speed of the first flywheel 13). The operator can easily grasp the charge progress status by visually checking the indicator 132.

FIG. 24B illustrates a screen 131B of the display input device 130 displayed in a state where switching from the charge mode into the boost preparation mode can be performed (a state where both of the first condition HH1 and the second condition HH2 are satisfied) in the charge mode. In this state, the indicator 132 indicates that charge is 100% (the actual rotational speed of the first flywheel 13 has reached the target rotational speed) on the screen 131B. Furthermore, an indication 133 "shift into boost preparation mode" is displayed. This indication 133 is a notification that switching from the charge mode into the boost preparation mode can be performed. In this state, the operator can perform operation for switching from the charge mode into the boost preparation mode by touching the indication 133 "shift into boost preparation mode". That is, the controller 100 transmits a control signal to the second clutch 27 on the basis of the operator's touch operation of the indication 133.

Note that a method of the notification that switching from the charge mode into the boost preparation mode can be performed is not limited to displaying on the screen of the display input device 130. For example, the notification may be given by turning on or blinking a lamp such as an LED or may be given by sound. Furthermore, a method by which the operator performs switching operation from the charge mode into the boost preparation mode in response to the notification is not limited to the method of touching the screen of the display input device 130. For example, the switching operation may be performed by operating an operation switch (e.g., an operation button) provided separately from the display input device 130.

Figure 25:
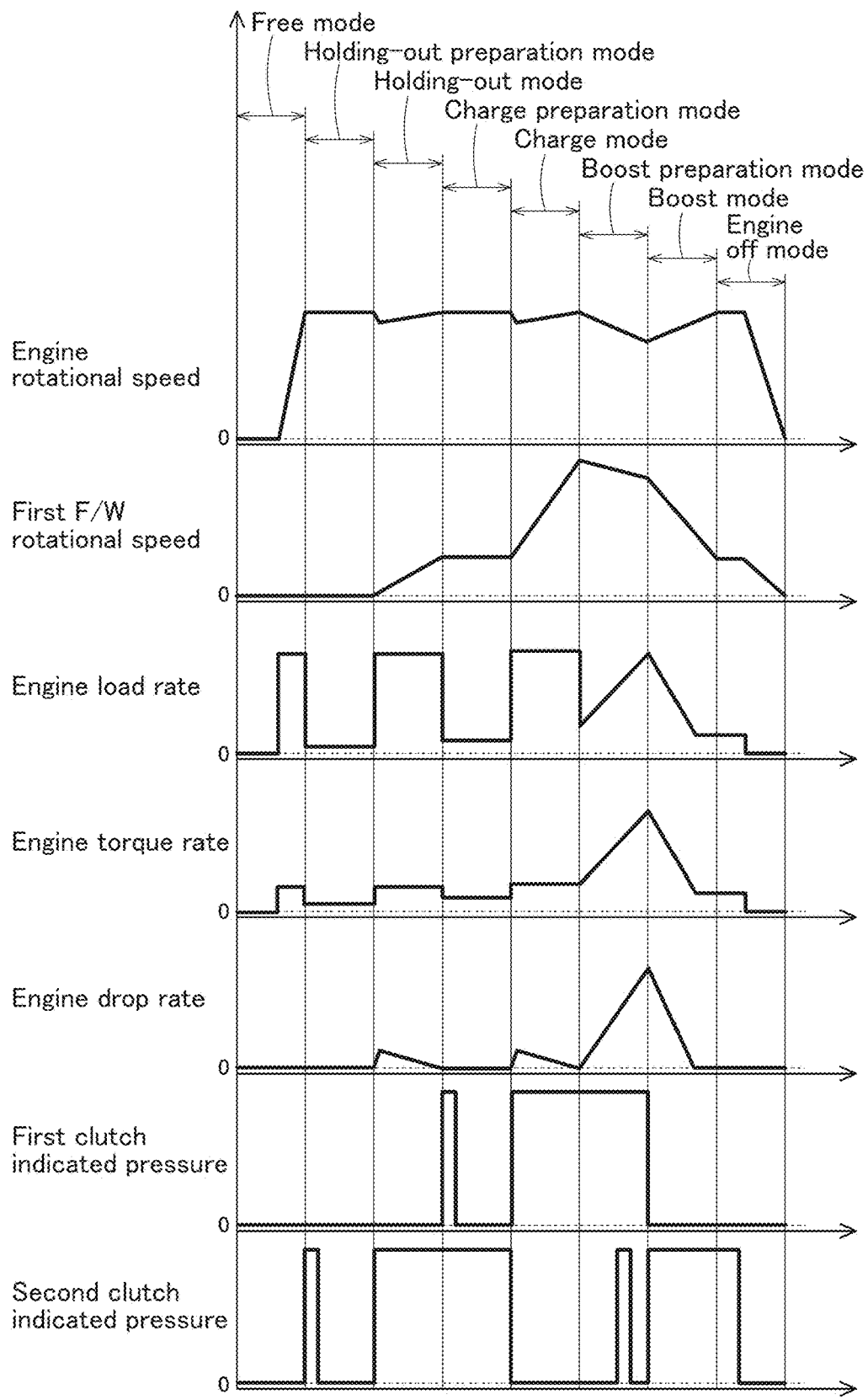
FIG. 25 is an example of a timing diagram of the control system.

FIG. 25 is an example of a timing diagram of the control system 100.

An example of shift of the operation mode by the control system 100 is described below with reference to FIG. 25. Note that FIG. 25 illustrates a case where all of the load rates X1 to X5 used as conditions for shift of the operation mode are the same and all of the torque rates Y1 to Y4 are the same.

When the engine 4 is activated, the operation mode shifts into the free mode, and the rotational speed (actual rotational speed) of the engine 4 increases with passage of time. At this time, the indicated pressure (first indicated pressure) of the first clutch 26 and the indicated pressure (second indicated pressure) of the second clutch 27 are 0, and the first clutch 26 and the second clutch 27 are disengaged. Accordingly, the rotational speed (actual rotational speed) of the first flywheel 13 is 0. The load rate and the torque rate of the engine 4 rise in response to the activation of the engine 4 and lower when the engine 4 reaches the target rotational speed.

When the load rate of the engine 4 decreases to a value less than the predetermined value X1 in a state where the rotational speed of the first flywheel 13 is lower than the rotational speed (actual rotational speed) of the engine 4 (0), the operation mode shifts from the free mode into the holding-out preparation mode. In the holding-out preparation mode, the first clutch 26 maintains a disengaged state thereof, but the second clutch 27 is brought into an ineffective stroke filling state by execution of one shot (application of a one-shot pulse current).

When the torque rate of the engine 4 is less than the predetermined value Y1 in a state where the actual rotational speed of the engine 4 has reached the target rotational speed and the rotational speed of the first flywheel 13 is lower than the rotational speed (actual rotational speed) of the engine 4 (0), the operation mode shifts from the holding-out preparation mode into the holding-out mode. In the holding-out mode, the first clutch 26 maintains a disengaged state thereof, but the second clutch 27 is engaged. Since the second clutch 27 is engaged, the first flywheel 13 rotates and increases its speed.

When a control signal for switching the second clutch 27 from a connection preparation state into an engaged state thereof is transmitted in a state where the torque rate of the engine 4 is low (less than the predetermined value Y1) in the holding-out preparation mode, the second clutch 27 switches to an engaged state thereof, and the operation mode shifts into the holding-out mode.

When the second clutch 27 is engaged, the first flywheel 13 and the engine 4 are connected, and thereby the rotational speed (actual rotational speed) of the engine 4 temporarily decreases but then recovers to the target rotational speed. Furthermore, since the second clutch 27 is engaged, the first flywheel 13 starts rotation and increases to a rotational speed equal to the actual rotational speed of the engine 4. At this time, the load rate and the torque rate of the engine 4 are high. The drop rate of the engine 4 temporarily increases when the second clutch 27 is engaged, but then decreases.

When the rotational speed of the first flywheel 13 reaches a rotational speed equal to the rotational speed (actual rotational speed) of the engine 4 in the holding-out mode, the load rate and the torque rate of the engine 4 decrease. When the load rate becomes less than the predetermined value X2, a rapid decrease of the rotational speed of the engine 4 becomes less likely to occur, and therefore the operation mode shifts from the holding-out mode into the charge preparation mode. In the charge preparation mode, the first clutch 26 is brought into an ineffective stroke filling state by execution of one shot (application of a one-shot pulse current), and the second clutch 27 is switched from an engaged state thereof into a disengaged state thereof.

When the torque rate of the engine 4 becomes less than the predetermined value Y3 in a state where the rotational speed of the first flywheel 13 is equal to the rotational speed (actual rotational speed) of the engine 4, the operation mode shifts from the charge preparation mode into the charge mode. In the charge mode, the first clutch 26 is engaged, and the second clutch 27 maintains a disengaged state thereof. Since the first clutch 26 is engaged, the rotational speed (actual rotational speed) of the engine 4 temporarily decreases but then recovers to the target rotational speed. Furthermore, since the first clutch 26 is engaged, the rotational speed of the first flywheel 13 increases to exceed the actual rotational speed of the engine 4.

When the rotational speed of the first flywheel 13 reaches the first target rotational speed NA higher than the rotational speed (actual rotational speed) of the engine 4 and the load rate of the engine 4 is less than the predetermined value X3, the operation mode shifts from the charge mode into the boost preparation mode. In the boost preparation mode, the first clutch 26 maintains a engaged state thereof, and the second clutch 27 is brought into an ineffective stroke filling state by execution of one shot (application of a one-shot pulse current).

As illustrated in FIG. 25, the load rate, the torque rate, and the drop rate of the engine 4 rapidly increase and the rotational speed (actual rotational speed) of the engine 4 decreases due to rapid increase of the work load of the working vehicle 1 after shift into the boost preparation mode. In this state, the rotational power of the engine 4 needs to be assisted by the rotational power of the first flywheel 13. It is therefore necessary to shift the operation mode from the boost preparation mode into the boost mode.

The shift from the boost preparation mode into the boost mode is executed when the rotational speed of the first flywheel 13 is the first target rotational speed NA higher than the rotational speed (actual rotational speed) of the engine 4 (becomes the first target rotational speed in an initial stage of the boost preparation mode in FIG. 25), the load rate of the engine 4 is equal to or higher than the predetermined value X4(%), and the drop rate of the engine 4 is equal to or higher than the predetermined value Z.

In the boost mode, the first clutch 26 is switched to a disengaged state thereof, and the second clutch 27 is switched to an engaged state thereof. In this way, the rotational power of the first flywheel 13 is transmitted to the engine 4, and the rotational power of the engine 4 is assisted by the rotational power of the first flywheel 13. This increases the rotational speed (actual rotational speed) of the engine 4 and decreases the load rate, the torque rate, and the drop rate of the engine 4. The rotational speed of the first flywheel 13 decreases as an assist period becomes longer.

A state where the operation mode has switched from the boost mode into the engine off mode is illustrated in FIG. 25. When the engine is turned off in the boost mode, the engine 4 and the first flywheel 13 gradually decelerates while rotating due to inertial force. In the engine off mode, the first clutch 26 and/or the second clutch 27 are engaged, and the first flywheel 13 is connected to the engine 4 through the first clutch 26 and/or the second clutch 27. It is therefore possible to stop the first flywheel 13 having large inertial force in a short time. Although a case where only the second clutch 27 is engaged is illustrated in FIG. 25, both of the first clutch 26 and the second clutch 27 may be engaged.

Effects

Characteristic configurations of a working vehicle 1 according to the above example embodiment and effects based on the configurations are as follows.

A working vehicle 1 includes an engine 4, a first flywheel 13 to rotate upon receipt of rotational power of the engine 4, a transmission 16 to selectively receive the rotational power of the engine 4 or rotational power of the engine 4 and the first flywheel 13, speed-change the received rotational power, and output the speed-changed rotational power, a first power transmission path 31 to transmit the rotational power of the engine 4 to the first flywheel 13, and a second power transmission path 32 to transmit the rotational power of the first flywheel 13 to the transmission 16. The first power transmission path 31 and the second power transmission path 32 are independent of each other. The first power transmission path 31 includes a first clutch 26 to selectively allow or interrupt transmission of rotational power from the engine 4 to the first flywheel 13. The second power transmission shaft 32 includes a second clutch 27 to selectively allow or interrupt transmission of rotational power from the first flywheel 13 to the transmission 16.

According to this configuration, the first power transmission path 31 that transmits the rotational power of the engine 4 to the first flywheel 13 and the second power transmission path 32 that transmits the rotational power of the first flywheel 13 to the transmission 16 are independent of each other. Therefore, when a transmission mechanism is provided on one of the paths, the transmission mechanism does not influence the other path. It is therefore possible to speed-increase the rotational power output from the engine 4 by the first power transmission path 31 and then transmit the speed-increased rotational power to the first flywheel 13 and to output the transmitted rotational power to the transmission 16 without decelerating the rotational power on the second power transmission path 32. Furthermore, since a clutch (the first clutch 26 or the second clutch 27) to selectively allow or interrupt transmission of the rotational power is provided on each path, it is possible to switch between a state where the rotational power of the engine 4 is transmitted to the first flywheel 13 and a state where the rotational power of the first flywheel 13 is output to the transmission 16. This makes it possible to accumulate the rotational power of the engine 4 in the first flywheel 13 as rotational energy when the work load is small, and assist the rotational power of the engine 4 by the rotational power of the first flywheel 13 when the work load of the engine 4 is large.

The first power transmission path 31 includes a speed increasing mechanism 20 to speed-increase the rotational power of the engine 4 and transmits the speed-increased rotational power to the first flywheel 13. The second power transmission path 32 transmits the rotational power of the first flywheel 13 to the transmission 16 without passing through a speed reduction mechanism.

According to this configuration, the rotational power of the engine 4 can be speed-increased by the speed increasing mechanism 20 and the speed-increased rotational power is transmitted to the first flywheel 13, and the rotational power of the first flywheel 13 can be output to the transmission 16 without being speed-reduced. This makes it possible to accumulate high rotational energy in the first flywheel 13, and transmit this high rotational energy to the transmission 16 as it is. Therefore, when the work load is large, the rotational power of the engine 4 can be effectively assisted by the rotational power of the first flywheel 13.

The working vehicle 1 includes a third power transmission path 33 to transmit the rotational power of the engine 4 to the transmission 16 without passing through the first flywheel 13. The third power transmission path 33 constantly connects the output shaft 4a of the engine 4 and the input shaft 16a of the transmission 16.

According to this configuration, the rotational power of the engine 4 can be transmitted to the transmission 16 without passing through the first flywheel 13 by the third power transmission path 33, and therefore the rotational power of the engine 4 can be input to the transmission 16 independently of rotation of the first flywheel 13.

The speed increasing mechanism 20 includes a planetary gear mechanism including a sun gear 21, a planetary gear 22, and a ring gear 23. The ring gear 23 is fixed non-rotatably. The rotational power of the engine 4 is input to the planetary gear 22 and transmitted to the first flywheel 13 via the sun gear 21. The rotational power of the first flywheel 13 is transmitted to the transmission 16 without passing through the planetary gear mechanism.

According to this configuration, the rotational power of the engine 4 can be speed-increased by being transmitted from the planetary gear 22 to the sun gear 21, and the speed-increased rotational power can be input to the first flywheel 13. Furthermore, by transmitting the rotational power of the first flywheel 13 to the transmission 16 without passing through the planetary gear mechanism, the rotational power of the first flywheel 13 can be output to the transmission 16 without being speed-reduced.

The working vehicle 1 includes a second flywheel 14 connected to an output shaft 4a of the engine 4. The first flywheel 13 is rotatable independently of the second flywheel 14.

According to this configuration, when the first clutch 26 and the second clutch 27 are disengaged, the first flywheel 13 can be rotated irrespective of rotation of the second flywheel 14. This makes it possible to maintain rotation of the first flywheel 13 without influence from the second flywheel 14 even when the second flywheel 14 has been stopped or speed-reduced.

The first flywheel 13 is located between the second flywheel 14 and the transmission 16 in an axial direction of the output shaft 4a of the engine 4.

According to this configuration, a radial size (external diameter dimension) of the power transmission mechanism 6 can be made small, and power transmission from the second flywheel 14 to the first flywheel 13 and power transmission from the second flywheel 14 to the transmission 16 can be smoothly performed.

The working vehicle 1 includes an intermediate shaft 17 interposed between the output shaft 4a of the engine 4 and the transmission 16 to define the third power transmission path 33. The intermediate shaft 17 extends through the first flywheel 13.

According to this configuration, the third power transmission path 33 is defined by the intermediate shaft 17 that extends through the first flywheel 13, and therefore the third power transmission path 33 can be configured as a linear path of a short distance without using a complicated mechanism.

The first clutch 26 and the second clutch 27 are arranged in a radial direction of the intermediate shaft 17. Accordingly, both of the first clutch 26 and the second clutch 27 can be arranged along a wall of the housing 9. Accordingly, a fluid passage for supplying a hydraulic fluid to the first clutch 26 and a fluid passage for supplying a hydraulic fluid to the second clutch 27 can be provided along the wall. It is therefore easy to provide a fluid passage for supplying a hydraulic fluid to the first clutch 26 and a fluid passage for supplying a hydraulic fluid to the second clutch 27.

The first clutch 26 and the second clutch 27 are arranged in an axial direction of the intermediate shaft 17. Accordingly, the external diameter of the clutch device 25 including the first clutch 26 and the second clutch 27 can be made small. It is therefore possible to reduce an inner diameter of the first flywheel 13 while maintaining the external diameter of the first flywheel 13 and increase moment of inertia.

The working vehicle 1 includes a housing 9 to store the first flywheel 13, the first clutch 26, and the second clutch 27, and a partition wall 9d to partition an inside of the housing 9 into a space in which the first flywheel 13 is stored and a space in which the first clutch 26 and the second clutch 27 are stored. The first clutch 26 and the second clutch 27 face the partition wall 9d.

According to this configuration, a fluid passage for supplying a hydraulic fluid to the first clutch 26 and a fluid passage for supplying a hydraulic fluid to the second clutch 27 can be provided along the partition wall 9d. It is therefore easy to provide a fluid passage for supplying a hydraulic fluid to the first clutch 26 and a fluid passage for supplying a hydraulic fluid to the second clutch 27.

The first clutch 26 and the second clutch 27 are multiplate clutches each including a plurality of friction plates and are located radially inward of the first flywheel 13.

According to this configuration, the first clutch 26 and the second clutch 27 are multiplate clutches, and therefore the external diameter can be reduced while maintaining high power transmission performance. Furthermore, since the first clutch 26 and the second clutch 27 are disposed radially inward of the first flywheel 13, the axial length (a length in the front-rear direction) of the first flywheel 13 can be made long. It is therefore possible to increase the moment of inertia of the first flywheel 13 and increase rotational energy that can be accumulated in the first flywheel 13.

A working vehicle 1 includes an engine 4, a flywheel 13 (i.e., a first flywheel 13, the same applies hereinafter) to rotate upon receipt of rotational power of the engine 4, a first path to connect the engine 4 and the flywheel, a first clutch 26 provided on the first path to selectively allow or interrupt transmission of rotational power via the first path, a second path to connect the engine 4 and the flywheel, a second clutch 27 provided on the second path to selectively allow or interrupt transmission of rotational power via the second path, a speed increasing mechanism 20 provided on the first path to, when the first clutch 26 is engaged, speed-increase the rotational power of the engine and transmit the speed-increased rotational power to the flywheel 13, and a controller 110 configured or programmed to perform control engaged/disengaged states of the first clutch 26 and the second clutch 27 to switch an operation mode between a plurality of operation modes. The plurality of operation modes include a boost mode in which a rotational speed of the flywheel 13 is higher than a rotational speed of the engine 4, the first clutch 26 is disengaged, and the second clutch 27 is engaged, and a holding-out mode in which the rotational speed of the flywheel 13 is equal to or lower than the rotational speed of the engine 4, the first clutch 26 is disengaged, and the second clutch 27 is engaged.

According to this configuration, the rotational power of the flywheel 13 can be efficiently used not only when the rotational speed of the flywheel 13 is high enough to assist the rotational power of the engine 4, but also when the rotational speed of the flywheel 13 is not high enough to assist the rotational power of the engine 4. Specifically, in the boost mode, the rotational speed of the flywheel 13 is high enough to assist the rotational power of the engine 4, and therefore the rotational power of the engine 4 can be assisted by the rotational power of the flywheel 13. In the holding-out mode, the rotational speed of the flywheel 13 is not high enough to assist the rotational power of the engine 4, but a rapid decrease of the rotational speed of the engine 4 can be prevented by inertial force of the flywheel 13.

The plurality of operation modes include a charge mode in which the rotational speed of the flywheel 13 is lower than a target rotational speed and is higher than the rotational speed of the engine 4, the first clutch 26 is engaged, and the second clutch 27 is disengaged.

According to this configuration, in the charge mode, high rotational energy can be accumulated in the flywheel 13 by accelerating the rotational power of the engine 4 and transmitting the speed-increased rotational power to the flywheel 13.

The plurality of operation modes include a holding-out preparation mode to be executed before shifting into the holding-out mode. In the holding-out preparation mode, the rotational speed of the flywheel 13 is lower than the rotational speed of the engine 4, the first clutch 26 is disengaged, and the second clutch 27 is switching from a disengaged state thereof to an engaged state thereof.

According to this configuration, in the holding-out preparation mode, the second clutch 27 is switching to an engaged state thereof, and therefore preparation for shift into the holding-out mode is made. It is therefore possible to smoothly shift into the holding-out mode.

The plurality of operation modes include a boost preparation mode to be executed before shifting into the boost mode. In the boost preparation mode, the rotational speed of the flywheel 13 is equal to the target rotational speed and is higher than the rotational speed of the engine 4, the first clutch 26 is engaged, and the second clutch 27 is switching from a disengaged state thereof to an engaged state thereof.

According to this configuration, in the boost preparation mode, the second clutch 27 is switching to an engaged state thereof, and therefore preparation for shift into the boost mode is made. It is therefore possible to smoothly shift into the boost mode.

The plurality of operation modes include a charge preparation mode to be executed before shifting into the charge mode. In the charge preparation mode, the rotational speed of the flywheel 13 is lower than the target rotational speed thereof, the first clutch 26 is switching from a disengaged state thereof to an engaged state thereof, and the second clutch 27 is disengaged.

According to this configuration, in the charge preparation mode, the first clutch 26 is switching to an engaged state thereof, and therefore preparation for shift into the charge mode is made. It is therefore possible to smoothly shift into the charge mode.

The plurality of operation modes include a free mode in which the engine 4 is activated, the first clutch 26 and the second clutch 27 are disengaged, and the flywheel 13 is stopped.

According to this configuration, in the free mode, the first clutch 26 and the second clutch 27 are disengaged, and thereby the flywheel 13 and the engine 4 are disengaged from each other. This can reduce a load applied to the engine 4.

The plurality of operation modes include an engine off mode in which a spark plug of the engine 4 is not ignited, the first clutch 26 and the second clutch 27 are engaged, and the flywheel 13 is speed-reduced.

According to this configuration, in the engine off mode, the first clutch 26 and the second clutch 27 are engaged to the engine 4, and thus the flywheel 13 can be speedily speed-reduced. It is therefore possible to prevent the flywheel 13 from continuing to rotate for a long term due to inertial force even after the engine 4 is turned off.

The controller 110 is configured or programmed to, when the rotational speed of the flywheel 13 is lower than the rotational speed of the engine 4 and a load rate of the engine 4 is lower than a predetermined value, switch the operation mode from the free mode to the holding-out preparation mode.

According to this configuration, preparation for shift into the holding-out mode can be made when the rotational speed of the flywheel 13 is low and the load on the engine 4 is small. It is therefore possible to smoothly shift into the holding-out mode.

The controller 110 is configured or programmed to, when the rotational speed of the flywheel 13 is lower than the rotational speed of the engine 4, a torque rate of the engine 4 is lower than a predetermined value, and an actual rotational speed of the engine 4 is equal to a target rotational speed thereof, switch the operation mode from the holding-out preparation mode to the holding-out mode.

According to this configuration, the rotational speed of the flywheel 13 can be increased by shifting the operation mode into the holding-out mode in a state where the rotational speed of the flywheel 13 is lower than the rotational speed of the engine 4, the load on the engine 4 is small, and the actual rotational speed of the engine 4 has not decreased. This makes it possible to increase the rotational speed of the flywheel 13 to the rotational speed of the engine 4 in a state where the engine 4 need not be assisted, thereby preparing for shift into the charge mode in which the rotational speed of the flywheel 13 is further increased.

The controller 110 is configured or programmed to, when the rotational speed of the flywheel 13 is lower than the rotational speed of the engine 4 and the number of attempts of engaging the second clutch 27 within a predetermined period reaches a predetermined number of times, switch the operation mode from the holding-out preparation mode to the free mode.

According to this configuration, when the operation mode cannot be shifted from the holding-out preparation mode into the holding-out mode because the load on the engine 4 increases due to an increase of the work load or the like, the load on the engine 4 can be decreased by shifting the operation mode into the free mode.

The controller 110 is configured or programmed to, when the rotational speed of the flywheel 13 is equal to the rotational speed of the engine 4 and a load rate of the engine 4 is lower than a predetermined value, switch the operation mode from the holding-out mode to the charge preparation mode.

According to this configuration, preparation for shift into the charge mode can be made to accumulate rotational energy in the flywheel 13 in a state where the load on the engine 4 is small, and therefore shift into the charge mode can be smoothly performed.

The controller 110 is configured or programmed to, when the rotational speed of the flywheel 13 is lower than the rotational speed of the engine 4 and a torque rate of the engine 4 is equal to or higher than a predetermined value, switch the operation mode from the holding-out mode to the free mode.

According to this configuration, the load on the engine 4 can be decreased by shifting the operation mode from the holding-out mode into the free mode when the load on the engine 4 increases due to an increase of the work load or the like, and therefore it is possible to prevent work from being hindered.

The controller 110 is configured or programmed to, when the rotational speed of the flywheel 13 is equal to the rotational speed of the engine 4 and a torque rate of the engine 4 is lower than a predetermined value, switch the operation mode from the charge preparation mode to the charge mode.

According to this configuration, shift into the charge mode can be performed to accumulate rotational energy in the flywheel 13 in a state where the load on the engine 4 is small and the rotational speed of the flywheel 13 is relatively high.

The controller 110 is configured or programmed to, when the rotational speed of the flywheel 13 is equal to the rotational speed of the engine 4 and a number of attempts of engaging the first clutch 26 within a predetermined period reaches a predetermined number of times, switch the operation mode from the charge preparation mode to the free mode.

According to this configuration, the load on the engine 4 can be decreased by shifting the operation mode into the free mode when shift into the charge mode cannot be performed because the load on the engine 4 increases due to an increase of the work load or the like in the charge preparation mode.

The controller 110 is configured or programmed to, when the rotational speed of the flywheel 13 is equal to the target rotational speed thereof higher than the rotational speed of the engine 4 and a load rate of the engine 4 is lower than a predetermined value, switch the operation mode from the charge mode to the boost preparation mode or provide a notification that the operation mode is allowed to switch to the boost preparation mode.

According to this configuration, when the load on the engine 4 is small although the rotational speed of the flywheel 13 is sufficiently speed-increased to assist the engine 4, preparation for switching to the boost mode can be made in preparation of an increase of the load on the engine 4. This makes it possible to smoothly shift the operation mode into the boost mode when the load on the engine 4 increases.

The controller 110 is configured or programmed to, when the rotational speed of the flywheel 13 is higher than the rotational speed of the engine 4 and is lower than the target rotational speed thereof and a torque rate of the engine 4 is equal to or higher than a predetermined value, switch the operation mode from the charge mode to the free mode.

According to this configuration, the load on the engine 4 can be decreased by shifting the operation mode into the free mode when the load on the engine 4 increases due to an increase of the work load or the like while the rotational speed of the flywheel 13 is being increased.

The controller 110 is configured or programmed to, when the rotational speed of the flywheel 13 is equal to the target rotational speed thereof higher than the rotational speed of the engine 4, a load rate of the engine 4 is equal to or higher than a predetermined value, and a drop rate of the engine 4 is equal to or higher than a predetermined value, switch the operation mode from the boost preparation mode to the boost mode.

According to this configuration, the rotational power of the engine 4 can be assisted by the rotational power of the flywheel 13 by shifting the operation mode into the boost mode when the load on the engine 4 increases in a state where the rotational speed of the flywheel 13 has been sufficiently speed-increased to assist the engine 4 (in a state where high rotational energy has been accumulated in the flywheel 13).

The controller 110 is configured or programmed to, when the rotational speed of the flywheel 13 is equal to the rotational speed of the engine 4, switch the operation mode from the boost mode to the holding-out mode.

According to this configuration, a rapid decrease of the rotational speed of the engine 4 can be prevented by switching to the holding-out mode when the rotational power of the flywheel 13 has been decreased as a result of assisting the rotational power of the engine 4 by the rotational power of the flywheel 13 in the boost mode and the assist can no longer be performed.

The controller 110 is configured or programmed to, when the rotational speed of the flywheel 13 is lower than the rotational speed of the engine, a load rate of the engine 4 is lower than a predetermined value, and an actual rotational speed of the engine 4 is lower than a target rotational speed thereof, switch the operation mode from the boost mode to the free mode.

According to this configuration, it is possible to prevent the flywheel 13 from assisting the engine 4 in a state where the load on the engine 4 is small by shifting the operation mode into the free mode when it becomes unnecessary to assist the engine 4 in the boost mode since the load on the engine 4 decreases due to a decrease of the work load or the like.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A working vehicle comprising:
    an engine;
    a first flywheel to rotate upon receipt of rotational power of the engine;
    a transmission to selectively receive the rotational power of the engine or rotational power of the engine and the first flywheel, speed-change the received rotational power, and output the speed-changed rotational power;
    a first power transmission path to transmit the rotational power of the engine to the first flywheel;
    a second power transmission path to transmit the rotational power of the first flywheel to the transmission;
    a third power transmission path to transmit the rotational power of the engine to the transmission without passing through the first flywheel; and
    an intermediate shaft interposed between an output shaft of the engine and the transmission to define the third power transmission path; wherein
    the first power transmission path and the second power transmission path are independent of each other;
    the first power transmission path includes a first clutch to selectively allow or interrupt transmission of rotational power from the engine to the first flywheel;
    the second power transmission path includes a second clutch to selectively allow or interrupt transmission of rotational power from the first flywheel to the transmission;

the third power transmission path constantly connects the output shaft of the engine and an input shaft of the transmission;

the intermediate shaft extends through the first flywheel; and the first clutch and the second clutch are arranged in a radial direction of the intermediate shaft.

2. The working vehicle according to claim 1, wherein the first power transmission path includes a speed increasing mechanism to speed-increase the rotational power of the engine and transmit the speed-increased rotational power to the first flywheel; and the second power transmission path is configured to transmit the rotational power of the first flywheel to the transmission without passing through a speed reduction mechanism because the second power transmission path is not provided with a speed reduction mechanism.

3. The working vehicle according to claim 2, wherein the speed increasing mechanism includes a planetary gear mechanism including a sun gear, a planetary gear, and a ring gear;

the ring gear is fixed non-rotatably;

the rotational power of the engine is input to the planetary gear and transmitted to the first flywheel via the sun gear; and the rotational power of the first flywheel is transmitted to the transmission without passing through the planetary gear mechanism.

4. The working vehicle according to claim 1, further comprising:

a second flywheel connected to the output shaft of the engine; wherein the first flywheel is rotatable independently of the second flywheel.

5. The working vehicle according to claim 4, wherein the first flywheel is located between the second flywheel and the transmission in an axial direction of the output shaft.

6. The working vehicle according to claim 1, further comprising:

a housing to store the first flywheel, the first clutch, and the second clutch; wherein the housing includes a first wall disposed close to the engine and a second wall disposed close to the transmission;

the housing includes a partition wall to partition an inside of the housing into a space in which the first flywheel is stored and a space in which the first clutch and the second clutch are stored;

the partition wall is provided between the first wall and the second wall; and the first clutch and the second clutch are disposed in a vicinity of the partition wall between the partition wall and the second wall.

7. The working vehicle according to claim 1, wherein the first clutch and the second clutch are multiplate clutches each including a plurality of friction plates and are located radially inward of the first flywheel.

* * * * *